(12) United States Patent
Kadohata et al.

(10) Patent No.: US 9,178,645 B2
(45) Date of Patent: Nov. 3, 2015

(54) WAVELENGTH PATH REALLOCATION METHOD AND UPPER LAYER PATH REALLOCATION METHOD

(75) Inventors: Akihiro Kadohata, Yokosuka (JP); Akira Hirano, Yokosuka (JP); Yoshiaki Sone, Yokosuka (JP); Yukio Tsukishima, Yokosuka (JP); Takafumi Tanaka, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 281 days.

(21) Appl. No.: 13/879,184

(22) PCT Filed: Oct. 21, 2011

(86) PCT No.: PCT/JP2011/074286
§ 371 (c)(1),
(2), (4) Date: Apr. 12, 2013

(87) PCT Pub. No.: WO2012/053634
PCT Pub. Date: Apr. 26, 2012

(65) Prior Publication Data
US 2013/0195460 A1 Aug. 1, 2013

(30) Foreign Application Priority Data

Oct. 21, 2010 (JP) ................................ 2010-236776
May 10, 2011 (JP) ................................ 2011-105714

(51) Int. Cl.
*H04J 14/02* (2006.01)
*H04L 12/721* (2013.01)

(52) U.S. Cl.
CPC ......... *H04J 14/0227* (2013.01); *H04J 14/0257* (2013.01); *H04J 14/0269* (2013.01); *H04J 14/0284* (2013.01); *H04J 14/0212* (2013.01); *H04J 14/0217* (2013.01); *H04L 45/62* (2013.01)

(58) Field of Classification Search
CPC .................... H04J 14/0212; H04J 14/0257
See application file for complete search history.

(56) References Cited

U.S. PATENT DOCUMENTS 6,944,406 B1* 9/2005 Way .............................. 398/196
2002/0196490 A1* 12/2002 Smith .......................... 359/118
(Continued)

FOREIGN PATENT DOCUMENTS

| JP | 2005 20572 | 1/2005 |
| JP | 2007 209040 | 8/2007 |
| JP | 2009 71614 | 4/2009 |
| JP | 2010 141704 | 6/2010 |

OTHER PUBLICATIONS

The Extended European Search Report issued Mar. 12, 2014, in Application no. / Patent No. 11834473.8-1862 / 2632092.
(Continued)

*Primary Examiner* — Nathan Curs
(74) *Attorney, Agent, or Firm* — Oblon, McClelland, Maier & Neustadt, L.L.P.

(57) ABSTRACT

A wavelength path reallocation method in a path reallocation apparatus for reallocating a wavelength path set in a communication network, including: a wavelength path designing step in which a wavelength path designing unit designs a reallocation destination wavelength path by performing calculation such that the number of use frequency regions in the communication network becomes smaller than a corresponding value before reallocation; and a wavelength path setting step in which a wavelength path setting unit changes a reallocation target wavelength path to the reallocation destination wavelength path by using free wavelength.

22 Claims, 66 Drawing Sheets

(56) References Cited

U.S. PATENT DOCUMENTS

| | | | |
|---|---|---|---|
| 2004/0096219 A1* | 5/2004 | Abbas | 398/69 |
| 2006/0193632 A1* | 8/2006 | Risbood | 398/59 |
| 2007/0172237 A1* | 7/2007 | Risbood | 398/59 |
| 2008/0159742 A1 | 7/2008 | Krishnaswamy et al. | |
| 2011/0292949 A1* | 12/2011 | Hayashi et al. | 370/419 |

OTHER PUBLICATIONS

Nakahira, Y., et al., "An Optical Path Rearrange System with an Inter-working Mechanism to keep IP Reach-ability," The Institute of Electronics, Information and Communication Engineers, vol. 104, No. 381, pp. 31-36, (Oct. 22, 2004).

Bouillet, E., et al., "Lightpath Re-Optimization in Mesh Optical Networks," IEEE/ACM Transactions on Networking, vol. 13, No. 2, pp. 437-447, (Apr. 2005).

Kuri, J., et al., "Resolution of a WDM network design problem using a decomposition approach and a size reduction method," Proceedings of ECUMN, pp. 187-194, (Apr. 2002).

International Search Report Issued Nov. 15, 2011 in PCT/JP11/74286 Filed Oct. 21, 2011.

* cited by examiner

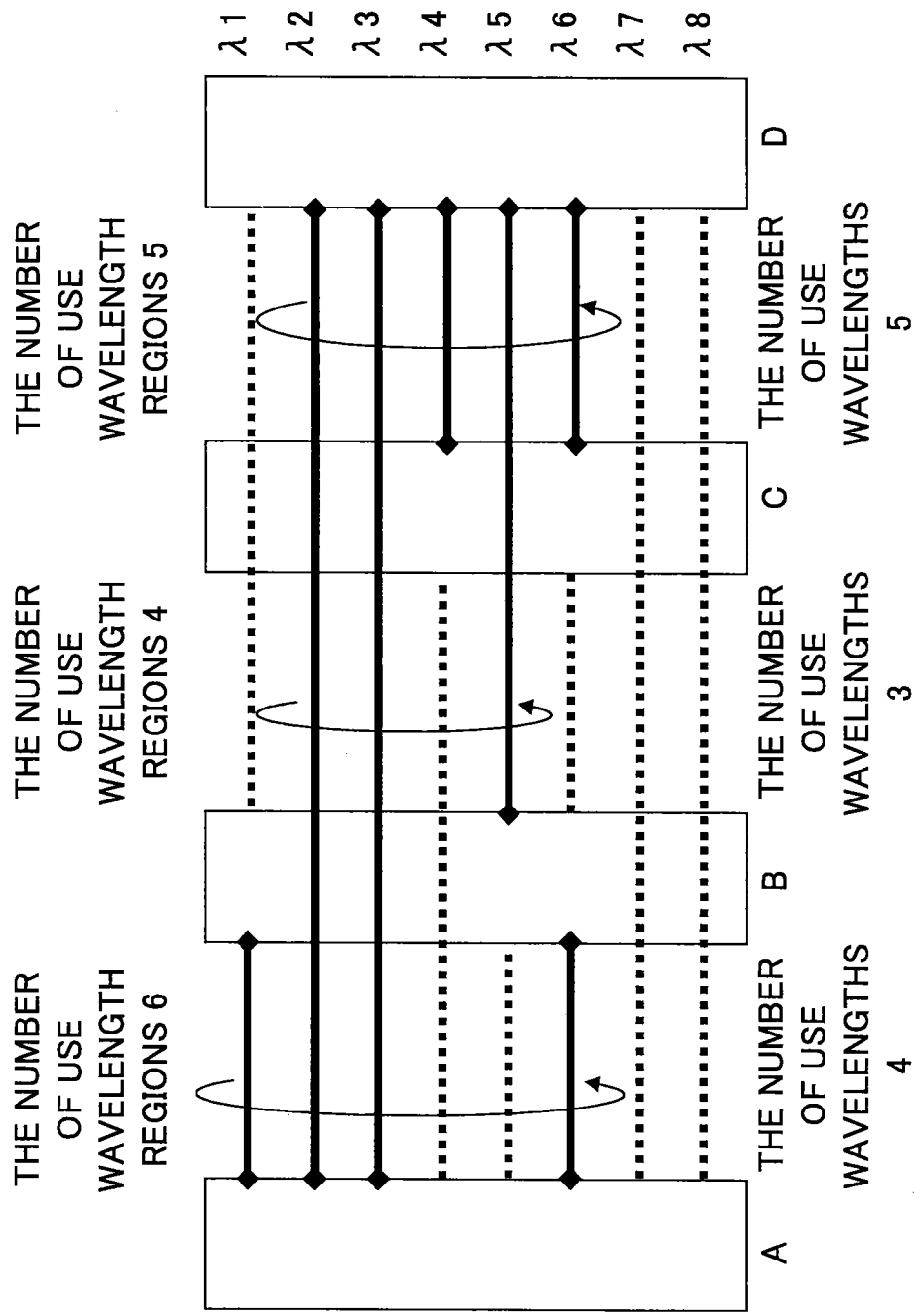

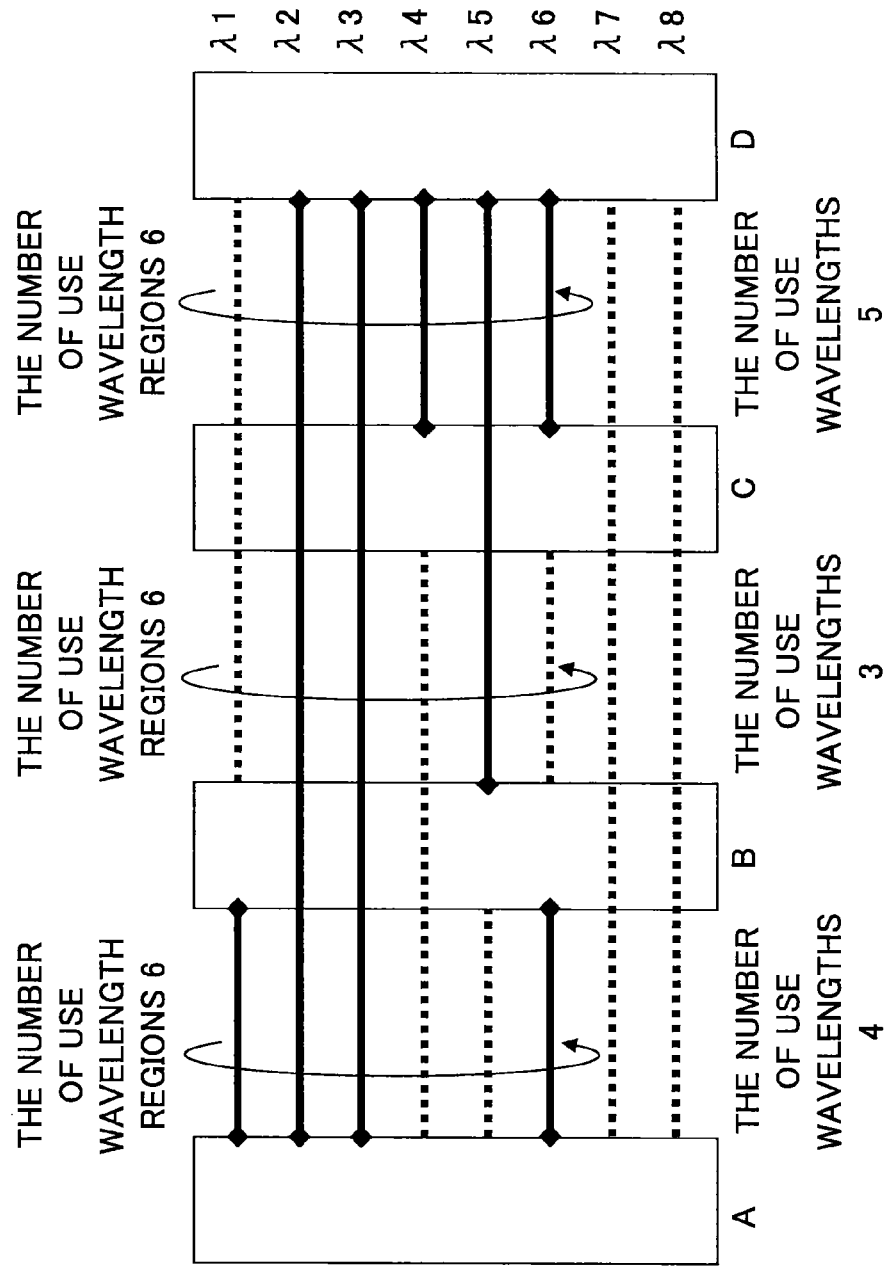

FIG.2
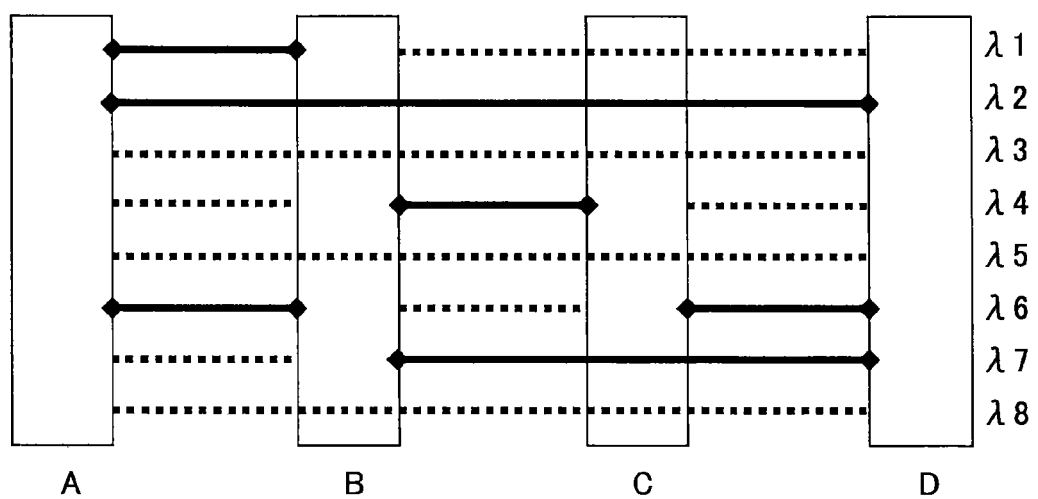
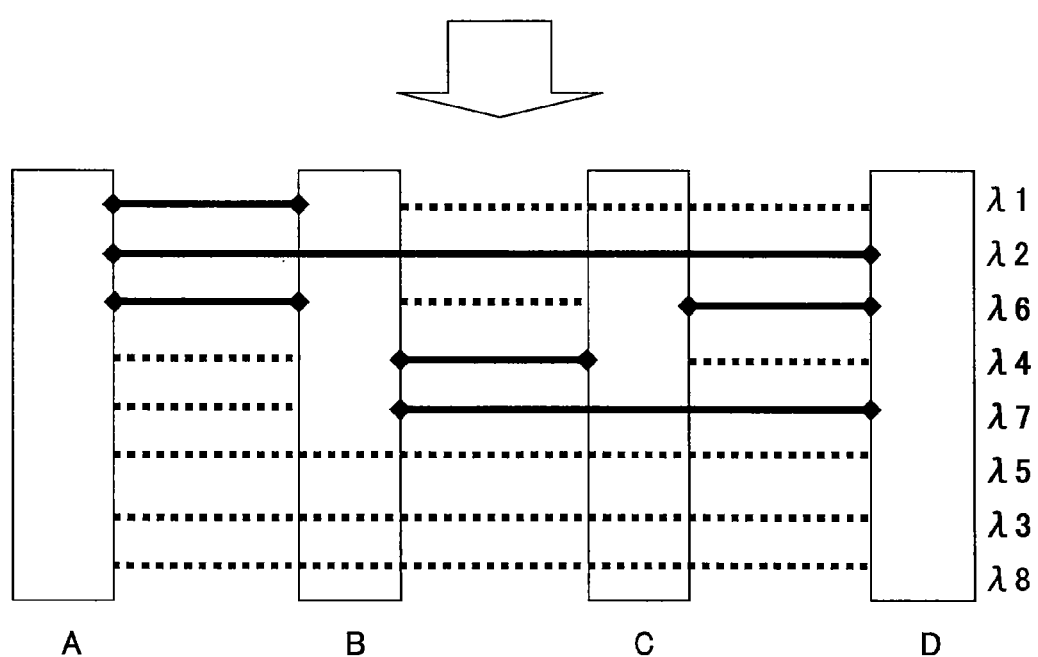

EXAMPLE: s→4, d→8 w→4

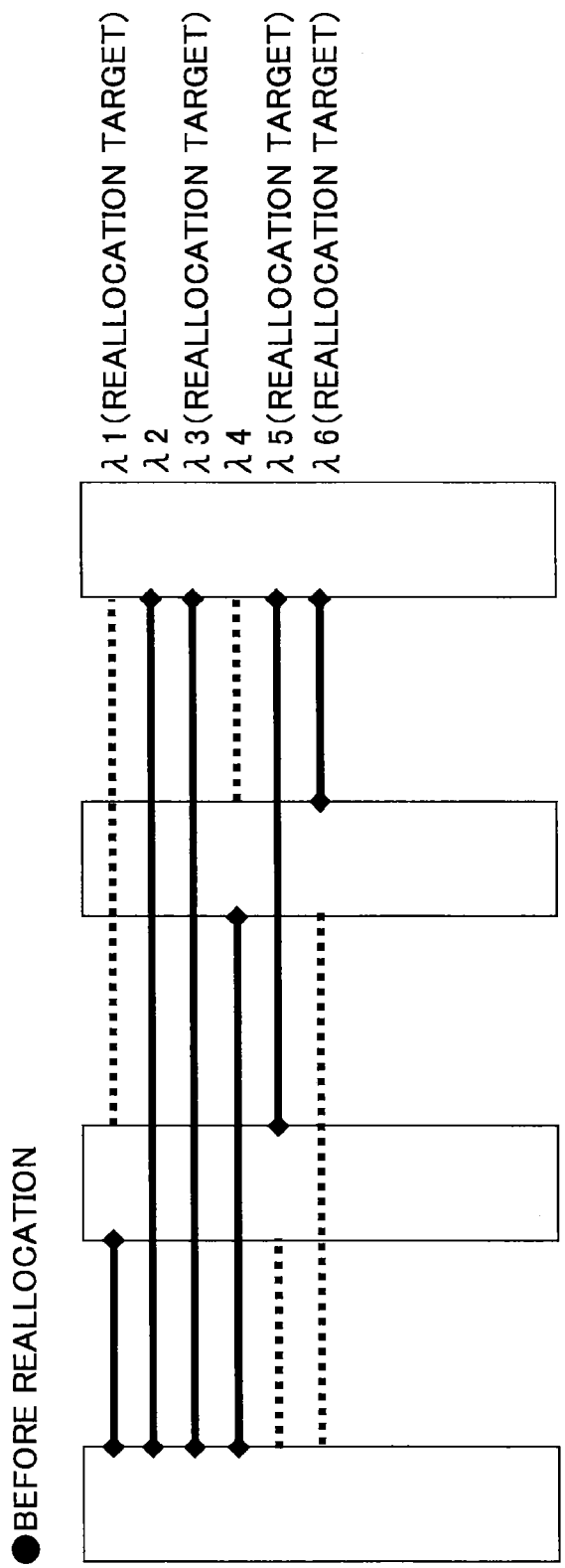

●AFTER REALLOCATION

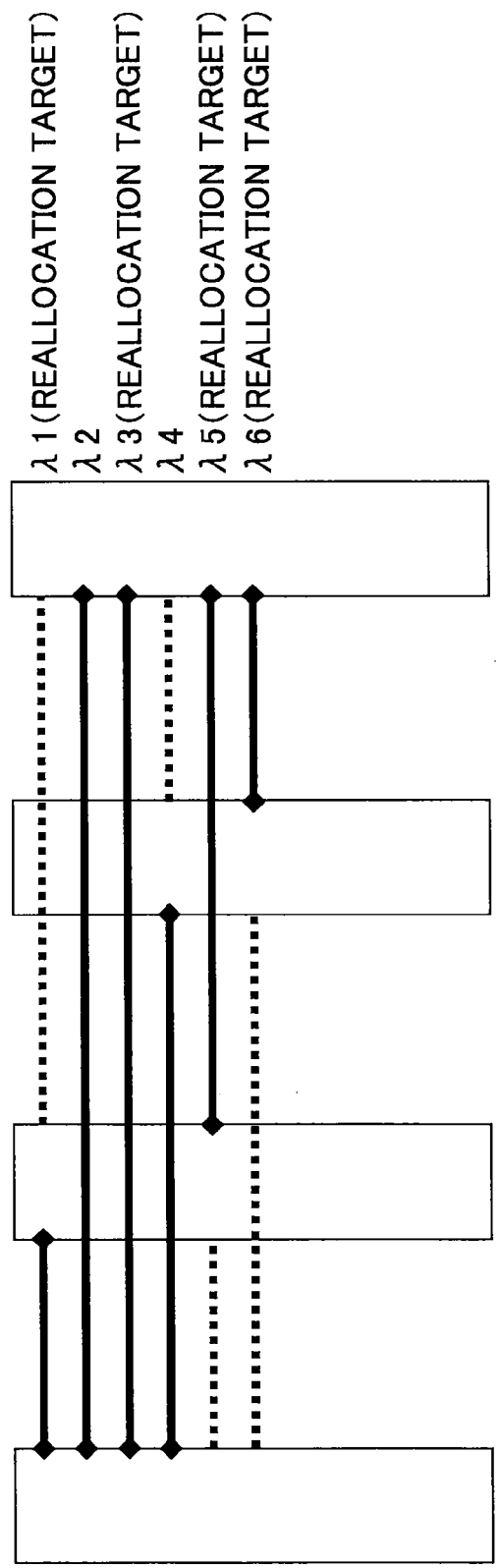

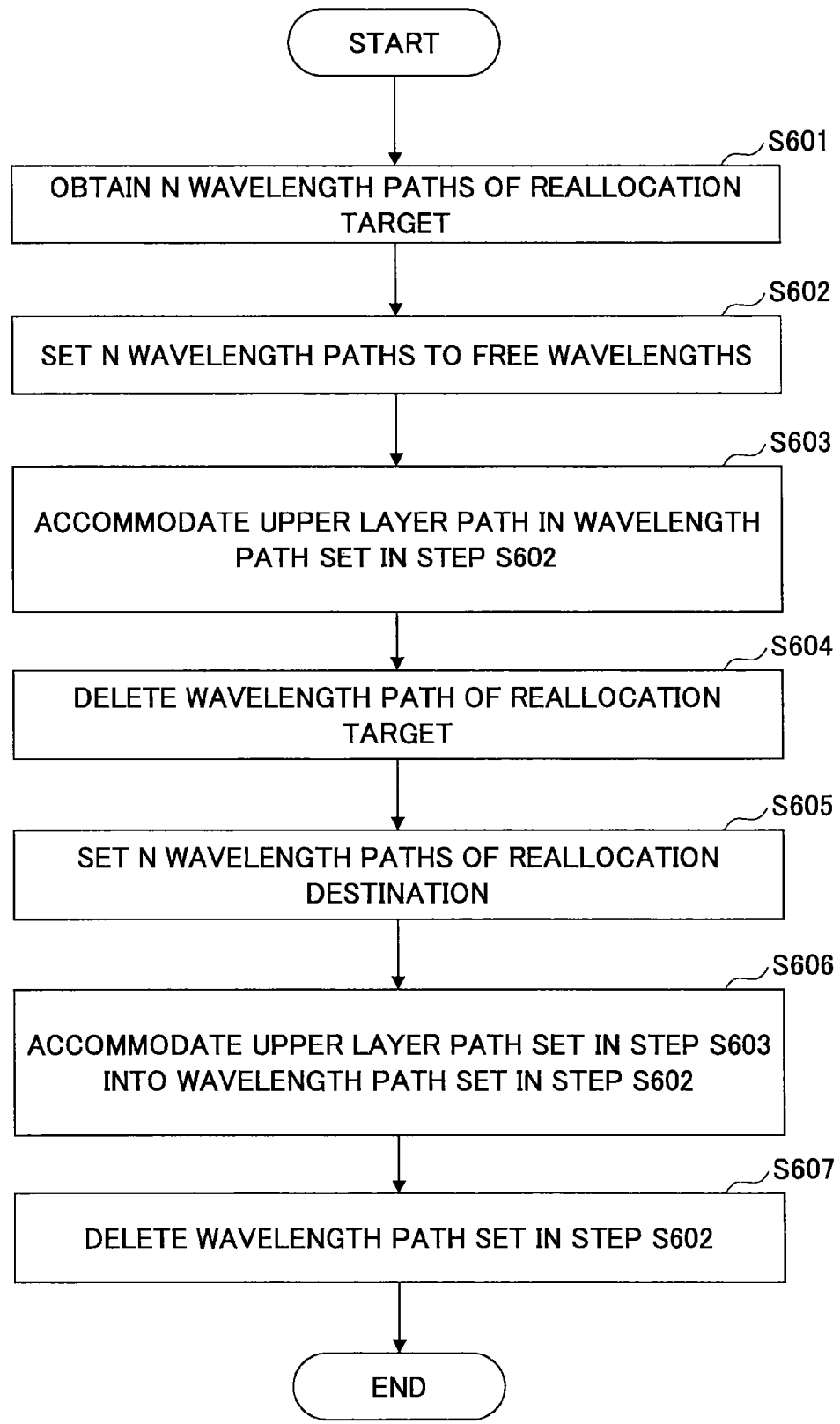

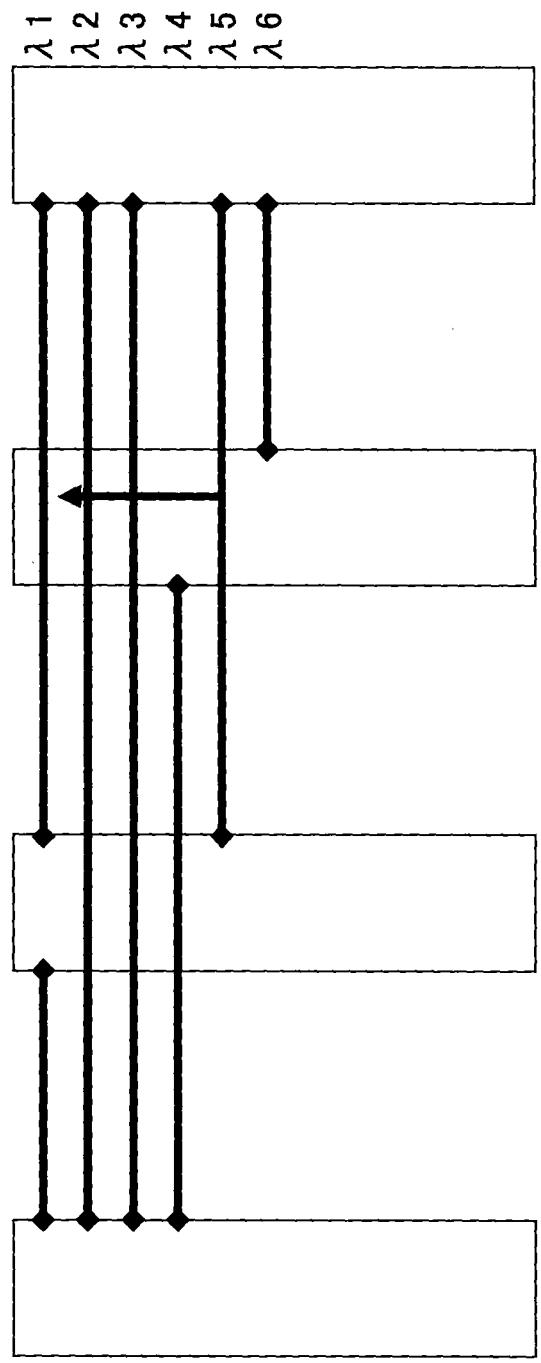

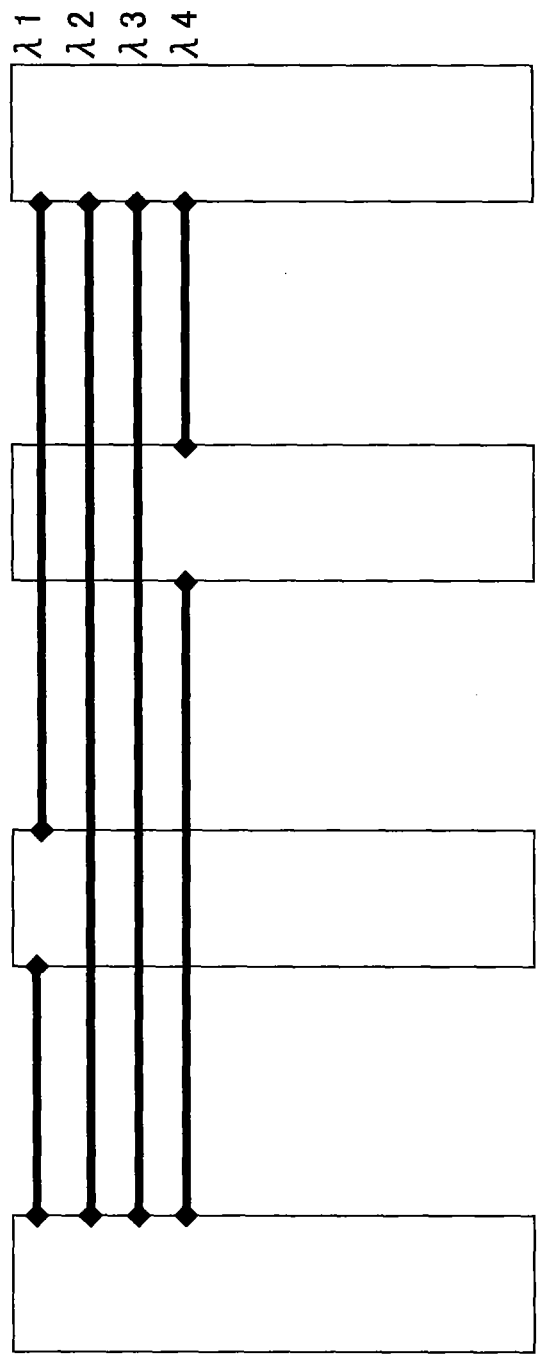

FIG.32A

|    | 01 | 03 | 12 | 14 | 25 | 34 | 45 |
|----|----|----|----|----|----|----|----|
| $\lambda 1$  | 30 | 31 | 32 | 33 | 34 | 35 | 36 |
| $\lambda 2$  | 1  |    | 2  | 3  | 2  | 4  | 4  |
| $\lambda 3$  | 5  | 6  |    | 5  | 7  |    | 7  |
| $\lambda 4$  | 40 | 41 | 42 | 43 | 44 | 45 | 46 |
| $\lambda 5$  |    |    | 8  | 9  |    |    |    |
| $\lambda 6$  | 50 | 51 | 52 | 53 | 54 | 55 | 56 |
| $\lambda 7$  | 10 | 11 | 12 | 10 |    | 11 |    |
| $\lambda 8$  | 13 |    |    |    | 14 | 15 | 15 |
| $\lambda 9$  | 60 | 61 | 62 | 63 | 64 | 65 | 66 |
| $\lambda 10$ | 16 | 17 | 18 |    |    | 19 | 20 |
| ...          |    |    |    |    |    |    |    |

FIG.32B

|    | 01 | 03 | 12 | 14 | 25 | 34 | 45 |
|----|----|----|----|----|----|----|----|
| $\lambda 2$  | 1  |    | 2  | 3  | 2  | 4  | 4  |
| $\lambda 3$  | 5  | 6  |    | 5  | 7  |    | 7  |
| $\lambda 7$  | 10 | 11 | 12 | 10 |    | 11 |    |
| $\lambda 10$ | 16 | 17 | 18 |    |    | 19 | 20 |
| $\lambda 8$  | 13 |    |    |    | 14 | 15 | 15 |
| $\lambda 5$  |    |    | 8  | 9  |    |    |    |
| $\lambda 4$  | 40 | 41 | 42 | 43 | 44 | 45 | 46 |
| $\lambda 6$  | 50 | 51 | 52 | 53 | 54 | 55 | 56 |
| $\lambda 9$  | 60 | 61 | 62 | 63 | 64 | 65 | 66 |
| $\lambda 1$  | 30 | 31 | 32 | 33 | 34 | 35 | 36 |
| ...          |    |    |    |    |    |    |    |

FIG.32C

|       | 01 | 03 | 12 | 14 | 25 | 34 | 45 |
|-------|----|----|----|----|----|----|----|
| λ2    | 1  | 17 | 2  | 3  | 2  | 4  | 4  |
| λ3    | 5  | 6  | 8  | 5  | 7  | 19 | 7  |
| λ7    | 10 | 11 | 12 | 10 | 14 | 11 | 20 |
| λ10   | 16 | 17 | 18 | 9  |    | 19 | 20 |
| λ8    | 13 |    |    |    | 14 | 15 | 15 |
| λ5    |    |    | 8  | 9  |    |    |    |
| λ4    | 40 | 41 | 42 | 43 | 44 | 45 | 46 |
| λ6    | 50 | 51 | 52 | 53 | 54 | 55 | 56 |
| λ9    | 60 | 61 | 62 | 63 | 64 | 65 | 66 |
| λ1    | 30 | 31 | 32 | 33 | 34 | 35 | 36 |
| ...   |    |    |    |    |    |    |    |

FIG.32D

|       | 01 | 03 | 12 | 14 | 25 | 34 | 45 |
|-------|----|----|----|----|----|----|----|
| λ2    | 1  | 17 | 2  | 3  | 2  | 4  | 4  |
| λ3    | 5  | 6  | 8  | 5  | 7  | 19 | 7  |
| λ7    | 10 | 11 | 12 | 10 | 14 | 11 | 20 |
| λ10   | 16 |    | 18 | 9  |    | 15 | 15 |
| λ8    | 13 |    |    |    |    |    |    |
| λ5    |    |    |    |    |    |    |    |
| λ4    | 40 | 41 | 42 | 43 | 44 | 45 | 46 |
| λ6    | 50 | 51 | 52 | 53 | 54 | 55 | 56 |
| λ9    | 60 | 61 | 62 | 63 | 64 | 65 | 66 |
| λ1    | 30 | 31 | 32 | 33 | 34 | 35 | 36 |
| ...   |    |    |    |    |    |    |    |

FIG.33A

|       | 01 | 03 | 12 | 14 | 25 | 34 | 45 |
|-------|----|----|----|----|----|----|----|
| $\lambda 1$  | 30 | 31 | 32 | 33 | 34 | 35 | 36 |
| $\lambda 2$  | 1  |    | 2  | 3  | 2  | 4  | 4  |
| $\lambda 3$  | 5  | 6  |    | 5  | 7  |    | 7  |
| $\lambda 4$  |    |    |    |    |    |    |    |
| $\lambda 5$  |    |    | 8  | 9  |    |    |    |
| $\lambda 6$  | 50 | 51 | 52 | 53 | 54 | 55 | 56 |
| $\lambda 7$  | 10 | 11 | 12 | 10 |    | 11 |    |
| $\lambda 8$  | 13 |    |    |    | 14 | 15 | 15 |
| $\lambda 9$  |    |    |    |    |    |    |    |
| $\lambda 10$ | 16 | 17 | 18 |    |    | 19 | 20 |
| ...   |    |    |    |    |    |    |    |

FIG.33B

| | PROVI-SIONAL WAVE-LENGTH NUMBER | 01 | 03 | 12 | 14 | 25 | 34 | 45 |
|---|---|---|---|---|---|---|---|---|
| λ1 | (1) | 30 | 31 | 32 | 33 | 34 | 35 | 36 |
| λ2 | (2) | 1 | | 2 | 3 | 2 | 4 | 4 |
| λ3 | (3) | 5 | 6 | | 5 | 7 | | 7 |
| λ5 | (4) | | | 8 | 9 | | | |
| λ6 | (5) | 50 | 51 | 52 | 53 | 54 | 55 | 56 |
| λ7 | (6) | 10 | 11 | 12 | 10 | | 11 | |
| λ8 | (7) | 13 | | 18 | | 14 | | 15 |
| λ10 | (8) | 16 | 17 | | | | 19 | 20 |
| λ4 | | | | | | | | |
| λ9 | | | | | | | | |
| ... | | | | | | | | |

FIG.34A

|   | 01 | 03 | 12 | 14 | 25 | 34 | 45 |
|---|----|----|----|----|----|----|----|
| $\lambda 1$ | 30 | 31 | 32 | 33 | 34 | 35 | 36 |
| $\lambda 2$ | 1 |   | 2 | 3 | 2 | 4 | 4 |
| $\lambda 3$ | 5 | 6 |   | 5 | 7 |   | 7 |
| $\lambda 4$ | 40 | 41 | 42 | 43 | 44 | 45 | 46 |
| $\lambda 5$ |   |   | 8 | 9 |   |   |   |
| $\lambda 6$ | 50 | 51 | 52 | 53 | 54 | 55 | 56 |
| $\lambda 7$ | 10 | 11 | 12 | 10 |   | 11 |   |
| $\lambda 8$ | 13 |   |   |   | 14 | 15 | 15 |
| $\lambda 9$ | 60 | 61 | 62 | 63 | 64 | 65 | 66 |
| $\lambda 10$ | 16 | 17 | 18 |   |   | 19 | 20 |
| ... |   |   |   |   |   |   |   |

FIG.34B

| | PROVI-SIONAL WAVE-LENGTH NUMBER | 01 | 03 | 12 | 14 | 25 | 34 | 45 |
|---|---|---|---|---|---|---|---|---|
| λ2 | (1) | 1 | | 2 | 3 | 2 | 4 | 4 |
| λ3 | (2) | 5 | 6 | | 5 | 7 | | 7 |
| λ5 | (3) | | | 8 | 9 | | | |
| λ7 | (4) | 10 | 11 | 12 | 10 | | | |
| λ8 | (5) | 13 | | 18 | | 14 | 11 | 15 |
| λ10 | (6) | 16 | 17 | | | | 19 | 20 |
| λ4 | | 40 | 41 | 42 | 43 | 44 | 45 | 46 |
| λ6 | | 50 | 51 | 52 | 53 | 54 | 55 | 56 |
| λ9 | | 60 | 61 | 62 | 63 | 64 | 65 | 66 |
| λ1 | | 30 | 31 | 32 | 33 | 34 | 35 | 36 |
| ... | | | | | | | | |

FIG.43
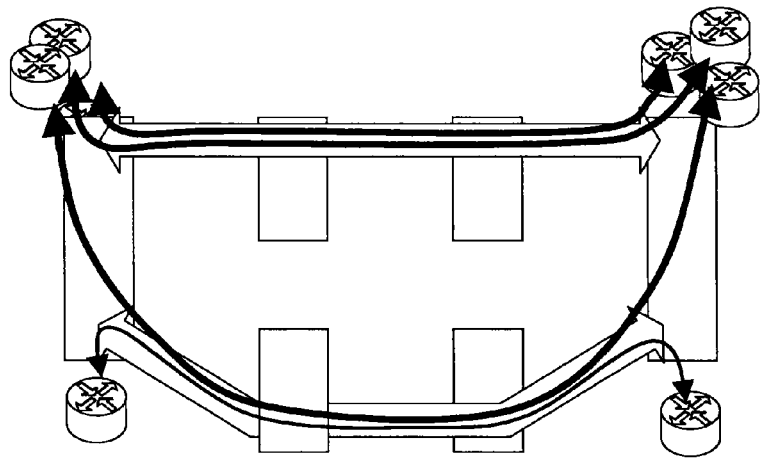
BEFORE REALLOCATION
REALLOCATION OF UPPER
LAYER PATH
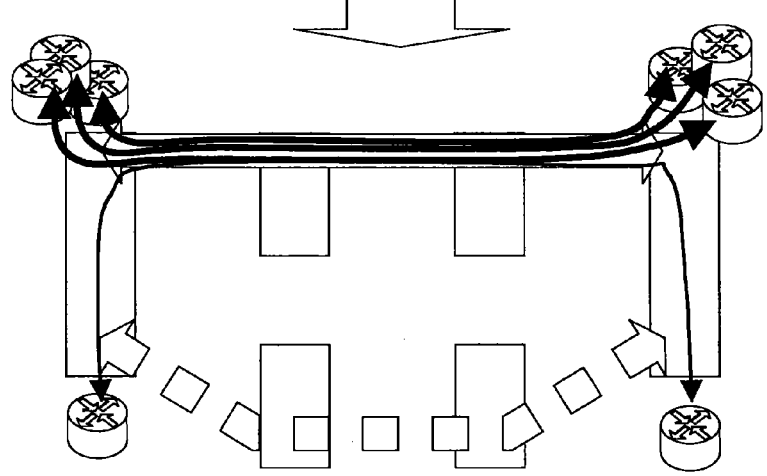
AFTER REALLOCATION
DELETION OF
WAVELENGTH PATH
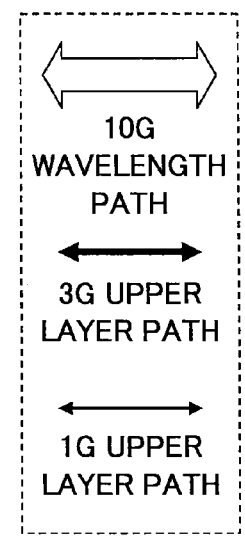
⇔ 10G WAVELENGTH PATH
↔ 3G UPPER LAYER PATH
↔ 1G UPPER LAYER PATH

BEFORE REALLOCATION

AFTER REALLOCATION

| WAVELENGTH PATH XC | 2.5 |
| --- | --- |
| UPPER LAYER PATH XC | 26.67 |
| DEMUX/MUX | 8.99 |
| TRANSPONDER | 5 |

# WAVELENGTH PATH REALLOCATION METHOD AND UPPER LAYER PATH REALLOCATION METHOD

TECHNICAL FIELD

The present invention relates to a wavelength path reallocation method, and an upper layer path reallocation method.

BACKGROUND ART

In a transparent optical mesh network in which wavelength conversion is not performed between relay nodes, efficient use of wavelength free bands becomes gradually unavailable by repeating setting and deleting of a wavelength path, and there is a fear that the amount of network equipment increases. Also, as for an upper layer path such as OTN (Optical Transport Network), SDH (Synchronous Digital Hierarchy), VCAT (Virtual Concatenation) or the like, it is considered that efficiency of accommodation in a wavelength path becomes worse by repeating path setting and deletion.

In order to solve these problems, a method of reallocating a wavelength path (refer to non-patent document 1), and a method for changing capacity and route of a path (refer to patent document 1) are proposed.

RELATED ART DOCUMENT

[Patent document 1] JP2005-20572
[Patent document 2] JP2007-209040
[Non-Patent document 1] E. Bouillet, et al., "Lightpath Re-Optimization in Mesh Optical Networks", IEEE/ACM Transactions on Networking, Vol. 13, No 2, pp 437-pp 447. April, 2005.
[Non-Patent document 2] J. Kuri, et al., "Resolution of a WDM network design problem using a decomposition approach and a size reduction method", Proceedings of ECUMN 2002, Colmar, France, April 2002.

SUMMARY OF THE INVENTION

Problem to be Solved by the Invention

As mentioned above, by repeating setting and deletion of the wavelength path, free wavelengths occur in wavelength regions being used in the communication network, so that the number of wavelengths (the number of use wavelength regions) including free wavelengths in the wavelength regions increases, that is, the number of wavelengths from the smallest wavelength number in use to the largest wavelength number in use (excluding wavelength number not used in the communication network) increases. However, in the method described in the non-document 1 and the patent document 1, it is not considered to decrease the number of use wavelength regions.

Also, there is a possibility that a wavelength path cannot be reallocated depending on the order for reallocating the wavelength path (order for changing a reallocation target wavelength path to a reallocation destination wavelength path) and the free resource amount. However, in the methods described in the non-document 1 and the patent document 1, the order is not considered when reallocating the wavelength path.

In addition, in a case where an upper layer path is set in a wavelength path, it is necessary to perform reallocation in consideration of both of the upper layer path and the wavelength path. But, in the methods described in the non-document 1 and the patent document 1, such a point is not considered.

Further, no wavelength path reallocation method for minimizing operation cost in consideration of the number of operations for performing reallocation of a wavelength path is considered.

In order to solve the above-problem, an object of the present invention is to provide a wavelength path reallocation method and an upper layer path reallocation method for decreasing the number of wavelengths (the number of use wavelength regions) including free wavelengths in wavelength regions used in the communication network, and for decreasing operation cost.

Means for Solving the Problem

According to an embodiment of the present invention, a wavelength path reallocation method in a path reallocation apparatus for reallocating a wavelength path set in a communication network is provided. The wavelength path reallocation method includes:

a wavelength path designing step in which a wavelength path designing unit designs a reallocation destination wavelength path by performing calculation such that the number of use frequency regions in the communication network becomes smaller than a corresponding value before reallocation; and a wavelength path setting step in which a wavelength path setting unit changes a reallocation target wavelength path to the reallocation destination wavelength path by using a free wavelength.

According to an embodiment of the present invention, an upper layer path reallocation method in a path reallocation apparatus for reallocating an upper layer path in a wavelength path set in a communication network is provided. The upper layer path reallocation method includes:

an upper layer path designing step in which an upper layer path designing unit designs a reallocation destination upper layer path by performing calculation such that the number of wavelengths, the number of communication apparatuses or a communication apparatus cost that is used in the communication network becomes smaller than a corresponding value before reallocation; and an upper layer path setting step in which an upper layer path setting unit changes a reallocation target upper layer path to a reallocation destination upper layer path.

According to an embodiment of the present invention, there is provided a wavelength path reallocation method in a path reallocation apparatus for reallocating a wavelength path set in a communication network including:

a wavelength path designing step in which a wavelength path designing unit reallocates a wavelength path so as to increase use efficiency of communication apparatuses or to decrease wavelength collision due to future traffic demands; and an accommodation order calculation step of calculating the number of operations by determining an order for changing a reallocation target wavelength path to a reallocation destination wavelength path by using a free wavelength; and a step of determining wavelength reallocation and order by which the number of operations is the smallest.

Effect of the Present Invention

According to an embodiment of the present invention, it becomes possible to decrease the number of wavelengths (the number of use wavelength regions) including free wavelengths in wavelength regions used in the communication network, and to decrease operation cost.

BRIEF DESCRIPTION OF THE DRAWINGS

FIG. 1A is a diagram for explaining the number of use wavelength regions and the number of use wavelengths for each link;

FIG. 1B is a diagram for explaining the number of use wavelength regions and the number of use wavelengths in the whole communication network;

FIG. 2 is a diagram for explaining the number of use wavelength regions and the number of use wavelengths;

FIG. 9A is a diagram showing wavelength paths before reallocation calculated by the management apparatus of the first embodiment of the present invention;

FIG. 12A is a diagram showing reallocation of a wavelength path in the management apparatus according to the first embodiment of the present invention, which shows a state before reallocation;

FIG. 18 is a diagram showing a wavelength path setting procedure in the management apparatus according to the fourth embodiment of the present invention;

FIG. 20B is a diagram showing reallocation of a wavelength path in the management apparatus according to the fifth embodiment of the present invention, which shows setting a reallocation target wavelength path to a reallocation destination;

FIG. 20D is a diagram showing reallocation of a wavelength path in the management apparatus according to the fifth embodiment of the present invention, which shows a state after reallocation;

FIG. 32A is a diagram showing reallocation of a wavelength path in the management apparatus according to the tenth embodiment of the present invention, which shows a state before reallocation;

FIG. 32B is a diagram showing reallocation of a wavelength path in the management apparatus according to the tenth embodiment of the present invention, which shows performing rearrangement in ascending order of free wavelengths;

FIG. 32C is a diagram showing reallocation of a wavelength path in the management apparatus according to the tenth embodiment of the present invention, which shows that a wavelength path that can be relocated is searched in descending order of amount of free wavelengths, and reallocation is performed;

FIG. 32D is a diagram showing reallocation of a wavelength path in the management apparatus according to the tenth embodiment of the present invention, which shows a state after reallocation;

FIG. 33A is a diagram showing wavelength paths for calculation in the management apparatus according to the eleventh embodiment of the present invention, which shows a wavelength assignment status;

FIG. 33B is a diagram showing wavelength paths for calculation in the management apparatus according to the eleventh embodiment of the present invention, which shows assigning provisional wavelength numbers;

FIG. 34A is a diagram showing wavelength paths for calculation in the management apparatus according to the twelfth embodiment of the present invention, which shows assigning provisional wavelength numbers;

FIG. 34B is a diagram showing wavelength paths for calculation in the management apparatus according to the twelfth embodiment of the present invention, which shows assigning provisional wavelength numbers;

FIG. 43 is a diagram showing effects of reallocation of wavelength paths in an embodiment of the present invention;

EMBODIMENTS FOR CARRYING OUT THE INVENTION

Figure 3A:
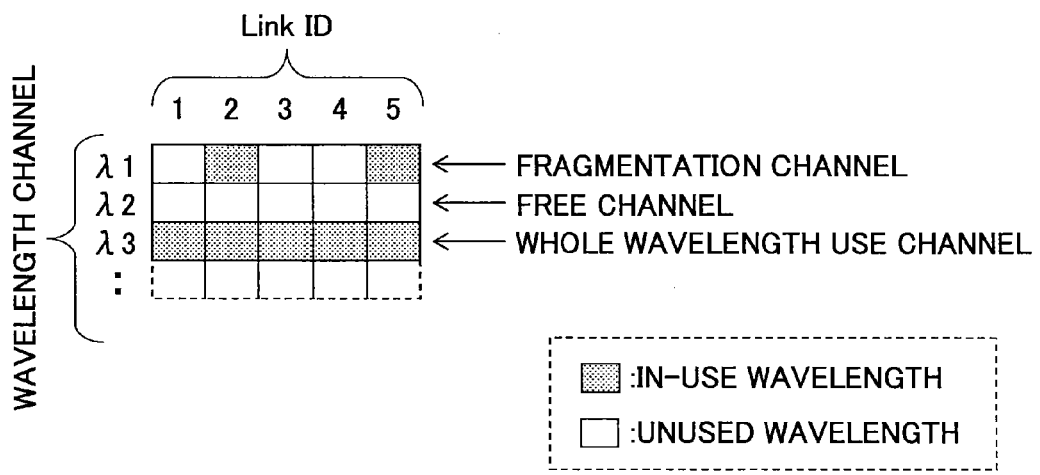
FIG. 3A is an example of a diagram for explaining wavelength channel and fragmentation.

In the following, embodiments of the present invention are described in detail.

First, terms used in embodiments of the present invention are described.

"The number of use wavelength regions" is the number of wavelengths including free wavelength in a wavelength region used in communication network, that is, the number of wavelengths (excluding wavelength numbers not used in the communication network) from the smallest wavelength number in use to the largest wavelength number in use. There are two methods of calculating the number of use wavelength regions, which are (1) a method of calculating the number of wavelengths in the wavelength regions used for each link, and (2) a method of calculating the number of wavelengths in wavelength regions used in the whole communication network.

"The number of use wavelengths" is the number of wavelengths that are being used (free wavelengths are not included).

For example, the number of use wavelength regions and the number of wavelengths in a communication network in which wavelengths are assigned in ascending order or in descending order as shown in FIG. 1A and FIG. 1B are described. In the case of (1), as shown in FIG. 1A, the number of use wavelength regions between nodes A-B is 6 ($\lambda 1 \sim \lambda 6$), and the number of use wavelengths is 4(λ1, λ2, λ3, λ6). The number of use wavelength regions between nodes B-C is 4 (λ2~λ5), and the number of use wavelengths becomes 3(λ2, λ3, λ5). The number of use wavelengths between nodes C-D is 5 (λ2~λ6), and the number of use wavelengths becomes 5 (λ2~λ6). In the case of (2), as shown in FIG. 1B, the number of use wavelength regions is 6 (λ1~λ6) in all links.

In a case where wavelengths are randomly (by a method other than ascending order or descending order) assigned as shown in FIG. 2, or in a case where there is a wavelength that is not used due to deletion of a wavelength path, the number of use wavelength regions are calculated by putting wavelengths used in the communication network to one side. In the case of (1), the number of use wavelength regions between nodes A-B is 3 (λ1, λ2, λ6), and the number of use wavelengths is 3 (λ1, λ2, λ6). The number of use wavelength regions between nodes B-C is 4(λ2, λ6, λ4, λ7), and the number of use wavelengths is 3(λ2, λ4, λ7). The number of use wavelength regions between nodes C-D is 4(λ2, λ6, λ4, λ7), and the number of use wavelengths is 3(λ2, λ6, λ7). In the case of (2), the number of use wavelengths in all links becomes 5(λ1, λ2, λ6, λ4, λ7).

The number of use wavelength regions may be defined as "the number of ports from a first port in use to the last port in use" in a node, and "the number of use wavelengths" may be defined as "the number of ports in use" of a node.

"Switching function unit" is a function unit configured to switch an optical signal, and includes, for example, an optical cross-connect, an optical switch, an ODU (Optical-channel Data Unit) a cross-connect, a 2-D MEMS (Micro Electro Mechanical Systems) switch, a 3-D MEMS, and the like.

"Wavelength path selection function unit" is a function unit configured to select a wavelength, and includes, for example, a WSS (Wavelength Selective Switch), and the like.

"Management apparatus" is an apparatus configured to select and set a wavelength and a route of a wavelength path, and to select and set a route of an upper layer path. The management apparatus includes, for example, an NMS (Network Management System), an NRM (Network Resource Manager), a PCE (Path Computation Element), an EMS (Element Management System) and the like.

"Hitless switching" means to perform switching without instantaneous interruption. For example, "Hitless switching" includes switching between paths in a short time (within 50 ms, for example), switching between paths such that data loss does not occur, switching between paths such that packet loss does not occur in a packet layer. When switching between paths in a short time, data during the time may be lost.

"Upper layer path" is set in a wavelength path and is provided to a user. The upper layer path includes, for example, a TDM (Time Division Multiplexing) path, an SDH(Synchronous Digital Hierarchy) path, Ethernet, a Label Switched Path of MPLS (Multiprotocol Label Switching), or VCAT (Virtual Concatenation) in which paths are grouped, and Link Aggregation. The upper layer path is overlaid on the wavelength path.

"Granularity of upper layer path" is a band amount assigned to the upper layer path. For example, a granularity of a 1 G upper layer path is 1 G, and a granularity of a 3 G upper layer path is 3 G.

"Communication route setting message" is a message including control information for reserving resources or for assigning resources, and path route information. When setting a wavelength path, the communication route setting message further includes wavelength information.

"Communication route setting completion report" is a message, including wavelength information, for reporting that setting of a wavelength path completes.

"Communication route delete message" is a message including control information for release reservation of resources or release of resources, and path route information. When deleting a wavelength path, the communication route delete message further includes wavelength information.

"Communication route delete completion report" is a message, including wavelength information, for reporting that deletion a wavelength path completes.

"Upper layer path setting message" is a message including wavelength information or port information for selecting a wavelength path for accommodating an upper layer path, and identification information of an upper layer path to be accommodated.

"Upper layer path delete completion report" is a message, including identification information of an upper layer path, for reporting that deletion of the upper layer path completes.

"Upper layer path delete message" is a message including control information for release reservation of resources or release of resources, and path route information, and further including identification information of an upper layer path.

"Wavelength path selection completion report" is a message, including identification information of an upper layer path, for reporting that selection of a wavelength path completes.

"Resource release message" is a message including control information for performing resource release for a node apparatus.

"Resource assignment" is to make settings (optical cross-connect) such that, for a wavelength path, an optical signal divided from an wavelength multiplexed signal input from an input port is output to a predetermined output optical transmission route port with the same wavelength. For an upper layer path, resource assignment means setting the upper layer path between a start point node and an end point node. The upper layer path can be set by transmitting an upper layer path setting message to the start point node and to the end point node.

"Resource assignment message" is a message including control information for performing resource assignment for a node apparatus.

"Communication apparatus" is a ROADM, an ODU cross-connect switch, an MPLS-TP router, an OXC, a transponder and the like.

"The number of operations" is the number of path setting/deleting sequences that is required when reallocating a path. Or, the number of operations is a total sum of operation costs necessary for path setting/deleting.

"Wavelength channel" is a wavelength number in a network as shown in FIG. 3A.

Figure 3B:
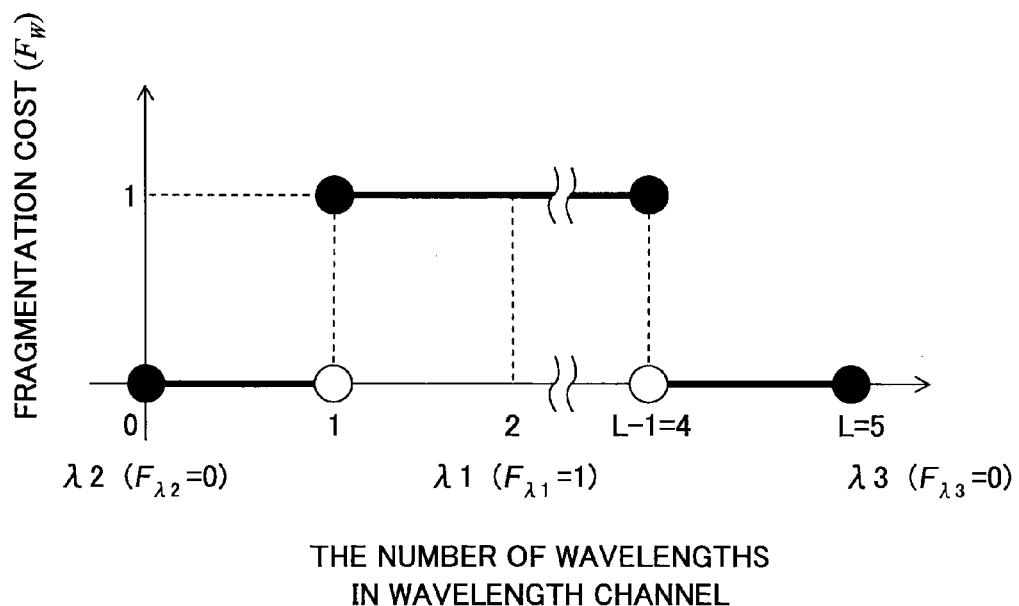
FIG. 3B is an example of a diagram for explaining a fragmentation function.

"Fragmentation" indicates, as shown in FIG. 3A, a state in which usable routes are limited in a wavelength channel, or a state in which wavelengths are dispersed for a link. Also, FIG. 3B shows an example of a fragmentation cost.

Embodiments of the present invention are described for the following three cases.

(1) A case for reallocating a wavelength path (first embodiment-fifth embodiment, ninth embodiment-twelfth embodiment, fourteenth embodiment-twentieth embodiment);

(2) A case for reallocating an upper layer path (sixth embodiment-seventh embodiment);

(3) A case for reallocating an upper layer path, and, after that, reallocating a wavelength path (eighth embodiment).

"(3)" is a method in which "(1)" and "(2)" are combined, and it becomes possible to delete the number of reallocations of wavelength path by deleting unnecessary wavelength paths by the reallocation of (2).

First Embodiment

In the first embodiment, a case for reallocating a wavelength path is described. For setting a wavelength path, there are a centralized control scheme and a distributed control scheme. In the centralized control scheme, one management apparatus manages node apparatuses in the whole communication network, and the management apparatus sends a control signal, to each node apparatus, for establishing a wavelength path and an upper layer path. In the centralized control scheme, each node apparatus is provided with a management control function.

First, the management apparatus and the node apparatus are described in the centralized control scheme.

Figure 4:
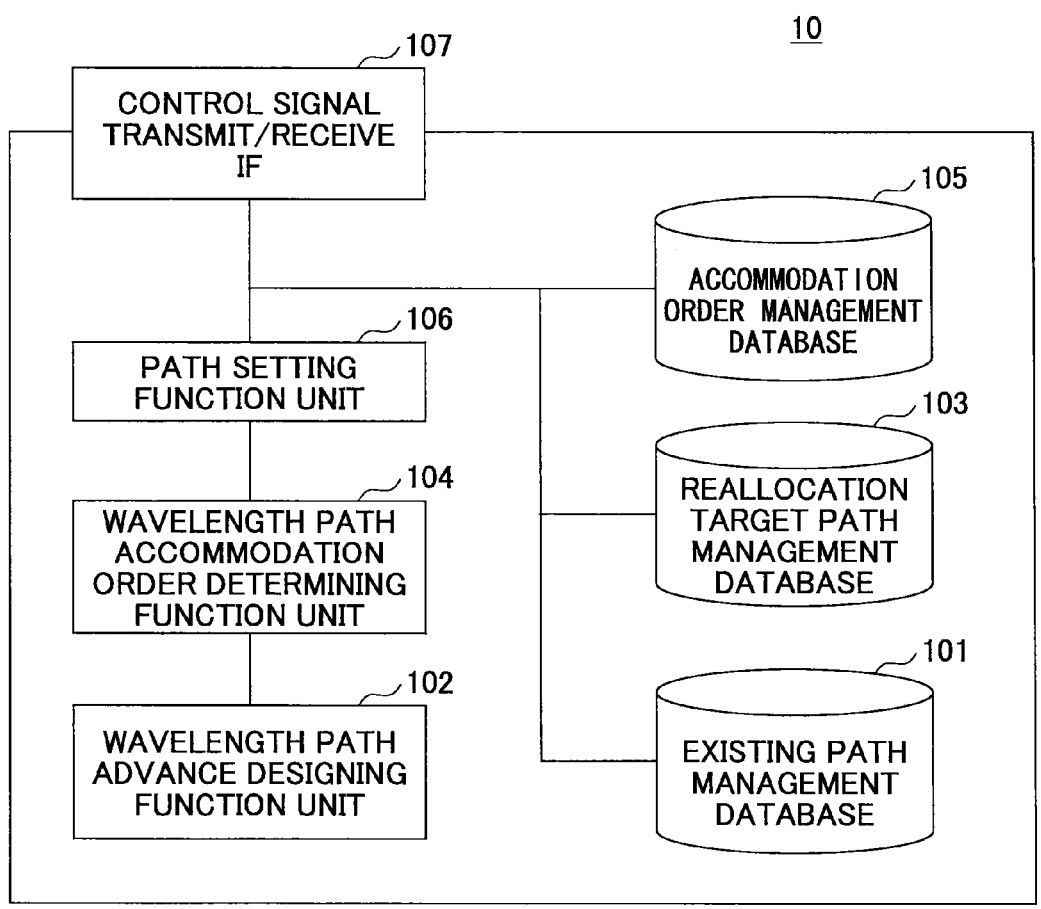
FIG. 4 is a block diagram of a management apparatus of a first embodiment of the present invention (centralized control scheme)

FIG. 4 is a block diagram of a management apparatus 10 of a first embodiment of the present invention. The management apparatus 10 includes an existing path management database 101, a wavelength path advance designing function unit 102, a reallocation target path management database 103, a wavelength path accommodation order determining function unit 104, an accommodation order management database 105, a path setting function unit 106, and a control signal transmit/receive interface 107.

The existing path management database 101 manages route/wavelength information of existing wavelength paths established in the communication network, free wavelength information of each link in the communication network, route/wavelength information of a wavelength path that accommodates an upper layer path, and granularity of each upper layer path. The existing path management database 101 may manage client information (information indicating which upper layer path corresponds to which client).

The wavelength path advance designing function unit 102 designs a reallocation target wavelength path and a reallocation destination wavelength path, in advance, by using information managed by the existing path management database 101. The method for designing the reallocation destination wavelength path is described later.

The reallocation target path management database 103 stores a route and a wavelength of the reallocation target wavelength path (a wavelength path before reallocation of a wavelength path required to be reallocated), and, a route and a wavelength of the reallocation destination wavelength path (a wavelength path after reallocation of a wavelength path required to be reallocated), obtained from the wavelength path advance designing function unit 102.

The wavelength path accommodation order determining function unit 104 determines accommodation order in which the reallocation target wavelength path can be changed to the reallocation destination wavelength path. The method for determining the accommodation order is described later.

The accommodation order management database 105 stores accommodation order information determined by the wavelength path accommodation order determining function unit 104.

The path setting function unit 106 establishes/deletes a wavelength path and an upper layer path according to the accommodation order. More specifically, the path setting function unit 106 transmits, to a node apparatus, via the control signal transmit/receive interface 107, a resource assignment message, a communication route setting message or a communication route delete message in order to instruct setting/deletion of the wavelength path and the upper layer path. Also, the path setting function unit 106 transmits, to a node apparatus, via the control signal transmit/receive interface 107, an upper layer path setting message in order to instruct setting/deletion of the wavelength path accommodating the upper layer path. The path setting function unit 106 may include a resource management database (not shown in the figure) for storing information of reservation (assignment) or release (delete) of resources of the wavelength path and the upper layer path.

The control signal transmit/receive interface 107 transmits a control signal to a node apparatus and receives a control signal from a node apparatus.

Figure 5:
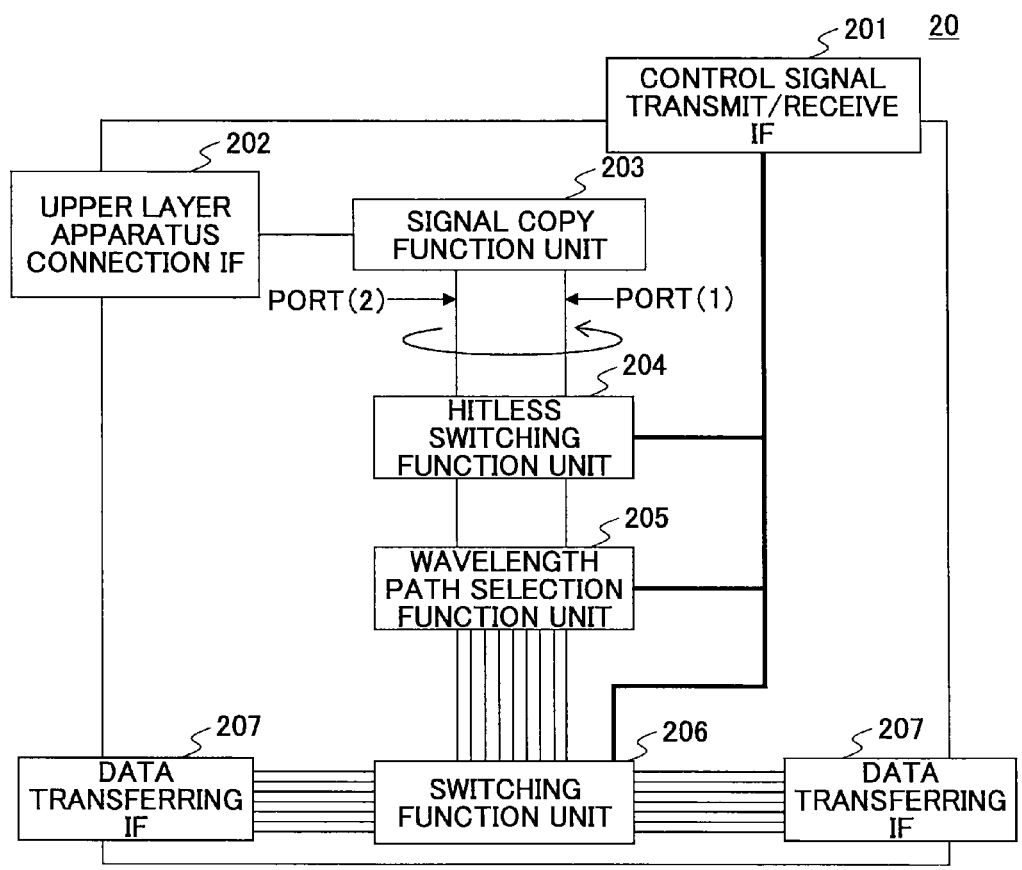
FIG. 5 is a block diagram (1) of a node apparatus according to the first embodiment of the present invention.

FIG. 5 is a block diagram of a node apparatus 20 according to a first embodiment of the present invention. The node apparatus 20 includes a control signal transmit/receive interface 201, an upper layer apparatus connection interface 202, a signal copy function unit 203, a hitless switching function unit 204, a wavelength path selection function unit 205, a switching function unit 206, and a data transferring interface 207.

The control signal transmit/receive interface 201 receives a control signal from the management apparatus, and transmits a control signal to the management apparatus.

The upper layer apparatus connection interface 202 is an interface for connecting to an upper layer apparatus that provides an upper layer path.

The signal copy function unit 203 copies a signal supplied from the upper layer apparatus connection interface 202 and transmits copied signals from two ports.

The hitless switching function unit 204 performs phase synchronization for the two signals supplied from the signal copy function unit 203, and performs switching without instantaneous interruption.

The wavelength path selection function unit 205 selects a wavelength path (wavelength) for accommodating an upper layer path based on the control signal transmitted from the control signal transmit/receive interface 201.

The switching function unit 206 sets/deletes a wavelength path based on the control signal transmitted from the control signal transmit/receive interface 201.

The data transferring interface 207 transfers data to another node.

Figure 6:
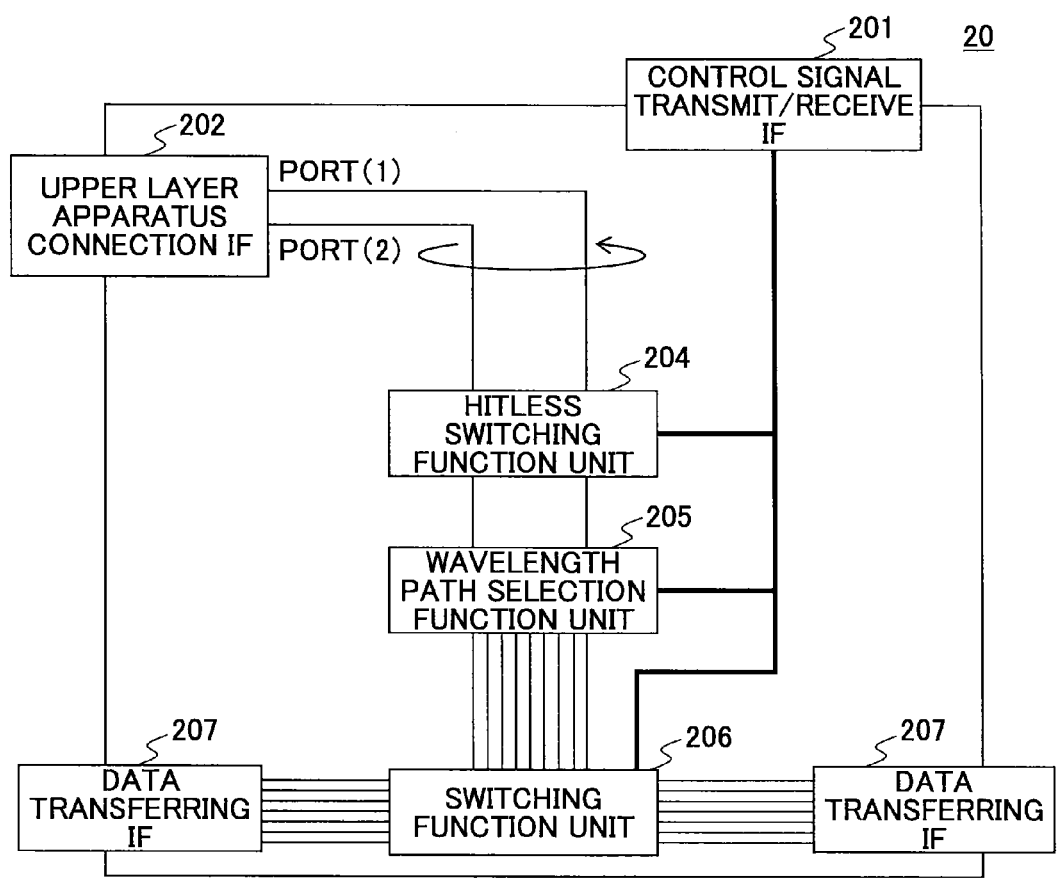
FIG. 6 is a block diagram (2) of a node apparatus according to the first embodiment of the present invention.

Also, as shown in FIG. 6, the same data may be output from the two ports of the upper layer apparatus connection interface 202 without copying the signal by the signal copy function unit 203. In this case, the signal copy function unit 203 may not be included in the node apparatus.

Next, a node apparatus in the distributed control scheme is described.

Figure 7:
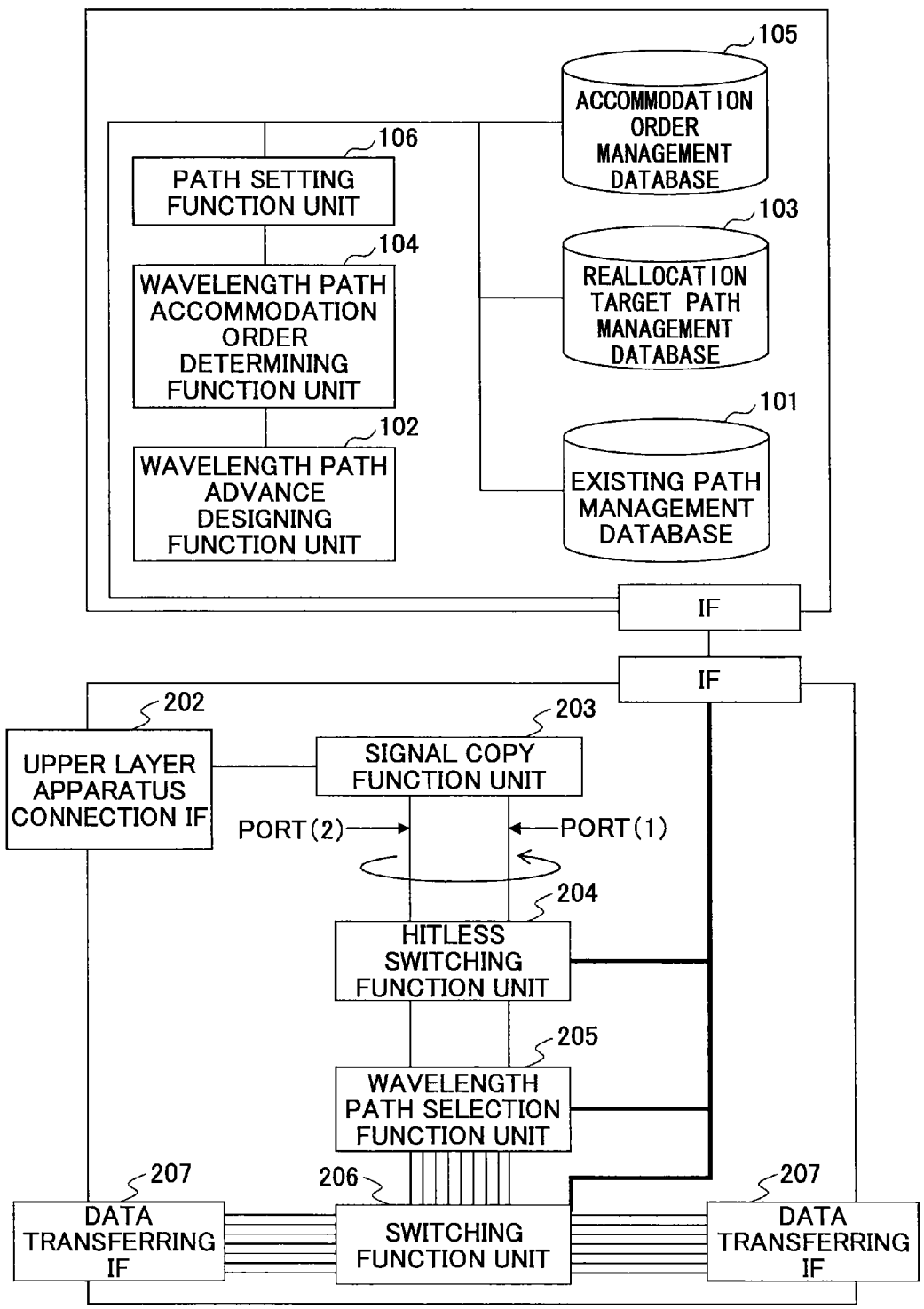
FIG. 7 is a block diagram of a node apparatus according to the first embodiment of the present invention (distributed control scheme)

FIG. 7 shows a node apparatus in the distributed control scheme. In the case of the distributed control scheme, each node apparatus includes each management function unit of the management apparatus shown in FIG. 4. For example, as shown in FIG. 7, each management function unit of the management apparatus shown in FIG. 4 may be included in the node apparatus shown in FIG. 5. In the same way, each management function unit of the management apparatus shown in FIG. 4 may be included in the node apparatus shown in FIG. 6. The control information transmit/receive interface of the node apparatus in FIG. 5 or FIG. 6 becomes an interface for connecting to each management function unit. The path setting function unit 106 may includes resource management database (not shown in the figure) for storing information of reservation (assignment) or release (delete) of resources of the wavelength path and the upper layer path.

Next, a method is described for designing a reallocation destination of a wavelength path in the wavelength path advance designing function unit 102. This designing method may be carried out online beforehand. In this example, the route and the wavelength of the reallocation destination wavelength path are designed beforehand using integer linear programming (ILP).

The wavelength path advance designing function unit 102 calculates a route and a wavelength of a wavelength path that minimize the following objective function.

$$\text{minimize}\left(\sum_{(s,d)\in V}\sum_{(i,j)\in E}\sum_{w\in W} w \cdot p_{ijw}^{sd}\right) \quad (1)$$

This objective function is a function for minimizing the sum of products of wavelength number and the number of wavelengths that are used, that is, a function for minimizing the number of use frequency regions. That is, this function is intended to use wavelengths in order from a small wavelength number as much as possible so as to decrease the number of wavelengths in use. In the function, $p_{ijw}^{sd}$ indicates a variable indicating whether a wavelength w is used or not. If the wavelength w is used in each physical link (i, j) from the start point s to the end point d, $p_{ijw}^{sd}=1$. If the wavelength w is not used, $p_{ijw}^{sd}=0$. V is a set of nodes, E is a set of links, W is a set of wavelengths (w=0, 1, 2, 3, ..., $W_{MAX}$), and $W_{MAX}$ is the maximum wavelength multiplexing number. These are predetermined parameters.

For calculating the objective function (1), following constraint conditions are used.

$$\begin{cases}\sum_{(i,j)\in E} p_{ijw}^{sd} - \sum_{(j,k)\in E} p_{jkw}^{sd} = \begin{cases}-\lambda_w^{sd}; \text{if } j=s \\ \lambda_w^{sd}; \text{if } j=d \\ 0; \text{otherwise}\end{cases} \\ ; \forall (s,d)\in V, \forall w\in W\end{cases} \quad (2)$$

$$\sum_{(s,d)\in V}\sum_{w\in W} p_{ijw}^{sd} \leq W_{MAX}; \forall (i,j)\in E. \quad (3)$$

$$\sum_{(s,d)\in V} p_{ijw}^{sd} \leq 1; \forall (i,j)\in E, \forall w\in W. \quad (4)$$

$$\sum_{w\in W} \lambda_w^{sd} = D^{sd}; \forall (s,d)\in V. \quad (5)$$

Figure 8:
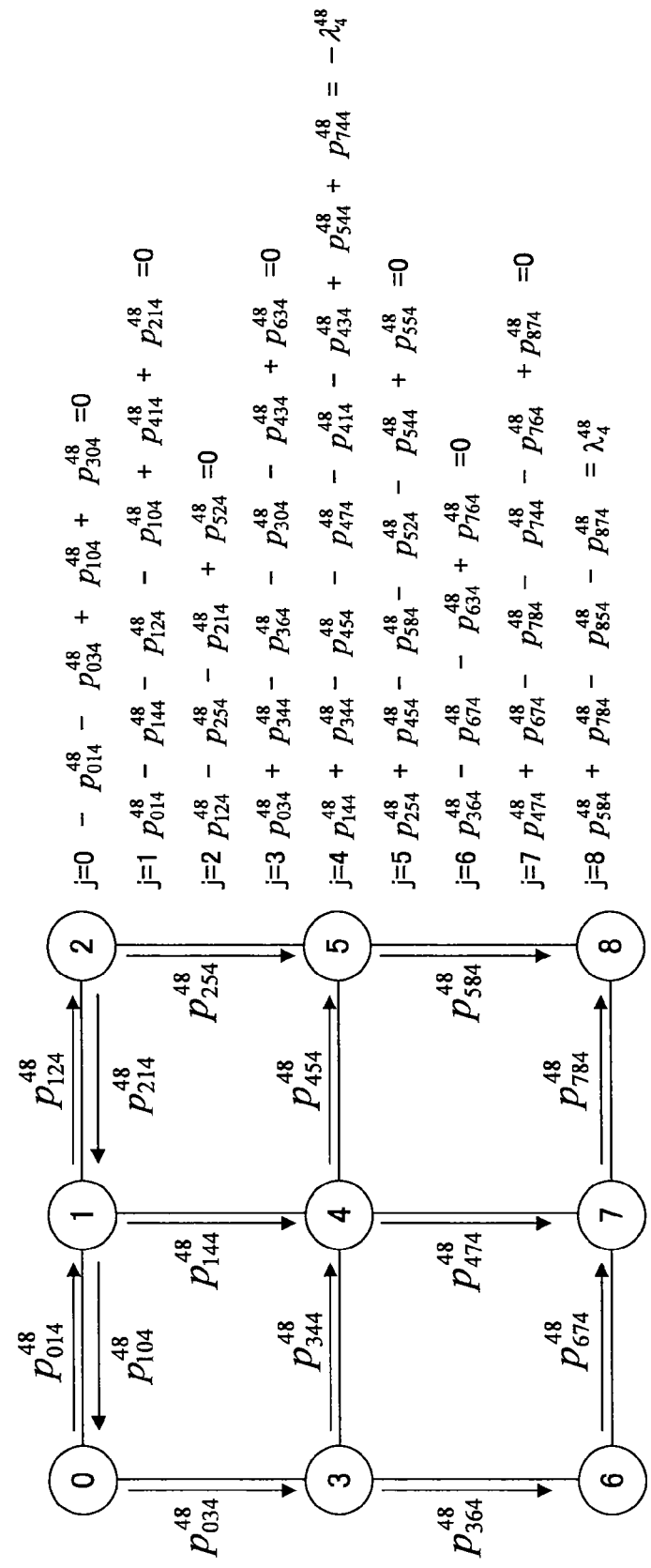
FIG. 8 is a diagram showing a calculation example of a flow preserving equation used in the first embodiment of the present invention.

The constraint condition (2) is an equation (refer to non-patent document 2) representing a traffic flow of each link in the start point s, the end point d, and the wavelength w. According to this constraint, it becomes possible to select the same wavelength in the route and the start point and end point nodes of the path. In the equation, $\lambda_w^{sd}$ indicates the number (0~$D^{sd}$) of times the wavelength w is used in routes from the start point s to the end point d. The case of $\lambda_w^{sd}=0$ indicates that the wavelength w is not used in any route from the start point s to the end point d. The case of $\lambda_w^{sd}=1$ indicates that the wavelength w is used in one route from the start point s to the end point d. If i<j, $\Sigma p_{ijw}^{sd}=\Sigma p_{ijw}^{sd}$ holds true and if i>j, $\Sigma p_{ijw}^{sd}=-\Sigma p_{ijw}^{sd}$ holds true. FIG. 8 shows a calculation example of the constraint condition (2). As shown in the figure, $\lambda_w^{sd}$ can be obtained from route and wavelength information of an existing path established in the communication network stored in the existing path management database 101.

The constraint condition (3) is a condition that the total sum of the number of wavelengths of each link is equal to or less that the maximum wavelength multiplexing number $W_{MAX}$.

The constraint condition (4) is a condition such that wavelength collision does not occur, that is, a condition that two or more of the same wavelengths should not be used in the same link.

The constraint condition (5) is a condition that the number of sum of wavelengths used in routes from the start point s to the end point d is the same as the total demand $D^{sd}$ of wavelengths from the start point s to the end point d, in which $D^{sd}$ is the total number of wavelength paths from the start point s to the end point d, and can be obtained from the route and wavelength information of the existing paths stored in the existing path management database 101.

By calculating the objective function (1) by using the constraint conditions (2)-(5), a route and a wavelength $p_{ijw}^{sd}$ of a reallocated wavelength path are output.

In addition to the constraint conditions (2)-(5), one or more of the following constraint conditions (6)-(9) may be used.

$$\sum_{(i,j)\in E} p_{ijw}^{sd} \leq H_{impairment}; \forall (s,d)\in V, \forall w\in W. \quad (6)$$

$$\sum_{(i,j)\in E} p_{ijw}^{sd} \leq H_{sd}; \forall (s,d)\in V, \forall w\in W. \quad (7)$$

$$\sum_{(s,d)\in V}\sum_{(i,j)\in E}\sum_{w\in W} |p_{ijw}^{sd} - p_{0ijw}^{sd}| \leq R\sum_{(s,d)\in V}\sum_{(i,j)\in E}\sum_{w\in W} p_{0ijw}^{sd}. \quad (8)$$

$$0 \leq \sum_{(i,j)\in E} p_{ijw}^{sd} - \sum_{(i,j)\in E} p_{0ijw}^{sd} \leq H_{delay}; \forall (s,d)\in V, \forall w\in W. \quad (9)$$

The constraint condition (6) is a condition that the total of the number of hops from the start point s to the end point d is equal to or less the maximum number of hops $H_{impairment}$. $H_{impairment}$ is the maximum number of hops by which transmission is available, and is a predetermined parameter.

The constraint condition (7) is a condition that the total of the number of hops from the start point s to the end point d is equal to or less than the number of transmission hops $H_{sd}$ that is set for each pair of nodes of the start point s and the end point d, in which $H_{sd}$ indicates the number of transmission hops in a path from the start point s to the end point d, and is a predetermined parameter.

The constraint condition (8) is a condition that the number of wavelengths to be reallocated does not exceed a predetermined ratio R of the total of the number of existing wavelengths. That is, the constraint condition (8) is a condition that the number of wavelengths of reallocation target does not exceed a predetermined condition. R is a ratio of wavelength paths for reallocation, and is a predetermined parameter.

The constraint condition (9) is a condition that difference between the number of route hops from the start point s to the end point d before reallocation and route hops after reallocation is equal to or less than the number of hops that satisfies the limit $H_{delay}$ of delay difference or distance difference, in which $H_{delay}$ is the number of hops that satisfies the permitted maximum delay difference or distance difference.

By using the constraint condition (6), the number of wavelengths of reallocation target can be restricted. Also, by setting the shortest number of hops in $H_{sd}$ of the constraint condition (7) beforehand, a wavelength path of the shortest route can be calculated. Also, by the constraint condition (8), it becomes possible to select routes within an allowable range of the buffer memory when switching a path.

The following constraint condition (10) may be used in addition to the constraint condition (2)-(5).

$$\sum_{w \in W} p_{ijw}^{sd} = \sum_{w \in W} p_{0ijw}^{sd}; \forall (s, d) \in V, \forall (i, j) \in E. \quad (10)$$

The constraint condition (10) is a condition that route change is not performed, that is, a condition that the route of the wavelength path before reallocation is the same as the route of the wavelength path after reallocation, in which $p_{0ijw}^{sd}$ is a variable indicating whether the wavelength w is used before reallocation. If the wavelength w is used before reallocation in each physical link (i, j) from the start point s to the end point d, $p_{0ijw}^{sd}=1$ holds true. If the wavelength w is not used before reallocation, $p_{0ijw}^{sd}=0$ holds true. The variable $p_{0ijw}^{sd}$ is stored in the existing path management database 101 as route and wavelength information of the existing wavelength path established in the communication network.

As mentioned above, according to the constraint condition (10), the reallocation destination wavelength path can be calculated without performing route change.

Figure 9B:
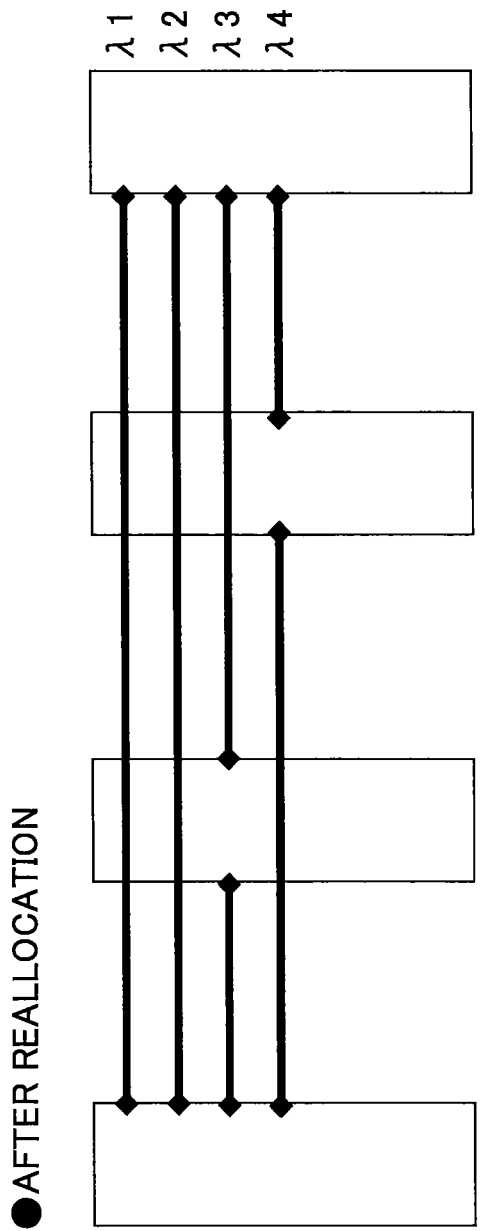
FIG. 9B is a diagram showing wavelength paths after reallocation calculated by the management apparatus according to the first embodiment of the present invention.

The wavelength path advance designing function unit 102 obtains route and wavelength $p_{ijw}^{sd}$ of a wavelength path that minimizes the objective function by using the integer linear programming (ILP), and stores the route and the wavelength of the reallocation target wavelength path, and the route and the wavelength of the reallocation destination wavelength path in the reallocation target path management database 103. The reallocation target wavelength path can be extracted by comparing the route and the wavelength of the wavelength path before reallocation with the route and the wavelength $p_{ijw}^{sd}$ of the wavelength path calculated by the wavelength path advance designing function unit. More specifically, as shown in FIGS. 9A and 9B, in a case where the wavelength and the route are different between before and after reallocation (λ1, λ3, λ5, λ6), the wavelength path becomes a reallocation target wavelength path. In a case where the wavelength and the route are the same between before and after reallocation (λ2, λ4), the wavelength path does not become a reallocation target.

Next, the wavelength path accommodation order determining function unit 104 determines accommodation order of a reallocation target wavelength path. In this example, the wavelength path accommodation order determining function unit 104 determines, beforehand, accommodation order in which the reallocation target wavelength path can be changed to a reallocation target wavelength path by using free wavelengths. More specifically, when changing the reallocation target wavelength path to the reallocation destination wavelength path, the wavelength path accommodation order determining function unit 104 determines whether a wavelength path already exists at the reallocation destination, and if the wavelength path already exists, the wavelength path accommodation order determining function unit 104 determines accommodation order in which the reallocation target wavelength path can be changed to the reallocation destination wavelength path by moving (evacuating) the existing wavelength path to a free wavelength. The accommodation order determination procedure in the wavelength path accommodation order determining function unit 104 is described with reference to FIG. 10.

When N indicates the number of reallocation target wavelength paths calculated by the wavelength path advance designing function unit 102 and stored in the reallocation target path management database 103, N! accommodation orders can be considered. For each of the N! accommodation orders, the wavelength path accommodation order determining unit 104 determines whether the reallocation target wavelength path can be changed to a reallocation destination wavelength path by using a free wavelength, and outputs an accommodation order j in which the change is available to the accommodation order management database 105. The route and wavelength of the reallocation target wavelength path and the route and wavelength of the reallocation destination wavelength path are stored in the reallocation target path management database 103. Further, the free wavelength (the number of free resources in each link, free wavelength number in each link) is stored in the existing path management database 101 as free wavelength information.

First, in step S101, every combination j(1≤j≤N!) of order i(1≤i≤N) of wavelength to be reallocated in N reallocation destination wavelength paths. For example, in the example shown in FIG. 9, N=4. The number of accommodation orders for reallocating the 4 wavelengths is 4!=24. Therefore, in step S101, all combinations (1, 2, 3, 4), (1, 2, 4, 3,), (1, 3, 2, 4), . . . (4, 3, 2, 1) of accommodation orders for reallocating 4 wavelengths (λ1, λ3, λ5, λ6) are obtained, and they are assigned j=1, 2, . . . 24 in the order.

In step S102, calculation is performed from the combination j=1 of the accommodation orders of wavelengths to be reallocated.

In step S103, for every link l in the communication network, the number $U_l$ of use of free wavelength in the link l is set to be $U_l=0$. Then, a number of the wavelength to be reallocated is set to i=1.

In step S104, it is determined whether there is an existing wavelength path at a route $R_{ij}$ and a wavelength $W_{ij}$ of a reallocation destination of a wavelength path of a route $R_{0,ij}$ and a wavelength $W_{0,ij}$, in which $R_{0,ij}$ represents route information of i-th reallocation target wavelength path in the accommodation order j, $W_{0,ij}$ represents wavelength number of i-th reallocation target wavelength path in the accommodation order j, $R_{ij}$ represents route information of i-th reallocation destination wavelength path in the accommodation order j, $W_{ij}$ represents wavelength number of i-th reallocation destination wavelength path in accommodation order j. When there is the existing wavelength path, the process goes to step S105, and when there is not the existing wavelength path, the process goes to step S112.

In step S105, since the reallocation destination wavelength path is used as the existing wavelength path, the wavelength $W_{ij}$ used for the existing wavelength path is temporarily moved (evacuated) to the free wavelength $W_{c,ij}$. More specifically, the wavelength number $W_{c,ji}$ of the change destination is found from free wavelengths of $C_l$, and the wavelength $W_{ij}$ used for the existing wavelength path is changed to the wavelength $W_{c,ij}$ of the change destination of the route $R_{ij}$, in which $C_l$ represents the number of free wavelengths in the link l and $W_{c,ij}$ represents the wavelength number of the change destination of $W_{ij}$ when there is the existing wavelength path for $W_{ij}$. Then, in every link of $R_{ij}$, $U_l$ is set as $U_l+1$ ($U_l \rightarrow W_l+1$).

In step S106, for every link in the communication network, $C_l$ is compared with $U_l$. If $C_l \geq U_l$, since the wavelength $W_{ij}$ used for the existing wavelength path can be temporarily moved (evacuated) to the free wavelength $W_{c,ij}$, the process goes to step S107. If $C_l < U_l$, the process goes to step S109.

In step S107, it is determined whether calculation is performed to the last number wavelength in the accommodation order j (i=N ?). In the case of i=N, it means that calculation has completed to the last number wavelength, and the process goes to step S108. In the case of i≠N, since the calculation is not completed to the last number wavelength, the process goes to step S114.

In step S108, the accommodation order j of the wavelength to be reallocated is output.

In step S109, it is determined whether calculation for all combinations of accommodation orders has competed (j= N! ?). In the case of j=N!, it means that calculation for all combinations of accommodation orders has completed, so that the accommodation order determination procedure ends. In this case, since reallocation is impossible, the wavelength path advance designing function unit needs to perform calculation again by using a restriction of the formula (8), for example. In the case of j≠N!, since calculation for all of the combinations of the accommodation order have not been completed, the process goes to step S110.

In step S110, the wavelength information changed in step S105 is initialized. That is, the wavelength changed to the wavelength $W_{c,ij}$ of the change destination of the route $R_{ij}$ is returned to the original wavelength $W_{ij}$.

In step S111, j→j+1 is carried out and the process returns to step S103.

In step S112, it is determined whether the wavelength $W_{o,ij}$ used for the reallocation target wavelength path is the wavelength $W_{c,ij}$ that is changed in step S105. When the wavelength $W_{o,ij}$ is the wavelength $W_{c,ij}$, $U_l \to U_l-1$ is calculated for every link of the route $R_{ij}$ in $W_{c,ij}$ and the number of free wavelengths $C_l$ is increased by 1 ($C_l \to C_l-1$) in step S113, and the process goes to step S114. When the wavelength $W_{o,ij}$ is not the wavelength $W_{c,ij}$, the process goes to step S114.

In step S114, i is set to i+1 (i→i+1), and the process returns to step S104.

By the above-mentioned process, the accommodation order of the wavelength path is determined, so that the accommodation order j is stored in the accommodation order management database 105. Also, the accommodation order determination procedure of FIG. 10 indicates which free wavelength can be used for changing the reallocation target wavelength path to the reallocation destination wavelength path when the accommodation order is j.

Also, it becomes possible that a wavelength path can be reallocated by using the minimum free resources by adding the following step S105-2 between steps S105 and S106 and adding the following step S107-2 between step S107 and step S108.

In step S105-2, the total sum $\Sigma U_l$ of the use resource $U_l$ of each link is calculated, so as to store the total use resource number $\Sigma U_l$ in the accommodation order of j.

In step S107, it is determined whether calculation completes to the wavelength of the last number in the accommodation order of j (i=N ?). In the case of i=N, it means that the calculation has completed to the wavelength of the last number, so that the process goes to step S107-2. In the case of i≠N, since calculation has not completed to the wavelength of the last number, the process goes to step S114. In this case, i is set to i+1 (i→i+1) in step S114, and the process returns to step S103.

In step S107-2, it is determined whether calculation completes for every combination j of the accommodation orders (j=N! ?). In the case of j=N!, it means that the calculation has completed for every combination j of the accommodation orders, so that an accommodation order j by which $U_l$ is the smallest stored in step S105-2 is output in step S108. When j≠N!, since the calculation has not completed for every combination j of the accommodation orders, the process returns to step S103.

Next, the path setting function unit 106 sets a wavelength path based on the accommodation order j determined by the wavelength path accommodation order determining function unit 104. A wavelength path setting procedure in the path setting function unit 106 is described with reference to FIG. 11. The path setting function unit 106 changes the reallocation target wavelength path to the reallocation destination wavelength path by using a free wavelength. The route and wavelength of the reallocation target wavelength path and the route and wavelength of the reallocation destination wavelength path are stored in the reallocation target path management database 103. In addition, free wavelengths (free wavelength numbers in each link) are stored in the existing path management database 101 as free wavelength information. In addition, route and wavelength information of wavelength paths accommodating upper layer paths, and granularity of the upper layer paths are stored in the existing path management database 101.

In step S201, the accommodation order j determined by the wavelength path accommodation order determining function unit 104 is obtained. First, i is set to 1 (i=1).

In step S202, it is determined whether there is an existing wavelength path at a route $R_{ij}$ and a wavelength $W_{ij}$ of a reallocation destination of the wavelength path of a route $R_{o,ij}$ and a wavelength $W_{o,ij}$, in which $R_{o,ij}$ indicates route information of an i-th reallocation target wavelength path of an accommodation order j, indicates a wavelength number of an i-th reallocation target wavelength path in the accommodation order j, $R_{ij}$ indicates route information of an i-th reallocation destination wavelength path in the accommodation order of j, and $W_{ij}$ indicates a wavelength number of an i-th reallocation destination wavelength path in the accommodation order of j. When there is the existing wavelength path, the process goes to step 208. When there is not the existing wavelength path, the process goes to step S203.

In step S203, since the reallocation destination wavelength path is a free wavelength, a wavelength path is set by using the route $R_{ij}$ and the wavelength $W_{ij}$ of the reallocation destination wavelength path.

In step S204, an upper layer path having the same granularity (and the same client information) as that of an upper layer path accommodated in the reallocation target wavelength path is accommodated in the reallocation destination wavelength path set in step S203.

In step S205, the reallocation target wavelength path of the route $R_{o,ij}$ and the wavelength $W_{o,ij}$ is deleted.

In step S206, it is determined whether reallocation for every reallocation target wavelength path completes. If every reallocation completes, the wavelength path setting procedure ends. If every reallocation has not completed, i+1 is set to i (i→i+1) in step S207, and the process returns to step S202.

In step S208, since the reallocation destination wavelength path is used for the existing wavelength path, the wavelength $W_{ij}$ used as the existing wavelength path is temporarily moved to the free wavelength $W_{c,ij}$. More specifically, a wavelength path is set to the free wavelength $W_{c,ij}$.

In step S209, an upper layer path having the same granularity (and the same client information) as that of an upper layer path accommodated in the wavelength path existing in the reallocation destination route $R_{ij}$ and wavelength $W_{ij}$ is accommodated in the wavelength path set in step S208.

In step S210, the wavelength path of the route $R_{ij}$ and the wavelength $W_{ij}$ used for the existing wavelength path in the reallocation destination is deleted.

In step S211, since the wavelength $W_{ij}$ is changed to the wavelength the $W_{c,ij}$ wavelength $W_{ij}$ used for the existing wavelength path is changed to the wavelength $W_{c,ij}$ of change destination of the route $R_{ij}$, and the free wavelength number is updated. Then, the process returns to step S202.

Figure 12B:
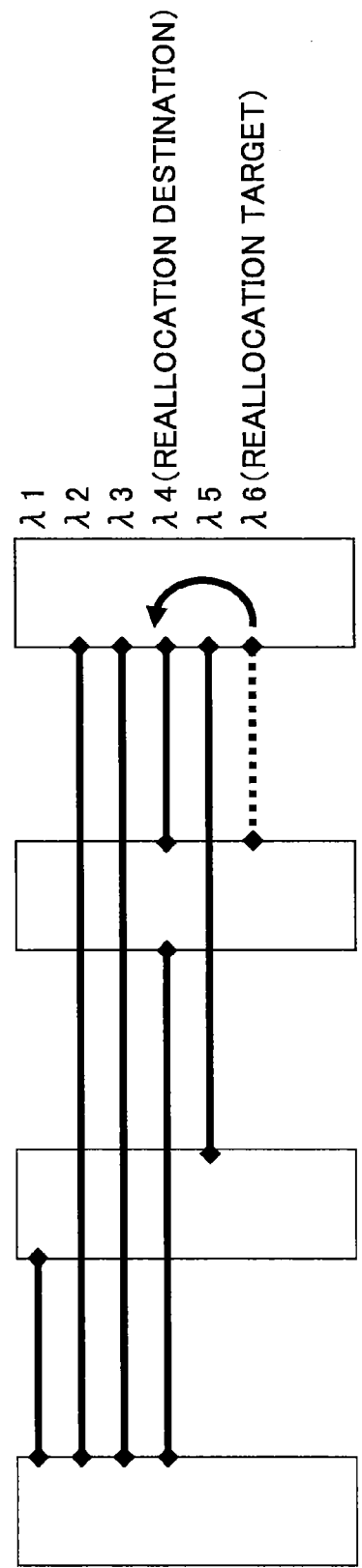
FIG. 12B is a diagram showing reallocation of a wavelength path in the management apparatus according to the first embodiment of the present invention, which shows reallocation of a reallocation target wavelength path.

FIGS. 12A-12E are schematic diagrams showing the above-mentioned reallocation of the wavelength path. As described with reference to FIGS. 9A and 9B, there are four wavelength paths (λ1, λ3, λ5, λ6) of reallocation target (FIG. 12A, before reallocation). In a case where a reallocation destination wavelength path of the reallocation target wavelength path (λ6) is not used, the wavelength path can be changed to the reallocation destination wavelength path. Therefore, as shown in FIG. 12B, the reallocation destination wavelength path is set so as to accommodate an upper layer path that is accommodated in the reallocation target wavelength path (λ6) into the reallocation destination wavelength path. After accommodation of the upper layer path ends, the reallocation target wavelength path (λ6) is deleted.

Figure 12C:
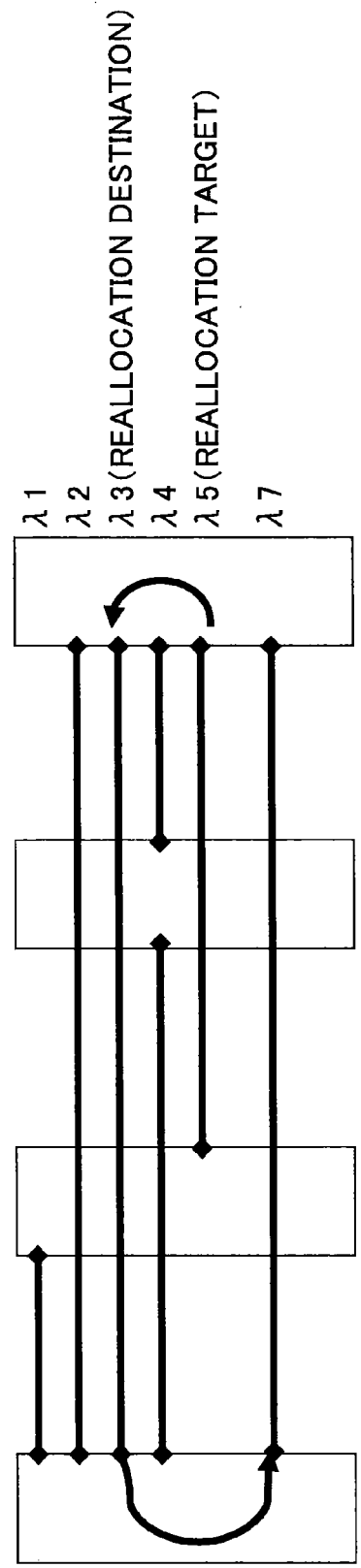
FIG. 12C is a diagram showing reallocation of a wavelength path in the management apparatus according to the first embodiment of the present invention, which shows that an existing path is moved to a free wavelength when there is the existing path at the reallocation destination.
Figure 12D:
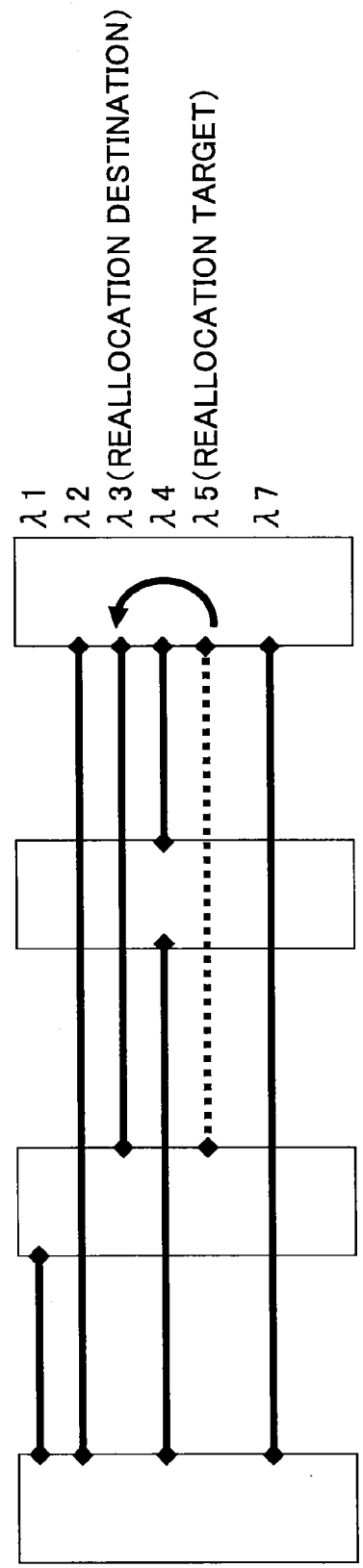
FIG. 12D is a diagram showing reallocation of a wavelength path in the management apparatus according to the first embodiment of the present invention, which shows reallocation of a reallocation target wavelength path.
Figure 12E:
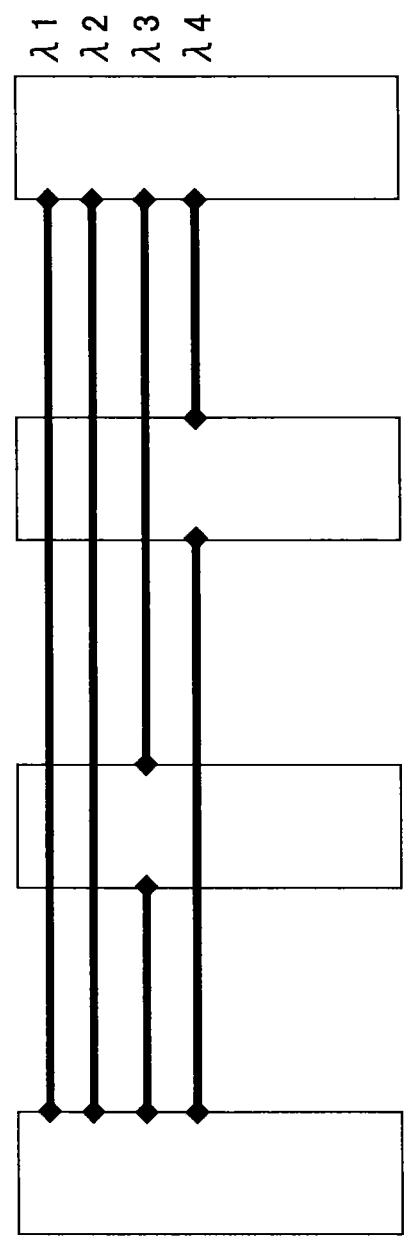
FIG. 12E is a diagram showing reallocation of a wavelength path in the management apparatus according to the first embodiment of the present invention, which shows a state after reallocation.

However, as shown in FIG. 12C, in a case where a reallocation destination wavelength path of the reallocation target wavelength path (λ5) is used for an existing wavelength path, the existing wavelength path (λ2) is moved (evacuated) to a free wavelength (λ7). A wavelength path having a route the same as that of the existing wavelength path (λ2) is set using the free wavelength (λ7), so as to accommodate the upper layer path accommodated in the existing wavelength path (λ2) into the wavelength path (λ7) set in the free wavelength. After accommodation of the upper layer path ends, the existing wavelength path (λ2) is deleted. After that, the reallocation target wavelength path (λ5) is changed to the reallocation destination wavelength path. In the same way, as shown in FIG. 12D, a reallocation destination wavelength path is established so as to accommodate an upper layer path accommodated in the reallocation target wavelength path (λ5) into the reallocation destination wavelength path. After accommodation of the upper layer path ends, the reallocation target wavelength path (λ5) is deleted. The above-mentioned process is repeated by regarding the wavelength path (λ7) set in a free wavelength as a reallocation target wavelength path, so that the reallocation target wavelength path can be changed to the reallocation destination wavelength path without instantaneous interruption.

Figure 13:
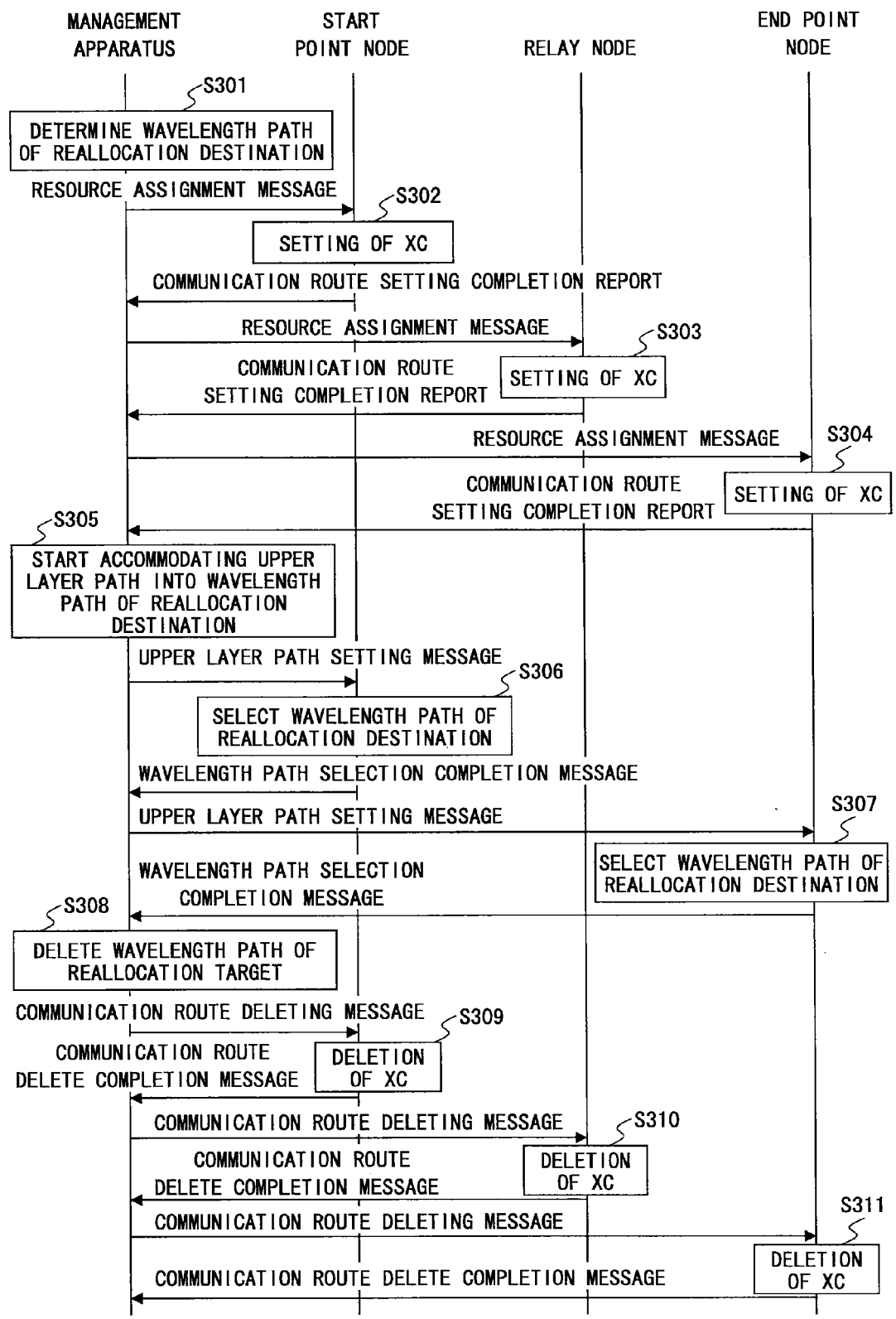
FIG. 13 is a sequence diagram in which a wavelength path is set according to the first embodiment of the present invention (centralized control scheme)

Next, FIG. 13 shows a sequence diagram in which a wavelength path is set from the management apparatus 10 to the node apparatus 20 in the case of the centralized control scheme.

In step s301, the management apparatus 10 determines a route and a wavelength of a reallocation destination wavelength path for a reallocation target wavelength path, and sends a resource assignment message to a start point node. In step S302, the start point node makes settings of cross-connect (XC) based on the transmitted route and wavelength information, and transmits a communication route setting completion report to the management apparatus 10. In the same way, in steps S303 and S304, setting of XC is performed in the relay node and the end point node.

In step S305, when the end point node receives a communication route setting completion report, an upper layer path setting message is transmitted to the start pint node in order to accommodate the upper layer path of the reallocation target wavelength path to the reallocation destination wavelength path. In step S306, the wavelength path selection function unit 205 of the start point node selects the reallocation destination wavelength path, and accommodates a signal of the upper layer path copied by the signal copy function unit 203 in the reallocation destination wavelength path. When all of upper layer paths are accommodated, the start point node transmits a wavelength path selection completion report to the management apparatus. In the same way, in step S307, the end point node selects the reallocation destination wavelength path, and accommodates the signal of the upper layer path in the reallocation destination wavelength path, so as to open the upper layer path.

In step S308, when receiving a wavelength selection completion report for all of the upper layer paths, the management apparatus 10 transmits a communication route delete message to the start point node, the relay node and the end point node. In steps S309, S310 and S311, each of the start point node, the relay node and the end point node deletes XC, and transmits a communication route delete completion report to the management apparatus 10. Accordingly, reallocation of the reallocation target wavelength path ends.

When changing the reallocation target wavelength path to the reallocation destination wavelength path, also in a case where there is an existing wavelength path in the reallocation destination wavelength path, the reallocation target wavelength path can be changed to the existing wavelength path in the same way shown in FIG. 13.

Figure 14:
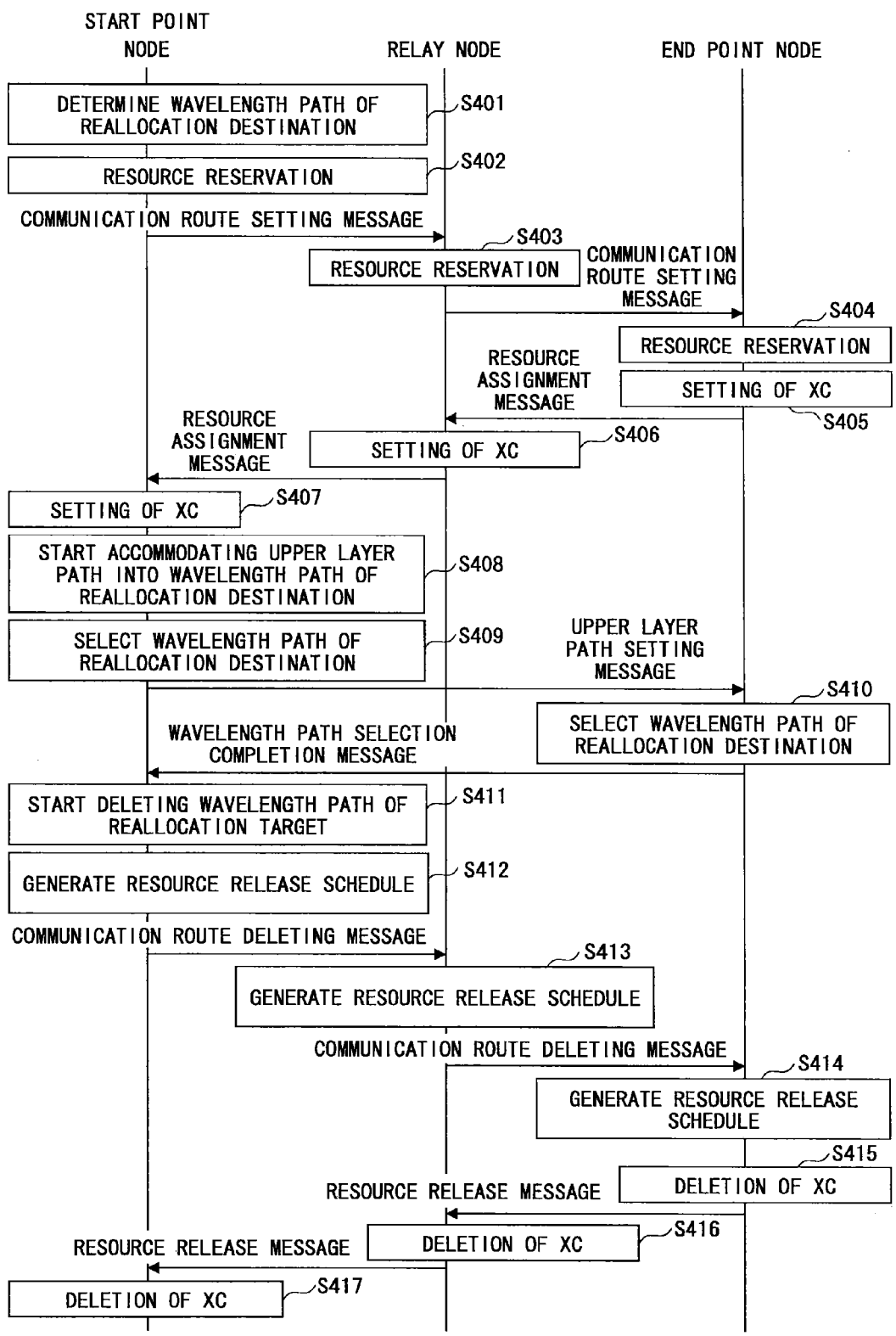
FIG. 14 is a sequence diagram in which a wavelength path is set according to the first embodiment of the present invention (distributed control scheme)

Next, FIG. 14 shows a sequence diagram for setting a wavelength path in a case of the distributed control scheme.

In step S401, the start point node determines a route and a wavelength of a reallocation destination wavelength path for a reallocation target wavelength path. In step 402, the start point node performs resource reservation for the wavelength of the reallocation destination, and transmits a communication route setting message to the relay node for reserving resources for the relay node. In step S403, in the same way, the relay node performs resource reservation for the wavelength of the reallocation destination, and transmits a communication route setting message to the end point node for reserving resources for the end point node. In step S404, the end point node performs resource reservation for the wavelength of the reallocation destination, and performs setting of XC in step S405. After setting of XC ends, the end point node transmits a resource assignment message to the relay node. In step S406, the relay node performs setting of XC, and transmits a resource assignment message to the start point node. In step S407, the start point node performs setting of XC.

In step S408, when setting of XC completes at the start point node, accommodation of the upper layer path to the reallocation destination wavelength path starts. In step S409, the wavelength path selection function unit 205 selects a reallocation destination wavelength path, and accommodates the signal of the upper layer path copied by the signal copy function unit 203 in the reallocation destination wavelength path. After accommodation of all upper layer paths completes, the start point node transmits an upper layer path setting message to the end point node. In the same way, in step S410, the end point node selects a reallocation destination wavelength path, and accommodates a signal of the upper layer path into the reallocation destination wavelength path so as to open the upper layer path. When accommodation of all upper layer paths ends, the end point node transmits a wavelength path selection completion report to the start point node.

In step S411, when receiving a wavelength path selection completion report, the start point node starts to delete the reallocation target wavelength path. In step S412, the start point node generates a schedule for releasing resources of the reallocation target wavelength path, and transmits a communication route delete message to the relay node. In step S413, similarly, the relay node that receives the communication route delete message generates a schedule for releasing resources of the reallocation target wavelength path, and transmits a communication route delete message to the end point node. In step S414, also, the end point node that receives the communication route delete message generates a schedule for releasing resources of the reallocation target wavelength path. In step S415, the end point node deletes XC according to the schedule, and transmits a resource release message to the relay node. In step S416, the relay node deletes XC, and transmits the resource release message to the start point node. In step S417, the start point node deletes XC. Accordingly, reallocation of the reallocation target wavelength path ends.

When changing the reallocation target wavelength path to the reallocation destination wavelength path, even if there is an existing wavelength path at the reallocation destination wavelength path, the reallocation target wavelength path can be changed to the existing wavelength path in the same way as FIG. 14.

Second Embodiment

Figure 15:
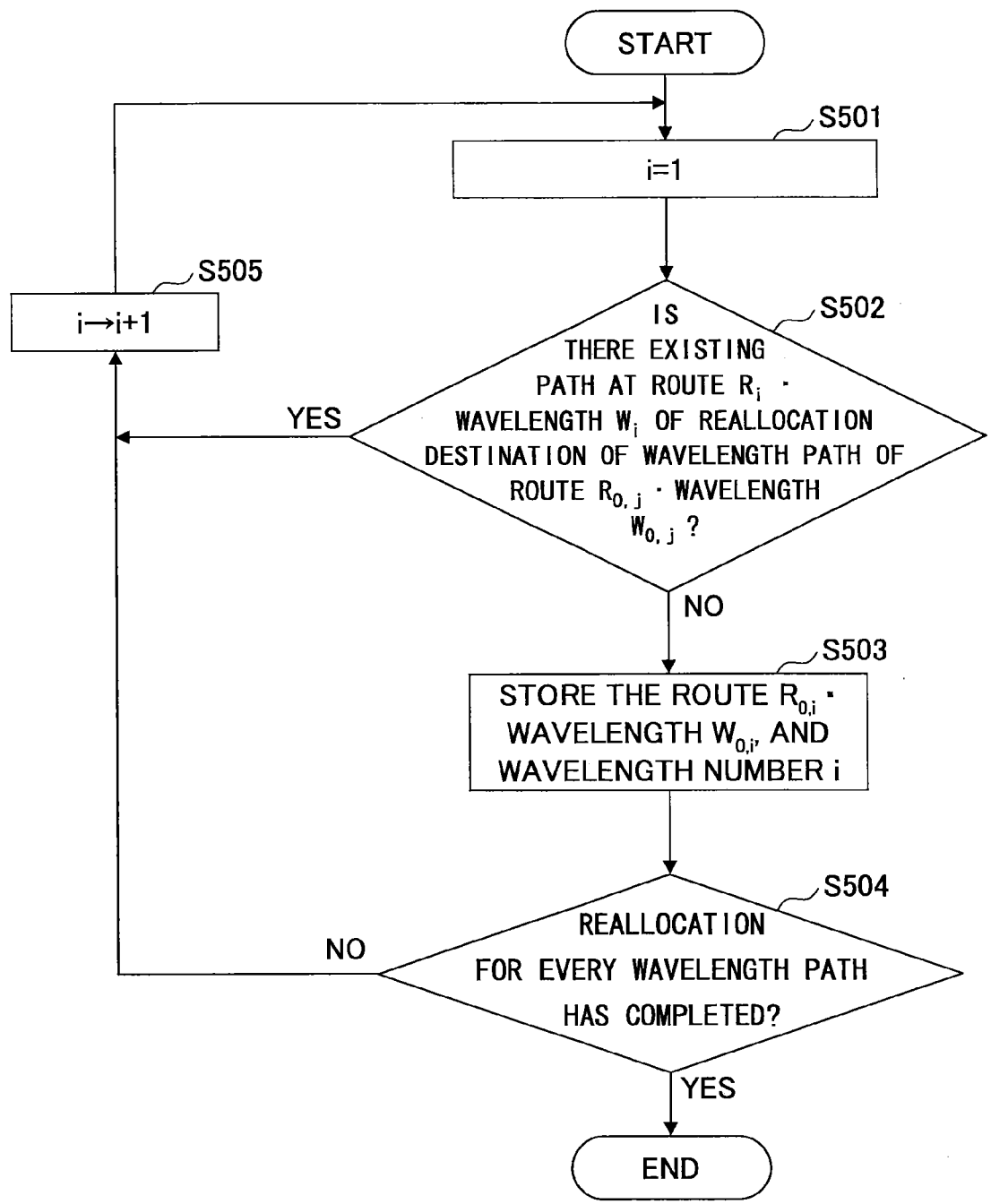
FIG. 15 is a diagram showing an accommodation order determination procedure in the management apparatus according to a second embodiment of the present invention.

In the second embodiment, an accommodation order determination procedure is described with reference to FIG. 15 in which, when reallocating a wavelength path, the wavelength path accommodation order determining function unit 104 determines an accommodation order more easily.

The wavelength path accommodation order determining function unit 104 extracts, from N reallocation target wavelength paths, M wavelengths in which there is no existing wavelength path in the reallocation destination. For example, in the case of FIGS. 9A and 9B, there is no existing wavelength path in a reallocation destination for the reallocation target wavelength path λ7. For other reallocation target wavelength paths, there is an existing wavelength path in a reallocation destination. Therefore, in the case of FIGS. 9A and 9B, M=1. Since the M wavelength paths can be changed as they are to reallocation destination wavelength paths, the number of permutations of wavelengths in the accommodation order determination procedure can be decreased.

More specifically, in step S501, a number of a wavelength to be reallocated is set to 1 (i=1) in the N-M wavelength paths.

In step S502, it is determined whether there is an existing wavelength path at a route $R_i$ and a wavelength $W_i$ of a reallocation destination of a wavelength path of a route $R_{O,i}$ and a wavelength $W_{O,i}$, in which $R_{O,i}$ indicates route information of an i-th reallocation target wavelength path, $W_{O,i}$ indicates a wavelength number of an i-th reallocation target wavelength path of j, $R_i$ indicates route information of an i-th reallocation destination wavelength path, $W_i$ indicates a wavelength number of an i-th reallocation destination wavelength path. When there is the existing wavelength path, i is set to i+1 (i→i+1) in step S505, and the process returns to step S502. When there is no existing wavelength path, the process goes to step S503.

In step S503, since the reallocation destination wavelength path is a free wavelength, the route $R_{O,i}$, the wavelength $W_{O,i}$, and the wavelength number i are stored in the accommodation order management database 105.

In step S504, it is determined whether an accommodation order for every reallocation target wavelength path has been determined (i=N−M ?). When the accommodation order has not been determined for every reallocation target wavelength path, i is set to i+1 (i→i+1) in step S505, and the process returns to step S502. If the accommodation order has been determined for every reallocation target wavelength path, the accommodation order determination procedure ends.

The above-mentioned procedure is performed for every combination j of orders of wavelengths to be reallocated.

According to the above-mentioned steps, the accommodation order of the wavelength path is determined. As mentioned before, in the second embodiment, the range of the number i of the wavelength to be reallocated is 1≤i≤N-M, and the range of j of combinations of orders of wavelengths to be reallocated is 1≤i≤(N-M)!.

Third Embodiment

In the third embodiment, a case where a wavelength path is reallocated is described. In the third embodiment, the path setting function unit 106 sets/deletes a wavelength path and an upper layer path, without determining an accommodation order, by using the route and the wavelength of the wavelength path calculated by the wavelength path advance designing function unit 102 of the first embodiment. For example, in a case where it is known that there are many free wavelengths, a reallocation target wavelength path can be changed to a reallocation destination wavelength path without necessity of determining an accommodation order. In such a case, the path setting function unit 106 can reallocate a wavelength path sequentially without determining the accommodation order beforehand.

Figure 16:
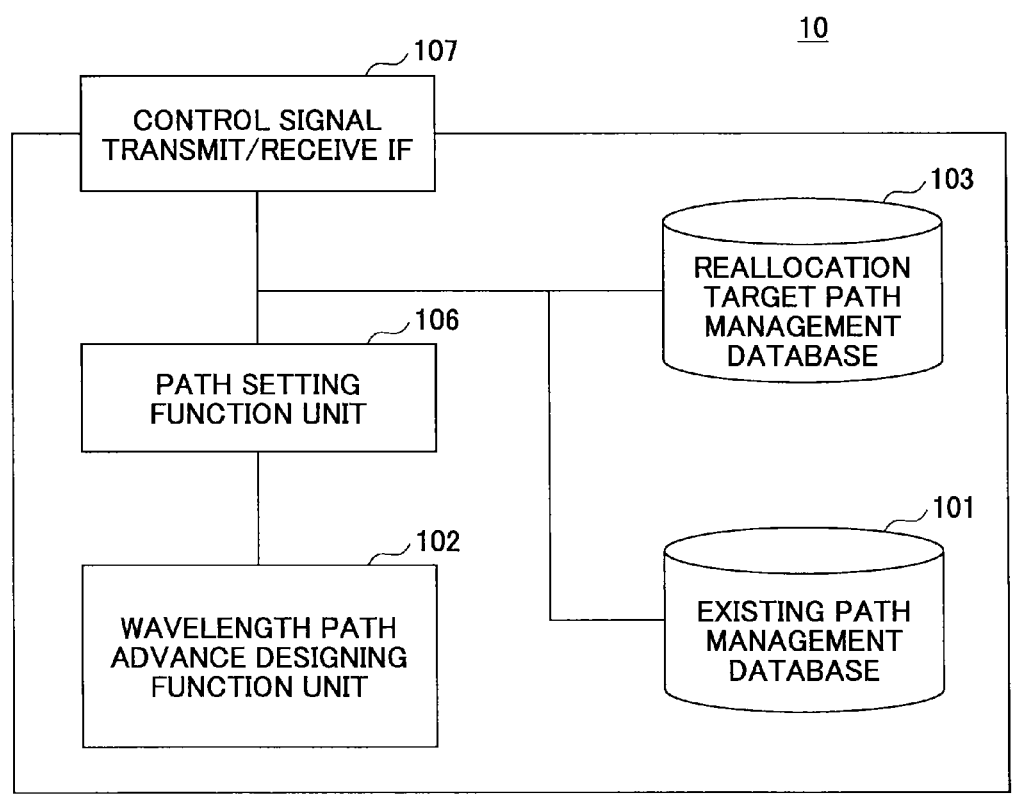
FIG. 16 is a block diagram of a management apparatus according to a third or fourth embodiment of the present invention (centralized control scheme)

FIG. 16 is a management apparatus of the third embodiment, showing an apparatus in which the wavelength path accommodation order determining function unit 104 and the accommodation order management database 105 are removed from the management apparatus of FIG. 3.

Figure 11:
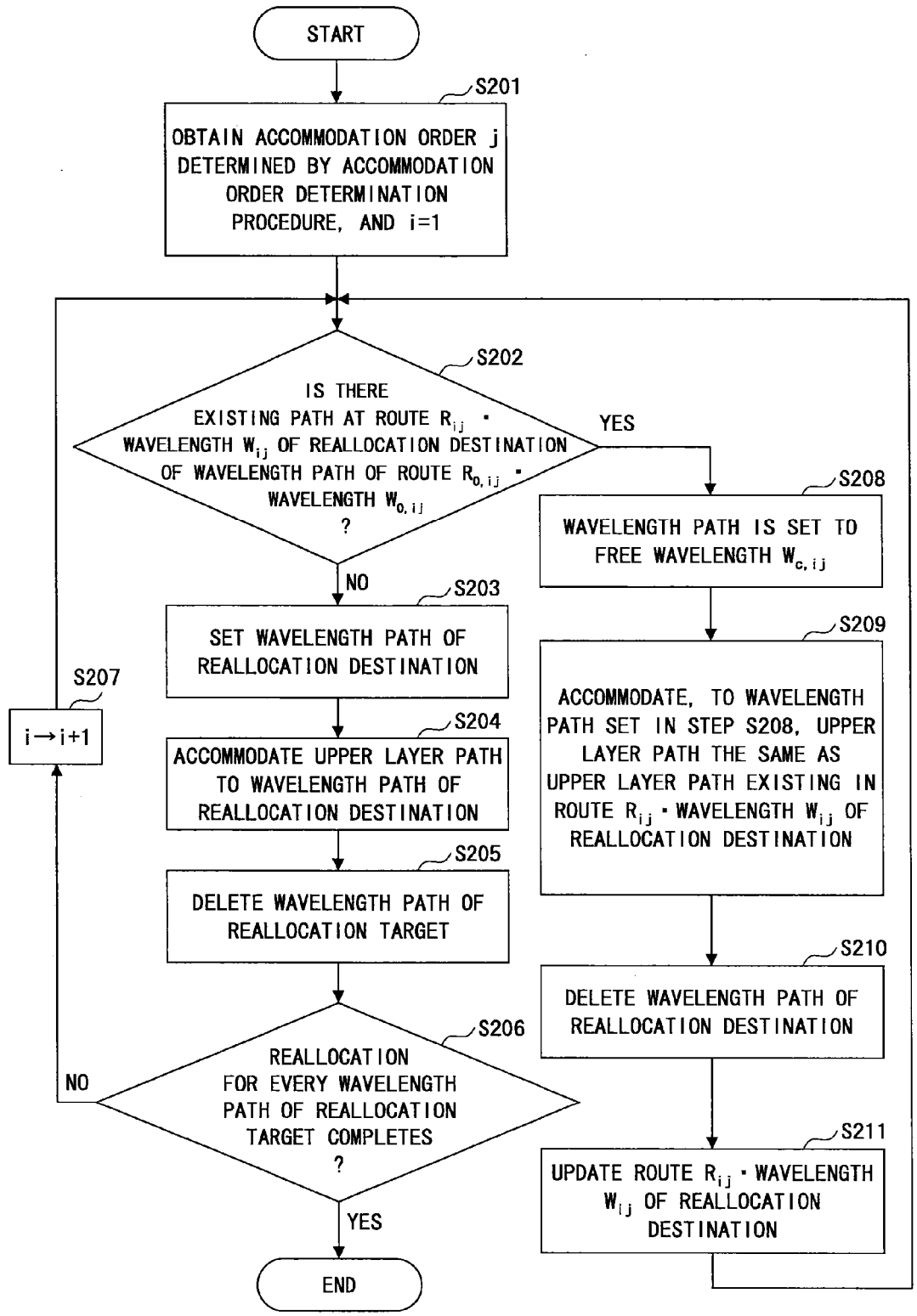
FIG. 11 is a diagram showing a wavelength path setting procedure in the management apparatus according to the first embodiment of the present invention.

The method for designing a reallocation destination of a wavelength path in the wavelength path advance designing function unit 102 is the same as that of the first embodiment. The path setting function unit 106 sets paths in ascending order or descending order of the wavelength number i for N reallocation target wavelength paths calculated by the wavelength path advance designing function unit 102. More specifically, the step S201 of FIG. 11 is changed to "set wavelength path in ascending order or descending order of wavelength number i for N reallocation target wavelength paths". In addition, since j is not used in each step of FIG. 11, the route $R_{O,ij}$ and the wavelength $W_{O,ij}$ are changed to the route $R_{O,i}$ and the wavelength $W_{O,i}$, and the route $R_{ij}$ and the wavelength $W_{ij}$ are changed to the route $R_i$ and the wavelength $W_i$. The sequence diagram for setting a wavelength path for the node apparatus 20 from the management apparatus 10 is the same as that shown in FIGS. 13 and 14.

Fourth Embodiment

In the fourth embodiment, a case where a wavelength path is reallocated is described. In the fourth embodiment, the path setting function unit 106 sets/deletes a wavelength path and an upper layer path, without determining an accommodation order, by using a route and a wavelength of a wavelength path calculated by the wavelength path advance designing function unit 102 of the first embodiment. For example, in a case where it is known that the number of free wavelengths is greater than the number of reallocation target wavelength paths, the reallocation target wavelength path can be changed to a reallocation destination wavelength path without necessity of determining the accommodation order. In such a case, the path setting function unit 106 can reallocate a wavelength path sequentially without determining the accommodation order beforehand. The management apparatus of the fourth embodiment is similar to the configuration of FIG. 16.

Figure 17A:
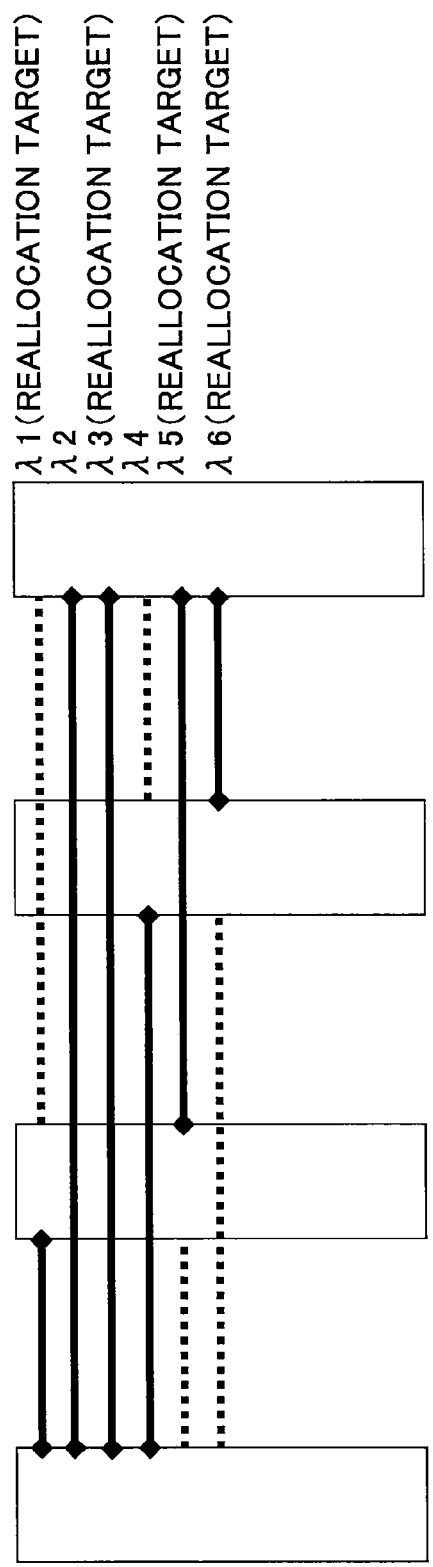
FIG. 17A is a diagram showing reallocation of a wavelength path in the management apparatus according to a fourth embodiment of the present invention, which shows a state before reallocation.
Figure 17B:
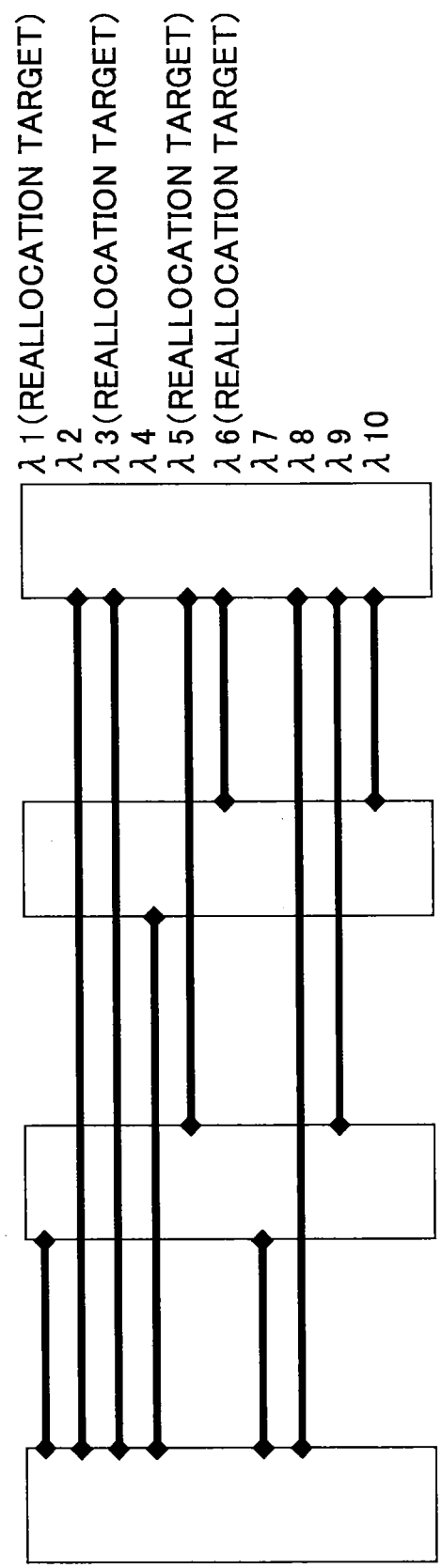
FIG. 17B is a diagram showing reallocation of a wavelength path in the management apparatus according to the fourth embodiment of the present invention, which shows that all reallocation target wavelength paths are set to free wavelengths.
Figure 17C:
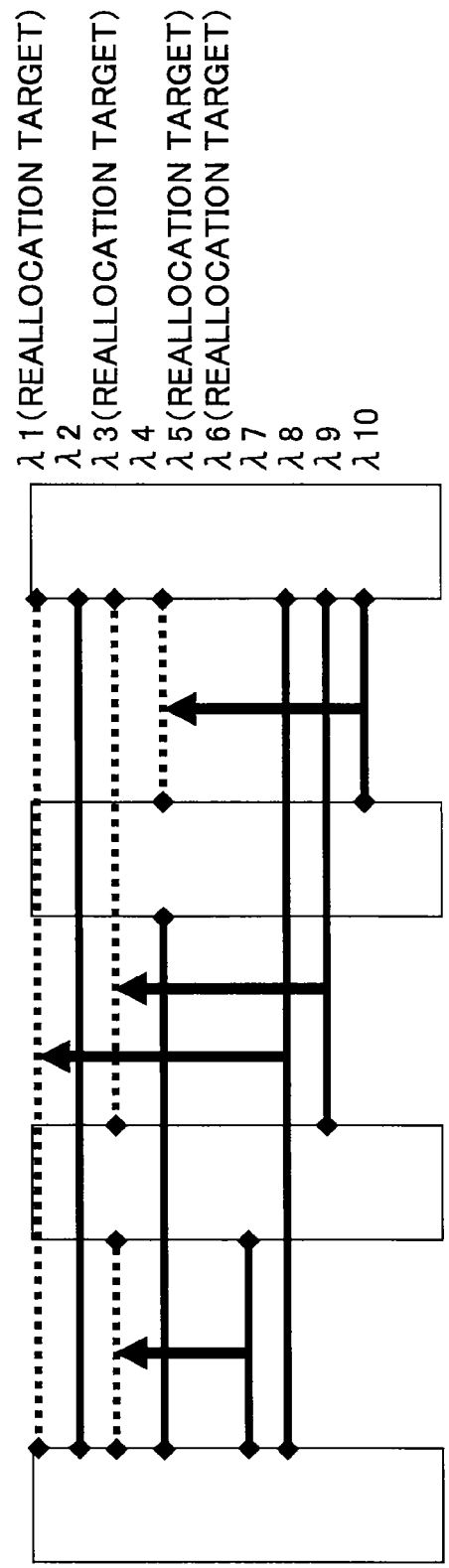
FIG. 17C is a diagram showing reallocation of a wavelength path in the management apparatus according to the fourth embodiment of the present invention, which shows that the reallocation target wavelength path is deleted.
Figure 17D:
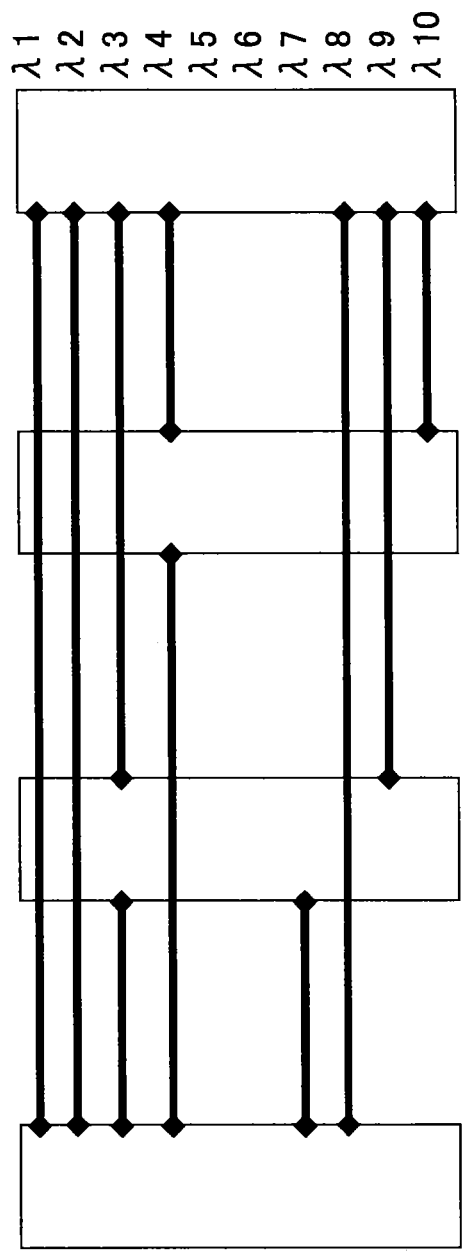
FIG. 17D is a diagram showing reallocation of a wavelength path in the management apparatus according to the fourth embodiment of the present invention, which shows setting a reallocation destination wavelength path.
Figure 17E:
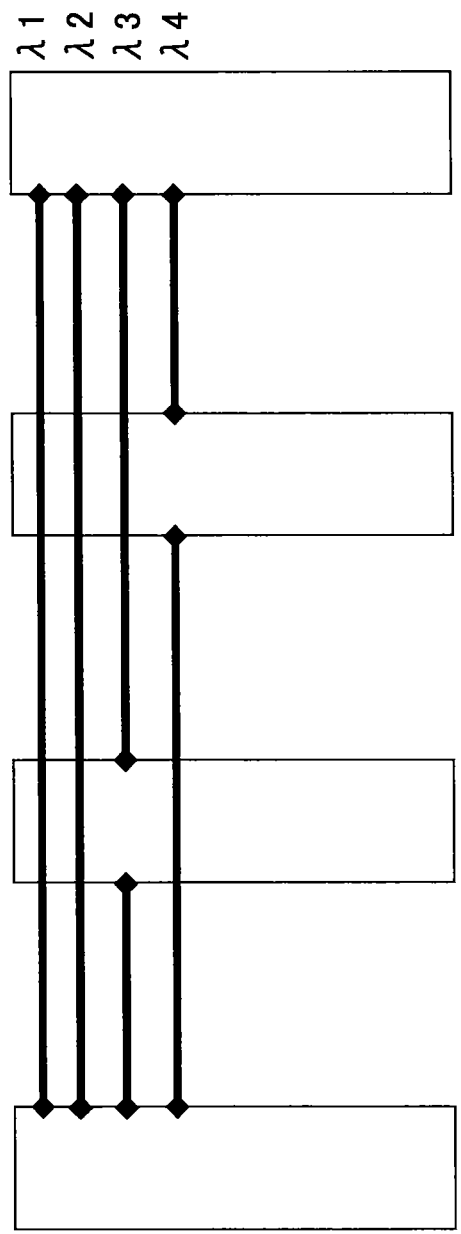
FIG. 17E is a diagram showing reallocation of a wavelength path in the management apparatus according to the fourth embodiment of the present invention, which shows deleting the wavelength path set in the free wavelength.

In the fourth embodiment, as shown in FIGS. 17A and 17B, for example, reallocation target wavelength paths (λ1, λ3, λ5, λ6) are set to free wavelengths (λ7, λ8, λ9, λ10). At this time, upper layer paths are also accommodated in the wavelength paths set to the free wavelength. Next, as shown in FIG. 17C, the reallocation target wavelength paths (λ1, λ3, λ5, λ6) are deleted. Then, as shown in FIG. 17D, reallocation destination wavelength paths are established, and upper layer paths are accommodated in reallocation destination wavelength paths. Finally, as shown in FIG. 17E, the wavelength paths (λ7, λ8, λ9, λ10) set in free wavelengths are deleted.

A wavelength path setting procedure in the path setting function unit 106 is described with reference to FIG. 18.

In step S601, N reallocation target wavelength paths are obtained from the wavelength path advance designing function unit 102. As described before, the N reallocation target wavelength paths can be obtained by comparing between routes/wavelengths of wavelength paths before reallocation and routes/wavelengths of wavelength paths calculated by the wavelength path advance designing function unit 102.

In step S602, N wavelength paths are set to free wavelengths.

In step S603, upper layer paths accommodated in the reallocation target wavelength paths are accommodated in the wavelength paths set in step S602.

In step S604, the reallocation target wavelength paths are deleted.

In step S605, N reallocation destination wavelength paths are set by using routes and wavelengths of wavelength paths calculated by the wavelength path advance designing function unit 102.

In step S606, the upper layer paths set in step S603 are accommodated in the wavelength paths set in step S605.

In step S607, the wavelength paths set in step S602 are deleted.

Modified Example of Fourth Embodiment

In the modified example, a case where a wavelength path is reallocated is described. In the modified example of the fourth embodiment, first, the wavelength path advance designing function unit 102 of the first embodiment performs calculation using the formulas (1)-(5). Since a free wavelength of each link can be obtained from the calculation result, by using the calculation result, the wavelength path advance designing function unit 102 of the first embodiment performs calculation again by adding the following constraint of a formula (18).

$$\sum_{(s,d)\in V} \sum_{w\in W} |p_{ijw}^{sd} - p_{0ijw}^{sd}| \le C_{ij}; \forall\, (i, j) \in E. \quad (18)$$

In the formula, $C_{ij}$ indicates a free wavelength of a link ij. As to the calculation result, the free wavelength is larger the wavelength to be changed, so that reallocation of the wavelength path can be executed with reliability.

The wavelength path setting procedure in the path setting function unit 106 is the same as that of the fourth embodiment, and the description is not given here.

Fifth Embodiment

In the fifth embodiment, a case where a wavelength path is reallocated is described. In the fifth embodiment, the path setting function unit 106 sets/deletes a wavelength path and an upper layer path, without designing a reallocation target wavelength path and a reallocation destination wavelength path beforehand. For example, when the communication network is not complicated, reallocation target wavelength paths can be reallocated sequentially.

Figure 19:
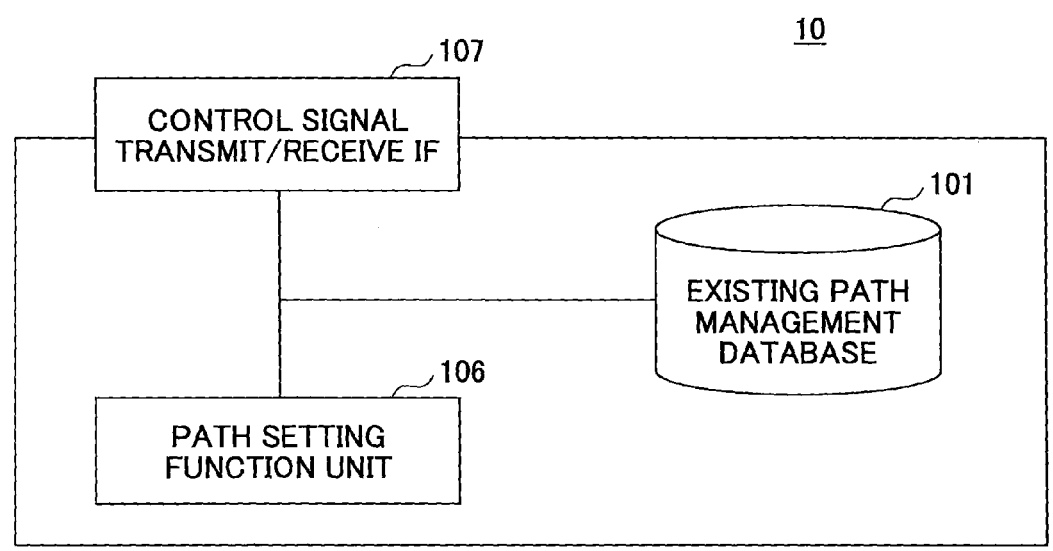
FIG. 19 is a block diagram of a management apparatus of a fifth embodiment of the present invention (centralized control scheme)

FIG. 19 shows a management apparatus of the fifth embodiment, showing an apparatus in which the wavelength path advance designing function 102, the reallocation target path management database 103, the wavelength path accommodation order determining function unit 104 and the accommodation order management database 105 are excluded from the management apparatus of FIG. 4.

Figure 20A:
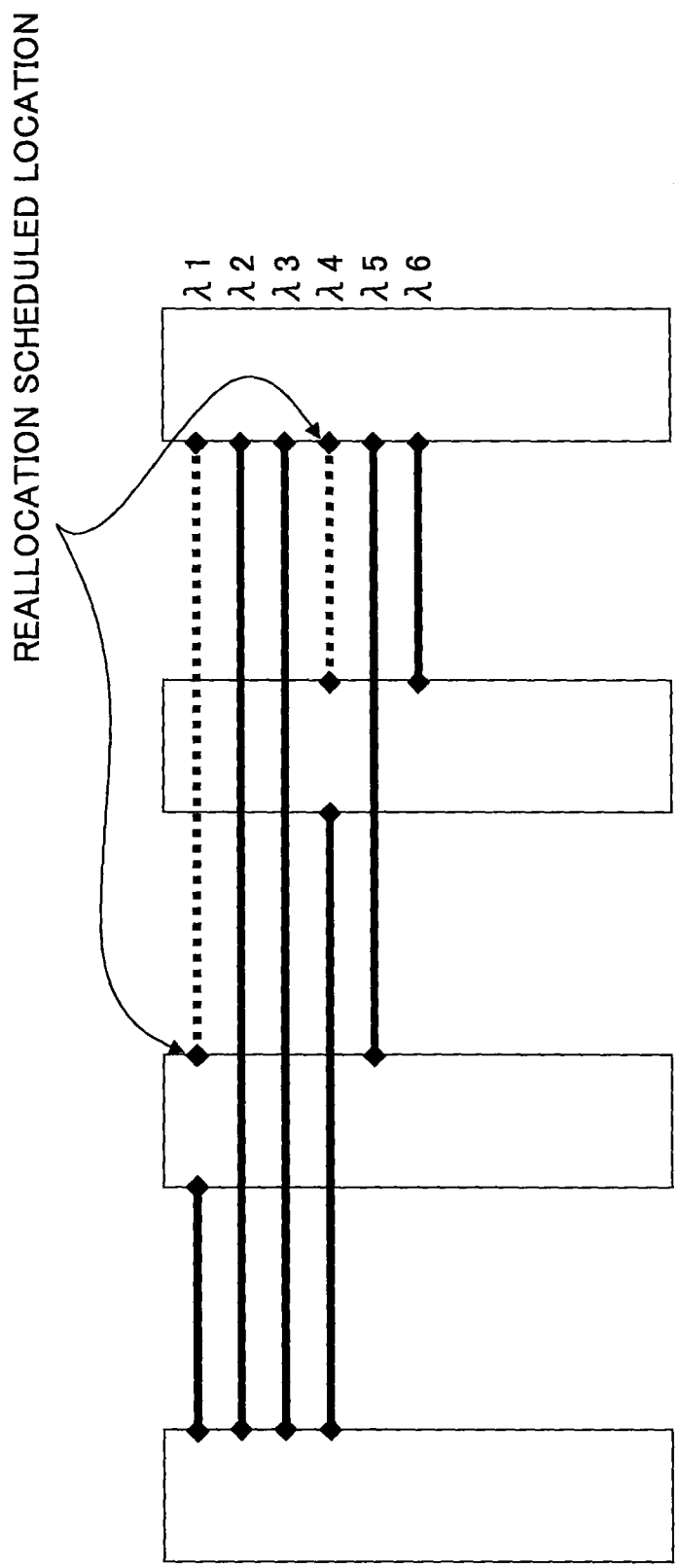
FIG. 20A is a diagram showing reallocation of a wavelength path in the management apparatus according to the fifth embodiment of the present invention, which shows a state before reallocation.
Figure 20C:
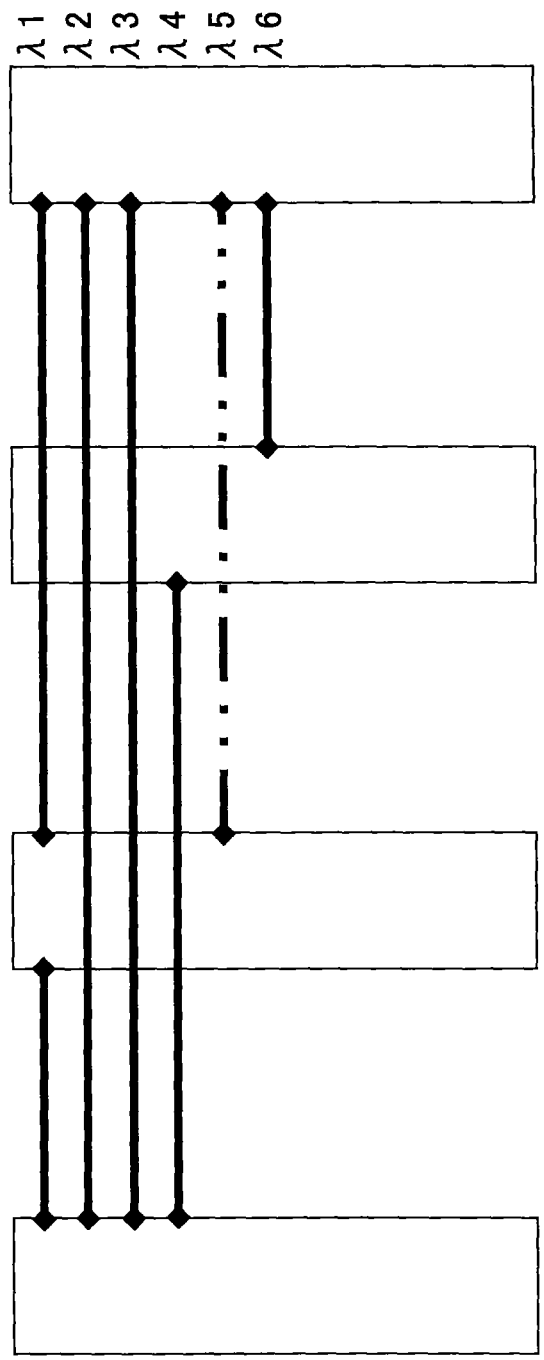
FIG. 20C is a diagram showing reallocation of a wavelength path in the management apparatus according to the fifth embodiment of the present invention, which shows deleting a reallocation target wavelength path.

In the fifth embodiment, as shown in FIGS. 20A-20D, for example, the path setting function unit 106 searches for a route of an unused free wavelength in ascending order or descending order of the wavelength number within the number of use frequency regions. As shown in FIG. 20A, the searched free wavelengths (λ1, λ4) become reallocation scheduled locations. A wavelength path that can be accommodated in the reallocation scheduled location (λ1) is searched for in ascending order or descending order of the wavelength number. As shown in FIG. 20B, when there is a wavelength path (λ5) that can be accommodated in the reallocation scheduled location (λ1), this wavelength path is determined to be a reallocation target wavelength path, and set in the reallocation scheduled location. At this time, an upper layer path accommodated in the reallocation target wavelength path is accommodated in the wavelength path set in the reallocation scheduled location. Then, as shown in FIG. 20C, the reallocation target wavelength path (λ5) is deleted. By repeating the procedure for every wavelength number within the number of the use wavelength regions, reallocation completes. FIG. 20D shows a state after reallocation.

Sixth Embodiment

In the sixth embodiment, a case where an upper layer wavelength path is reallocated is described.

Figure 21:
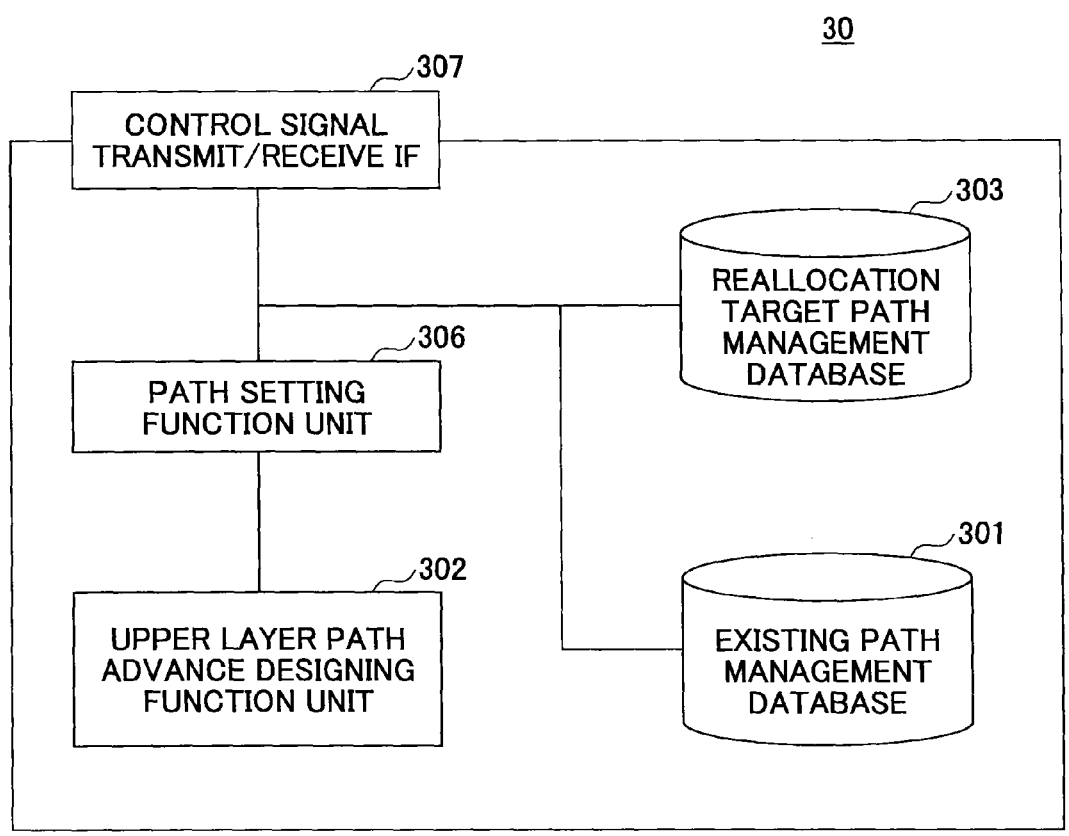
FIG. 21 is a block diagram of a management apparatus of a sixth embodiment of the present invention (centralized control scheme)

FIG. 21 is a block diagram of a management apparatus 30 of the sixth embodiment of the present invention. The management apparatus 30 includes an existing path management database 301, an upper layer path advance designing function unit 302, a reallocation target path management database 303, a path setting function unit 306, and a control signal transmit/receive interface 307.

The existing path management database 301 manages route and wavelength information of existing wavelength paths set in the communication network, free wavelength information of each link in the communication network, route and wavelength information of wavelength paths accommodating upper layer paths, and granularity of each upper layer path. The existing path management database 301 may manage client information (information indicating which upper layer path corresponds to which client).

The upper layer path advance designing function unit 302 designs, in advance, a reallocation target upper layer path and a reallocation destination upper layer path by using information managed in the existing path management database 301. A method for designing a reallocation destination upper layer path is described later.

The reallocation target path management database 303 stores routes and wavelengths of reallocation target upper layer paths (upper layer paths before reallocation of upper layer paths required to be reallocated), and routes and wavelengths of reallocation destination upper layer paths (upper layer paths after reallocation of upper layer paths required to be reallocated), obtained from the upper layer path advance designing function unit 302.

The path setting function unit 306 sets/deletes a wavelength path and an upper layer path. More specifically, the path setting function unit 306 transmits a resource assignment message, a communication route setting message or a communication route delete message to the node apparatus via the control signal transmit/receive interface 307 in order to designate setting/deletion of the wavelength path and the upper layer path. Also, the path setting function unit 306 transmits an upper layer path setting message via the control signal transmit/receive interface 307 to the node apparatus in order to instruct setting/deletion of an accommodation destination wavelength path of the upper layer path. The path setting function unit 206 may include a resource management database (not shown in the figure) for storing information of resource reservation (assignment) or release (deletion) of wavelength paths and the upper layer paths.

The control signal transmit/receive interface 307 transmits a control signal to the node apparatus, and receives a control signal from the node apparatus.

The node apparatus is the same as that in the first embodiment.

Next, a method is described for designing a reallocation destination of an upper layer path in the upper layer path advance designing function unit 302. This designing method may be performed beforehand offline. In this embodiment, a route of a reallocation destination upper layer path is designed beforehand by using the integer linear programming (ILP).

The upper layer path advance designing function unit 302 calculates a route of a wavelength path so as to minimize the following objective function.

$$\text{minimize} \sum_{(s,d) \in V} \sum_{(i,j) \in E} \sum_{w \in W} p_{ijw}^{sd} \quad (11)$$

The objective function (11) is a function for minimizing the number of wavelengths (the total number of wavelengths in the network) used in the communication network, in which $p_{ijw}^{sd}$ is a variable indicating whether a wavelength w is used. If the wavelength w is used in each physical link (i, j) from the start point s to the end point d, $p_{ijw}^{sd}=1$ holds true, and if the wavelength w is not used, $p_{ijw}^{sd}=0$ holds true. V indicates a set of nodes, E indicates a set of links, W indicates a set of wavelengths (w=0, 1, 2, 3, ..., $W_{MAX}$), $W_{MAX}$ indicates the maximum number of wavelength multiplexing. These are predetermined parameters. Also, $p_{ijw}^{sd}$ may be the number of communication apparatuses or the cost of communication apparatuses.

The following constraint conditions are used for calculating the objective function (11).

$$\begin{cases} \sum_{(i,j) \in E} U_{ija}^{sd} - \sum_{(j,k) \in E} U_{jka}^{sd} = \begin{cases} -\delta_a^{sd}; \text{if } j = s \\ \delta_a^{sd}; \text{if } j = d \\ 0; \text{otherwise} \end{cases} \\ ; \forall (s,d) \in V, \forall a \in A \end{cases} \quad (12)$$

$$\sum_{a \in A} G_a \cdot U_{ija}^{sd} \leq C_{ij} \cdot \sum_{w \in W} p_{ijw}^{sd}; \forall (i,j) \in E, \forall (s,d) \in V. \quad (13)$$

$$\sum_{a \in A} \sum_{w \in W} p_{ijw}^{sd} \leq \sum_{(s,d) \in V} \sum_{w \in W} p_{0ijw}^{sd}; \forall (i,j) \in E. \quad (14)$$

$$\sum_{a \in A} \delta_a^{sd} = D_{upper\_traffic}^{sd}; \forall (s,d) \in V. \quad (15)$$

The constraint condition (12) is an equation (refer to non-patent document 2) representing a traffic flow of each link in the start point s, the end point d, and the upper layer path a. In the equation, A is a set of upper layer paths, $U_{ija}^{sd}$ is a variable indicating whether the upper layer path a is used. If the upper layer path a is used in each physical link from the start point to the end point d, $U_{ija}^{sd}=1$ holds true, and if the upper layer path a is not used, $U_{ija}^{sd}=0$ holds true. Also, $\delta_a^{sd}$ indicates whether the upper layer path a is used in a route from the start point s to the end point d. If $\delta_a^{sd}=0$, it indicates that the upper layer path a is not used in the route from the start point s to the end point d, and, $\delta_a^{sd}=1$, it indicates that the upper layer path a is used in the route from the start point s to the end point d. Also, if i<j, $\Sigma U_{ijw}^{sd} = \Sigma U_{ijw}^{sd}$ holds true, and if i>j, $\Sigma U_{ijw}^{sd} = -\Sigma U_{ijw}^{sd}$ holds true.

The constraint condition (13) is a condition that the sum of granularity of upper layer paths in each link is equal to or less than a capacity of the wavelength path, in which $G_a$ indicates a granularity of the upper layer path a, and $C_{ij}$ indicates a capacity in the link (i, j). $G_a$ can be obtained from the granularity of upper layer paths stored in the existing path management database 301.

The constraint condition (14) is a condition that the number of wavelength paths to be used after reallocation is equal to or less than the number of existing wavelength paths, in which $p_{0ijw}^{sd}$ is a variable indicating whether the wavelength w is used before reallocation. If the wavelength w is used before reallocation in each physical link (i, j) from the start point s to the end point d, $p_{0ijw}^{sd}=1$ holds true, and if the wavelength w is not used before reallocation, $p_{0ijw}^{sd}=0$ holds true. $p_{0ijw}^{sd}$ is stored in the existing path management database 301 as route and wavelength information of existing wavelength paths set in the communication network.

The constraint condition (15) is a condition that the total number of the upper layer paths used in the route from the start point s to the end point d is equal to the total number of demands $D_{upper\_traffic}^{sd}$ of the upper layer paths from the start point s to the end point d, in which $D_{upper\_traffic}^{sd}$ is the total number of the upper layer paths from the start point s to the end point d, and can be obtained from route and wavelength information of existing wavelength paths set in the communication network and route and wavelength information of wavelength paths accommodating the upper layer paths that are stored in the existing path management database 301.

By calculating the objective the function (11) by using the constraint conditions (12)-(15), a route $U_{ija}^{sd}$ of the upper layer path after reallocation is output.

In addition to the constraint conditions (12)-(15), one or more of the following constraint conditions (16)-(17) may be used.

$$\sum_{(s,d) \in V} \sum_{(i,j) \in E} \sum_{a \in A} |U_{ija}^{sd} - U_{0ija}^{sd}| \leq R \sum_{(s,d) \in V} \sum_{(i,j) \in E} \sum_{w \in W} U_{0ija}^{sd}. \quad (16)$$

$$0 \leq \sum_{(i,j) \in E} U_{ija}^{sd} - \sum_{(i,j) \in E} U_{0ija}^{sd} \leq H_{delay}; \forall (s,d) \in V, \forall a \in A. \quad (17)$$

The constraint condition (16) is a condition such that the number of reallocation target upper layer paths does not exceed a predetermined ratio R of the total number of existing upper layer paths. That is, the constraint condition (16) is a condition such that the number of reallocation target upper layer paths does not exceed a predetermined threshold, in which R is a ratio of the upper layer paths to be reallocated, and is a predetermined parameter. Also, $U_{0ija}^{sd}$ is a variable indicating whether an upper layer path a is used before reallocation. If the upper layer path a is used in each physical link (i, j) from the start point s to the end point d, $U_{0ija}^{sd}=1$ holds true, and if the upper layer path a is not used before reallocation, $U_{0ija}{}^{sd}=0$ holds true. $U_{0ija}{}^{sd}$ can be obtained from the route and wavelength information of existing wavelength paths set in the communication network and the route and wavelength information of wavelength paths that accommodates the upper layer paths, that are stored in the existing path management database 301.

The constraint condition (17) is a condition that a difference between the number of route hops before reallocation from the start point to the end point d and the number of route hops after reallocation is equal to or less than the number of hops that satisfies a limit $H_{delay}$ of delay difference or distance difference, in which $H_{delay}$ indicates the number of hops satisfying the allowable maximum delay difference or distance difference.

By using the constraint condition (16), the number of reallocation target upper layer paths can be restricted. Also, by using the constraint condition (17), it becomes possible to select routes within an allowable range of buffer memory when switching paths.

The upper layer path advance designing function unit 302 obtains a route $U_{ija}{}^{sd}$ of an upper layer path that minimizes the objective function by the integer linear programming (ILP), and stores, in the reallocation target path management database 303, the route of the reallocation target upper layer path and the route of the reallocation destination upper layer path. The reallocation target upper layer path can be extracted by comparing between the route of the upper layer path before reallocation and the route of the upper layer path that minimizes the objective function.

Figure 22:
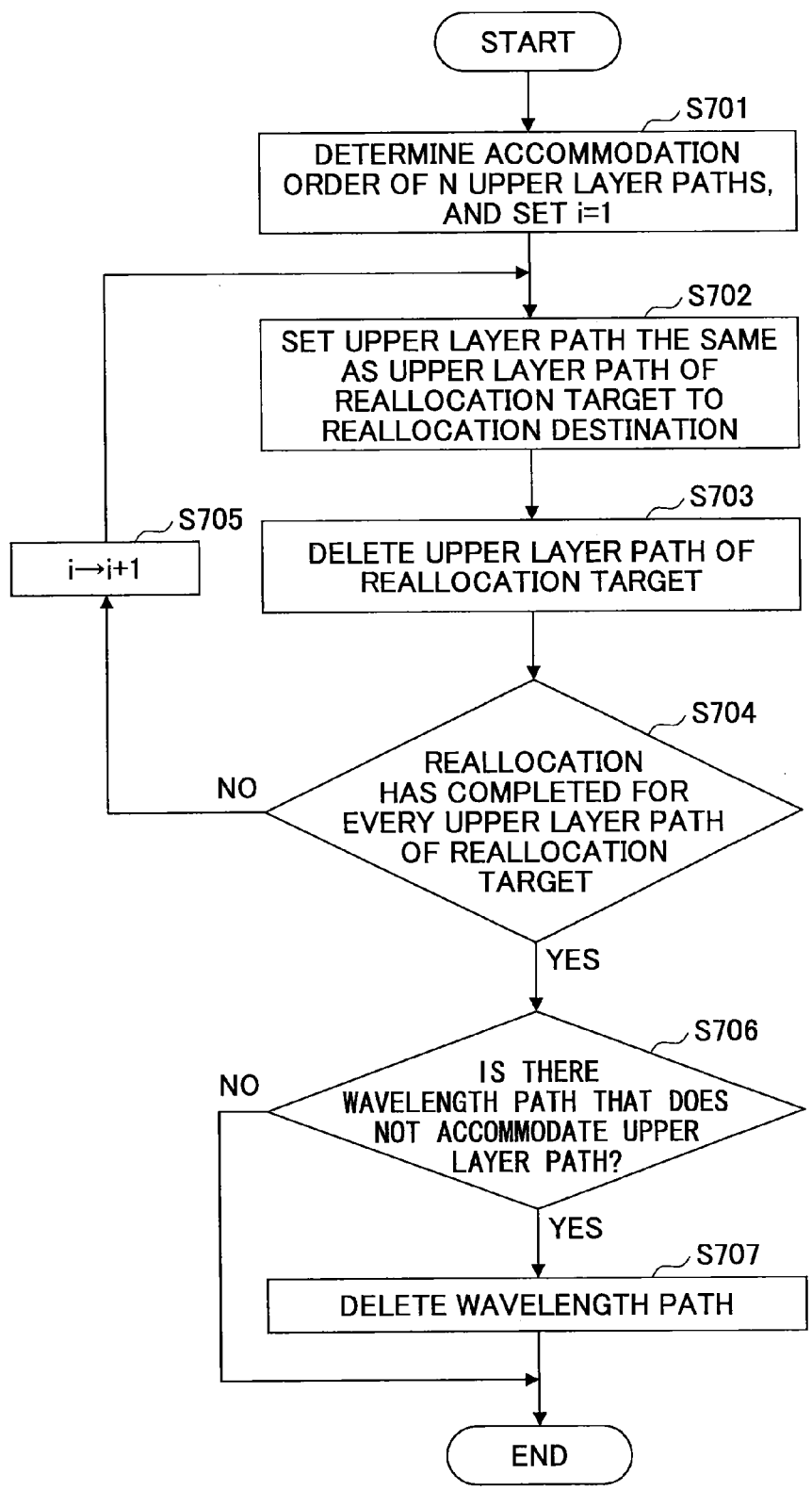
FIG. 22 is a diagram showing an upper layer path setting procedure in the management apparatus according to the sixth embodiment of the present invention.

The path setting function unit 306 changes the reallocation target upper layer path to the reallocation destination upper layer path. Different from the wavelength path, it is not necessary to determine beforehand the accommodation order for the upper layer path. An upper layer path setting procedure by the path setting function unit 306 is described with reference to FIG. 22. The route of the reallocation target upper layer path and the route of the reallocation destination upper layer path are stored in the reallocation target path management database 303. Further, the granularity of the upper layer path is stored in the existing path management database 301.

First, in step S701, an accommodation order of N reallocation target upper layer paths is determined as an arbitrary order. The accommodation order of the upper layer paths may be determined in ascending order of wavelength or descending order of wavelength. In N upper layer paths, the number i of an upper layer path to be reallocated is set to 1 (i=1).

In step S702, an upper layer path the same as the reallocation target upper layer path is set in the reallocation destination.

In step S703, the reallocation target upper layer path is deleted.

In step S704, it is determined whether reallocation has completed for every reallocation target upper layer path (1=N ?). When reallocation has not completed (i≠N), i is set to i+1 in step S705, and the process returns to step S702. When reallocation has completed (i≠N), the process goes to step S706.

In step S706, it is determined whether there is a wavelength path that does not accommodate an upper layer path. When there is the wavelength path, the process goes to step S707, and when the wavelength path does not exist, the upper layer path setting procedure ends.

In step S707, the wavelength path that does not accommodate an upper layer path is deleted.

Figure 23:
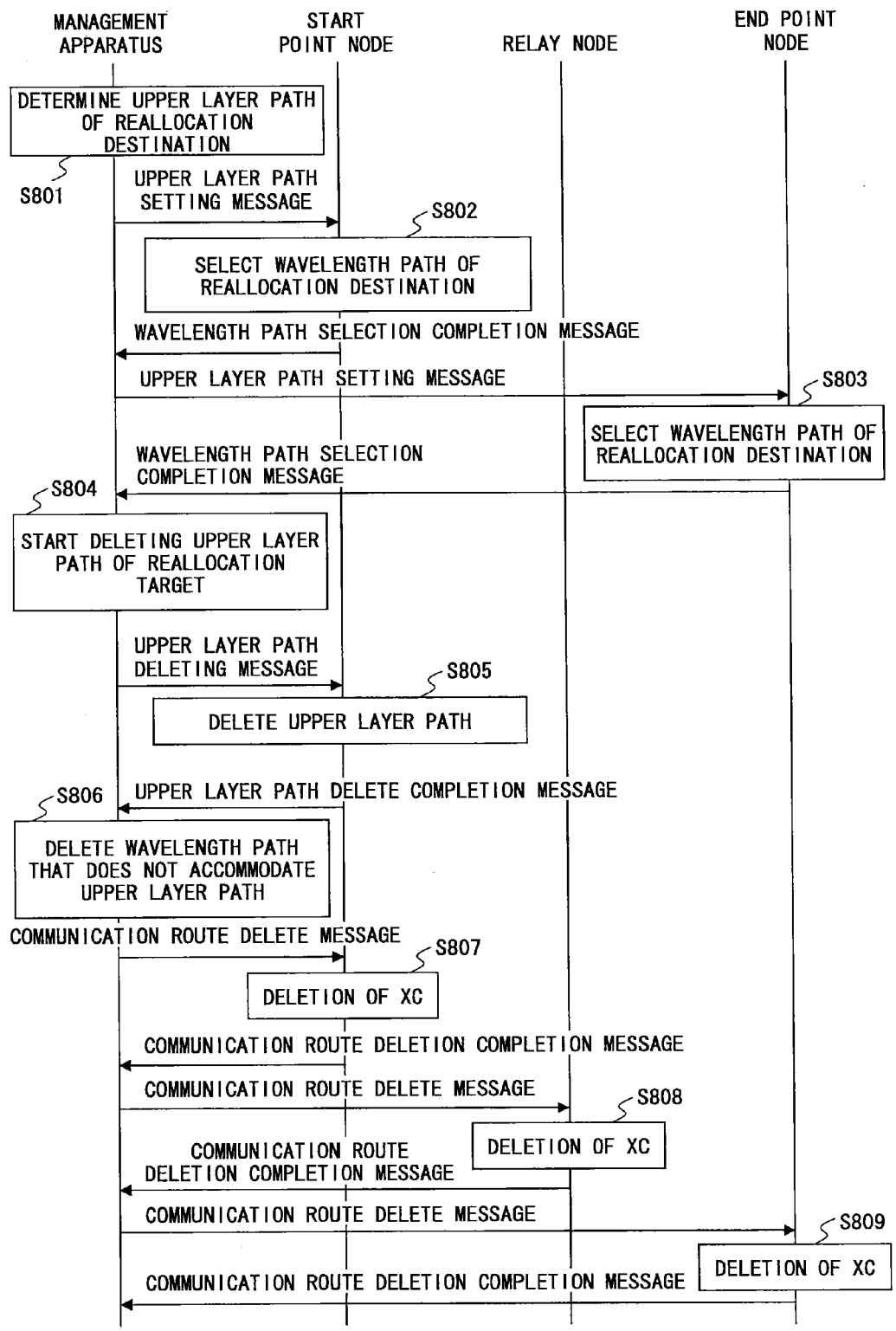
FIG. 23 is a sequence diagram in which an upper layer path is set according to the sixth embodiment of the present invention (centralized control scheme)

Next, FIG. 23 shows a sequence diagram for setting an upper layer path from the management apparatus 30 to the node apparatus 20 in the case of the centralized control scheme.

In step S801, the management apparatus 30 determines a route of a reallocation destination upper layer path for a reallocation target upper layer path, and determines a wavelength path accommodating an upper layer path. The management apparatus 30 transmits an upper layer path setting message to the start point node. In step S802, the wavelength path selection function unit 205 of the start point node selects a reallocation destination wavelength path based on the transmitted route information, and accommodates a signal of the upper layer path copied by the signal copy function unit 203 into the reallocation destination wavelength path. After accommodation of the upper layer path completes, the start point node transmits a wavelength path selection complete report to the management apparatus. In the same way, in step S803, the end point node selects a reallocation destination wavelength path, and accommodates a signal of the upper layer path into the reallocation destination wavelength path so as to open the upper layer path.

In step S804, when receiving the wavelength path selection complete report for every upper layer path, the management apparatus 30 transmits an upper layer path delete message to the start point node in order to delete the reallocation target upper layer path. In step S805, the start point node deletes the upper layer path, and transmits an upper layer path delete completion report to the management apparatus.

In step S806, when receiving the upper layer path delete completion report for every upper layer path, the management apparatus 30 deletes the wavelength path that does not accommodate an upper layer path. Therefore, the management apparatus 30 transmits a communication route delete message to the start point node, the relay node, and the end point node. In steps S807, S808 and S809, the start point node, the relay node and the end point node delete XC, and transmit a communication route delete completion report to the management apparatus 30 respectively. Accordingly, reallocation of the reallocation target upper layer path ends.

Figure 24:
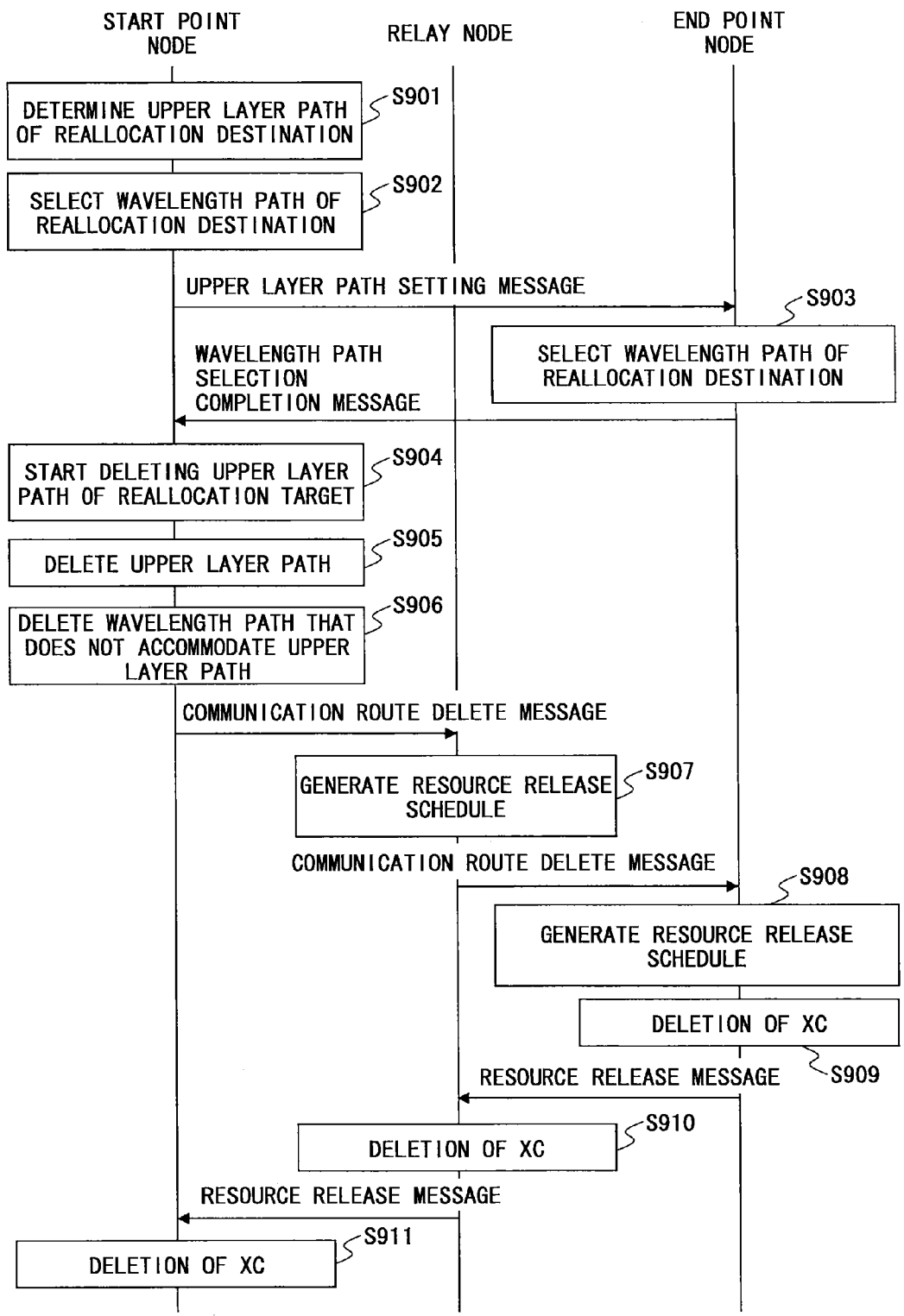
FIG. 24 is a sequence diagram in which an upper layer path is set according to the sixth embodiment of the present invention (distributed control scheme)

Next, FIG. 24 shows a sequence diagram for setting an upper layer path in the case of the distributed control scheme.

In step S901, the start point node determines a route of a reallocation destination upper layer path for a reallocation target upper layer path, and also, determines a wavelength path that accommodates an upper layer path. In step S902, the wavelength path selection function unit 205 of the start point node selects the reallocation destination wavelength path based on determined route information, and accommodates a signal of the upper layer path copied by the signal copy function unit 203 into the reallocation destination upper layer path. When accommodation of the upper layer path completes, the start point node transmits an upper layer path setting message to the end point node. In the same way, in step S903, the end point node selects the reallocation destination wavelength path, and accommodates the signal of the upper layer path in the reallocation destination wavelength path so as to open the upper layer path. When selection of the wavelength path completes, the end point node transmits a wavelength path selection completion report to the start point node.

In step S904, when receiving the wavelength path selection completion report for every upper layer path, the start point node starts to delete the reallocation target upper layer path. In step S905, the start point node deletes the reallocation target upper layer path.

In step S906, when deletion of every upper layer path completes, the end point node starts to delete the wavelength path that does not accommodate an upper layer path. The start point node generates a schedule for releasing resources of the reallocation target wavelength path, and transmits a communication route delete message to the relay node. In step S907, similarly, the relay node that receives the communication route delete message generates a schedule for releasing resources of the reallocation target wavelength path, and transmits a communication route delete message to the end point node. In step S908, the end point node that receives the communication route delete message also generates a schedule for releasing resources of the reallocation target wavelength path. In step S908, the end point node deletes XC according to the schedule, and transmits a resource release message to the relay node. In step S910, the relay node also deletes XC, and transmits the resource release message to the start point node. In step S911, the start point node also deletes XC. Accordingly, reallocation of the reallocation target upper layer path completes.

In a case where an upper layer path is further accommodated in an upper layer path (for example, three 1 G upper layer paths are accommodated in 3 G upper layer path), it becomes possible to reallocate a plurality of upper layer paths by changing "wavelength path" into "upper layer path" in the above-mentioned formulas (11)-(17).

Seventh Embodiment

In the seventh embodiment, a case where a wavelength path is reallocated is described. In the seventh embodiment, the path setting function unit 106 sets/deletes an upper layer path, without designing reallocation target and reallocation destination upper layer paths beforehand. For example, when the communication network is not complicated, reallocation target upper layer paths can be reallocated sequentially.

Figure 25:
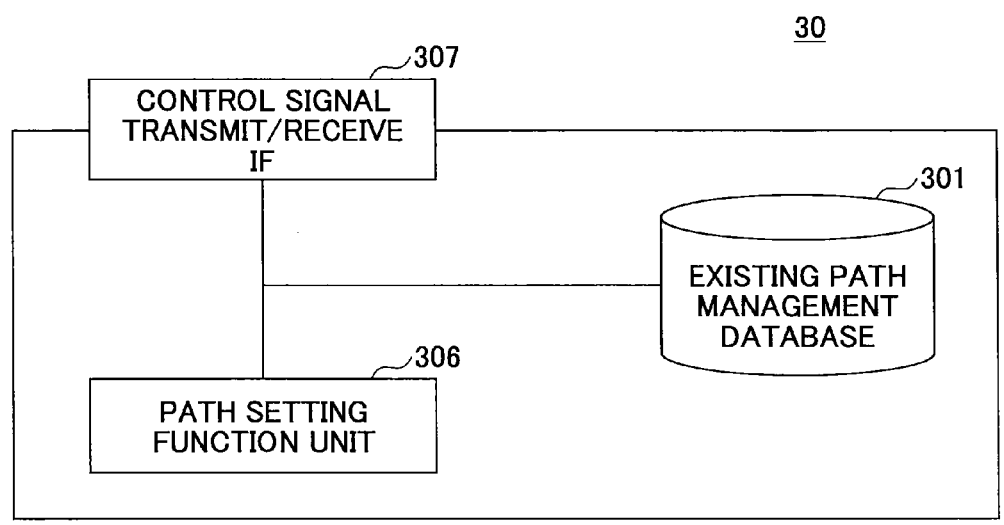
FIG. 25 is a block diagram of a management apparatus of a seventh embodiment of the present invention.

FIG. 25 shows a management apparatus 30 of the seventh embodiment, showing an apparatus in which the upper layer path advance designing function 302, the reallocation target path management database 303 are excluded from the management apparatus of FIG. 21.

Figure 26:
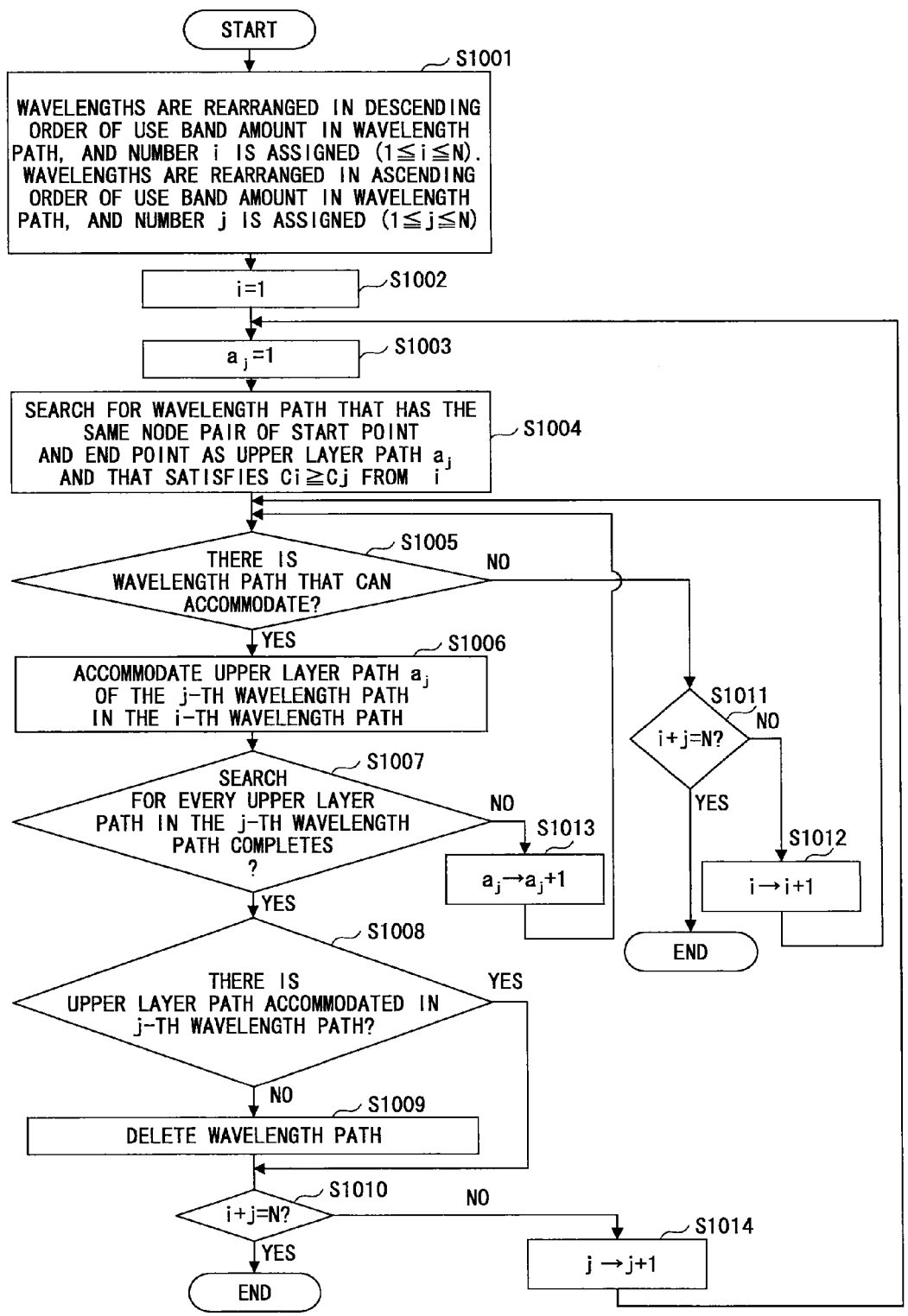
FIG. 26 is a diagram showing an upper layer path setting procedure in the management apparatus according to the seventh embodiment of the present invention.

An upper layer path setting procedure in the path setting function unit 306 is described with reference to FIG. 26.

In this embodiment, upper layer paths in N wavelength paths are reallocated. In step S1001, wavelengths are rearranged in descending order of use band amount in wavelength path, and i is assigned in order ($1 \leq i \leq N$). The use band amount in the wavelength path is the total sum of granularities of upper layer paths accommodated in the wavelength path. Further, wavelengths are rearranged in ascending order of the use band amount in the wavelength path, and j is assigned in order ($1 \leq j \leq N$).

In step S1002, 1 is set to j and i respectively (j=1, i=1).

In step S1003, 1 is set to $a_j$ ($a_j$=1), in which $a_j$ is a number assigned to an upper layer path, in order, accommodated in the j-th wavelength path.

In step S1004, a wavelength path that is the same route of the upper layer path accommodated in the j-th wavelength path and that satisfies Ci≥Cj is searched for from the i-th wavelength path, in which Ci indicates a free capacity of the i-th wavelength path. The wavelength path of the same route as the upper layer path is a wavelength path having a start point node and an end point node the same as those of the upper layer path.

In step S1005, it is determined whether there is a wavelength path that can accommodate the upper layer path $a_j$. When there is the wavelength path, the process goes to step S1006, and when there is not the wavelength path, the process goes to step S1001.

In step S1006, the upper layer path $a_j$ of the j-th wavelength path is accommodated in the i-th wavelength path.

In step S1007, it is determined whether search for accommodation completes for every upper layer path in the j-th wavelength path. When the search completes, the process goes to step S1008, and when the search has not completed, $a_j$ is set as $a_j$+1 ($a_j \rightarrow a_j$+1) in step S1013, and the process returns to step S1004.

In step S1008, it is determined whether there is an upper layer path accommodated in the j-th wavelength path. When there is not the upper layer path, the process goes to step S1009, and when there is the upper layer path, the process goes to step S1010.

In step S1009, a wavelength path that does not accommodate an upper layer path is deleted.

In step S1010, it is determined whether i+j=N holds true. When i+j=N holds true, the calculation ends. When i+j≠N, since it means that every wavelength path has not been searched, the process goes to step S1014.

In step S1011, it is determined whether i+j=N holds true. When i+j=N holds true, the calculation ends. When i+j≠N, i is set to i+1 (i→i+1) in step S1012, and the process returns to step S1004.

By the above-mentioned procedure, reallocation of the upper layer paths completes.

Eighth Embodiment

In the eighth embodiment, a case is described for performing reallocation of both of the upper layer path and the wavelength path.

First, reallocation of the upper layer path is performed, and after that, reallocation of the wavelength path is performed. This process is a combination of the first to fifth embodiments and the sixth to seventh embodiments.

Figure 27:
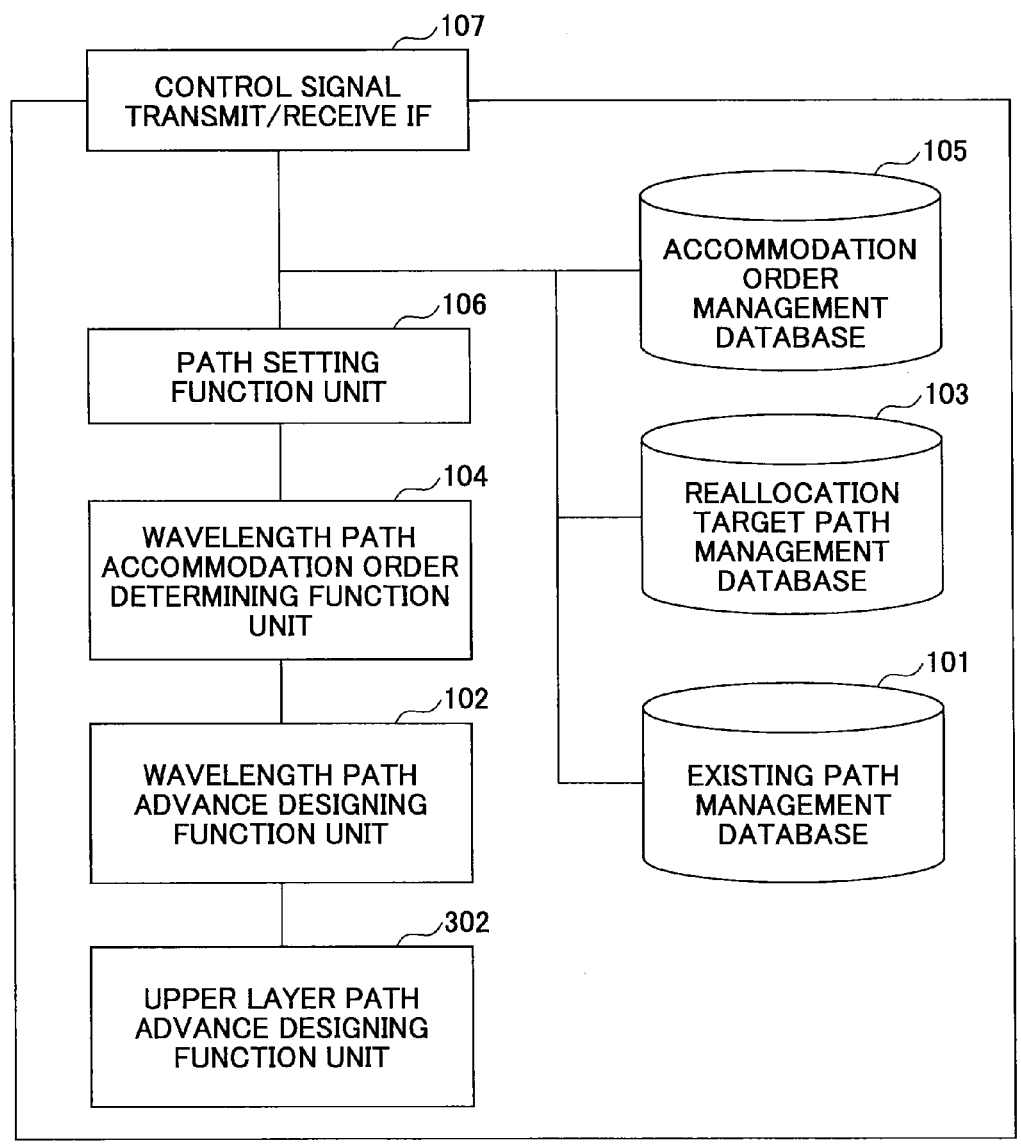
FIG. 27 is a block diagram of a management apparatus of an eighth embodiment of the present invention (centralized control scheme)

FIG. 27 is a management apparatus of the eighth embodiment, which is an apparatus in which the management apparatus of FIG. 4 and the management apparatus of FIG. 21 are combined. The same structural elements are assigned the same reference symbols as FIGS. 4 and 21, and the description is not given.

Figure 28:
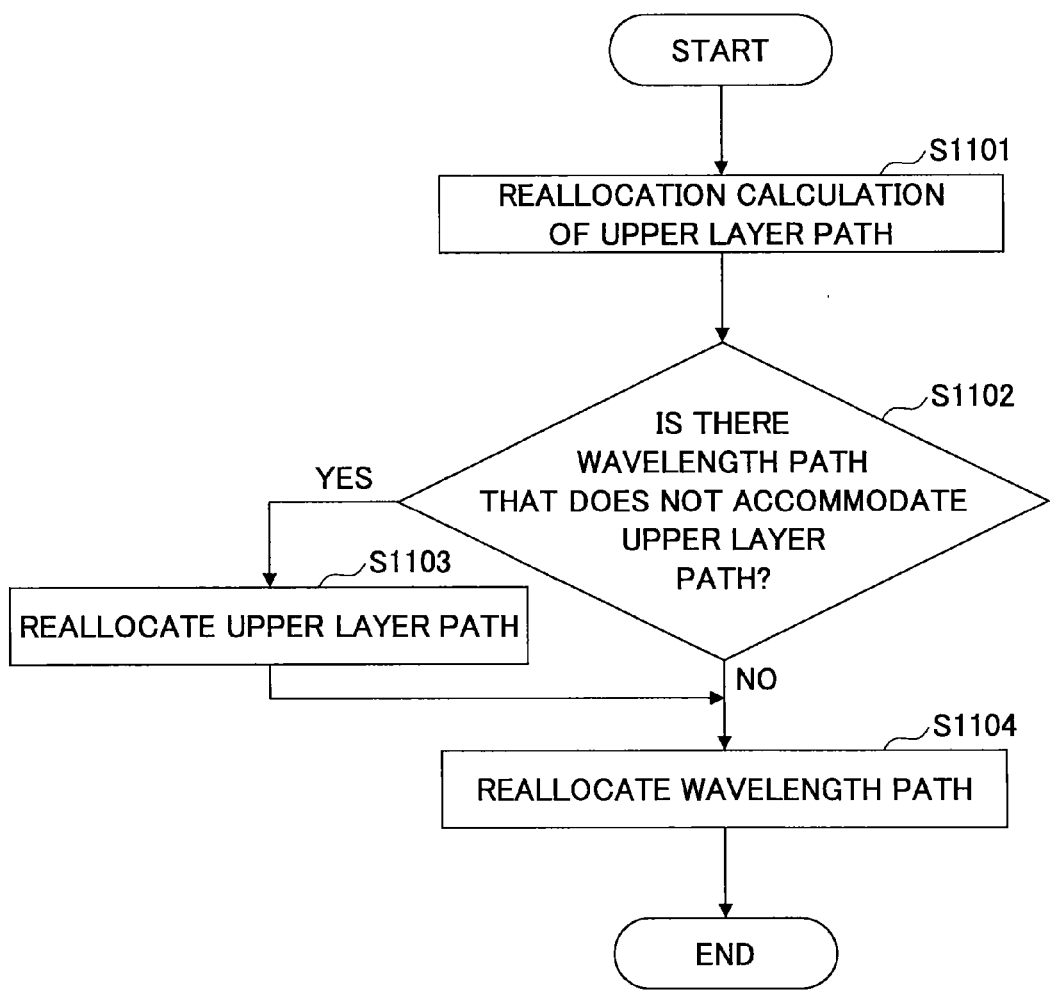
FIG. 28 is a diagram showing a reallocation procedure of the upper layer path and the wavelength path in the management apparatus according to the eighth embodiment of the present invention.

FIG. 28 shows a reallocation procedure of the upper layer path and the wavelength path by the management apparatus of FIG. 27.

In step S1101, the upper layer path advance designing function unit performs reallocation calculation for the upper layer path. Concrete procedure for this calculation is as described in the sixth to seventh embodiments.

In step S1102, according to the reallocation calculation, it is determined whether there is a wavelength path that can be deleted. When there is the wavelength path that can be deleted, the process goes to step S1103, and when there is not the wavelength path, the process goes to step S1104.

In step S1103, the upper layer path is reallocated. Concrete procedure for this step is as described in the sixth to seventh embodiments.

In step S1004, the wavelength path is reallocated. Concrete procedure for this step is as described in the first to fifth embodiments.

Ninth Embodiment

In the ninth embodiment, a calculation method is descried for minimizing the number of operations for changing a reallocation target wavelength path to a reallocation destination wavelength path in the wavelength path accommodation order determining function unit 104.

Figure 10:
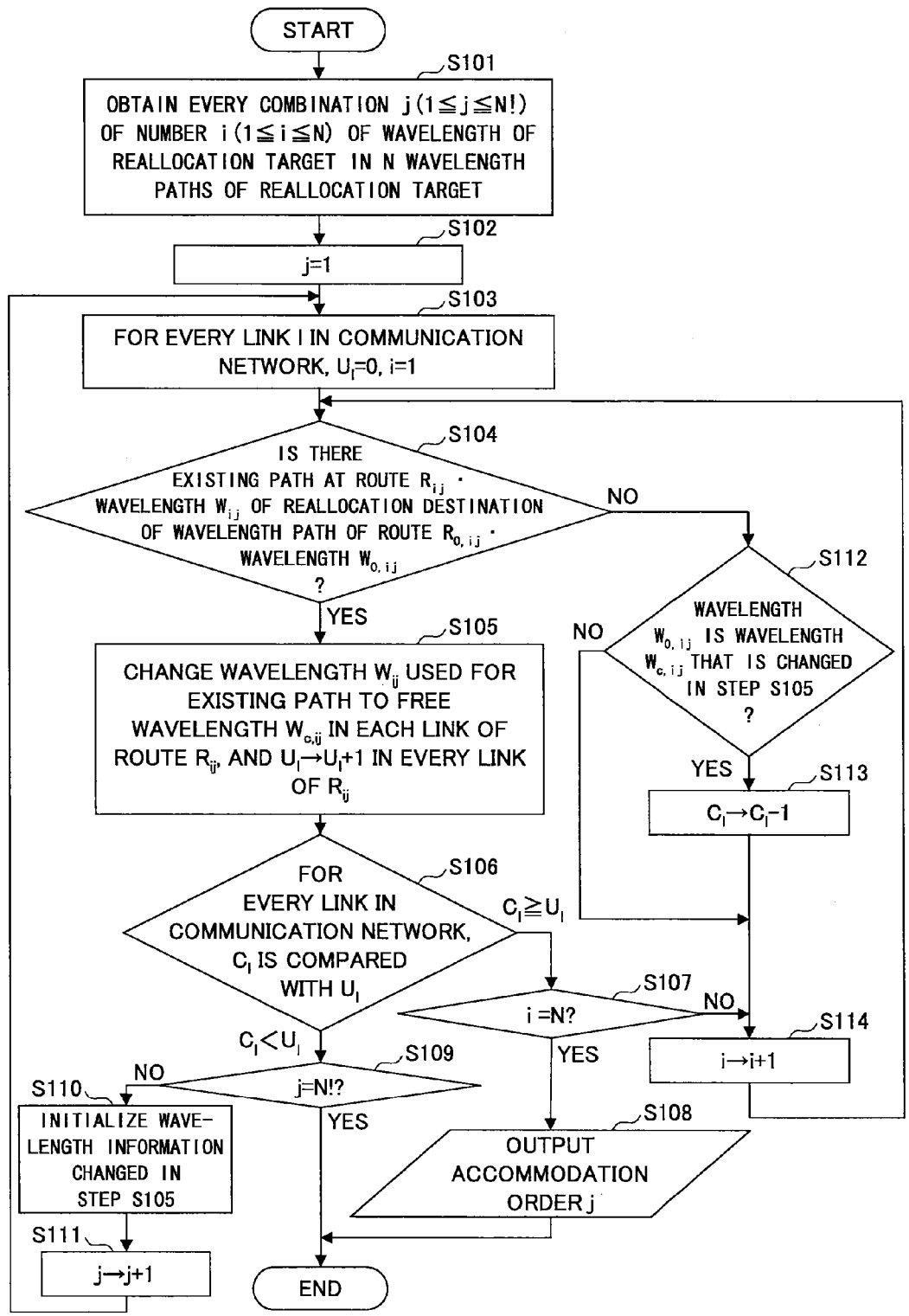
FIG. 10 is a diagram showing an accommodation order determination procedure in the management apparatus according to the first embodiment of the present invention.

In order to minimizing the number of operations, in the accommodation order determining procedure described with reference to FIG. 10, the number of operations is obtained for changing the reallocation target wavelength path to the reallocation destination wavelength path, and if plural accommodation orders are determined, an accommodation order in which the number of operations is small is selected.

Figure 29:
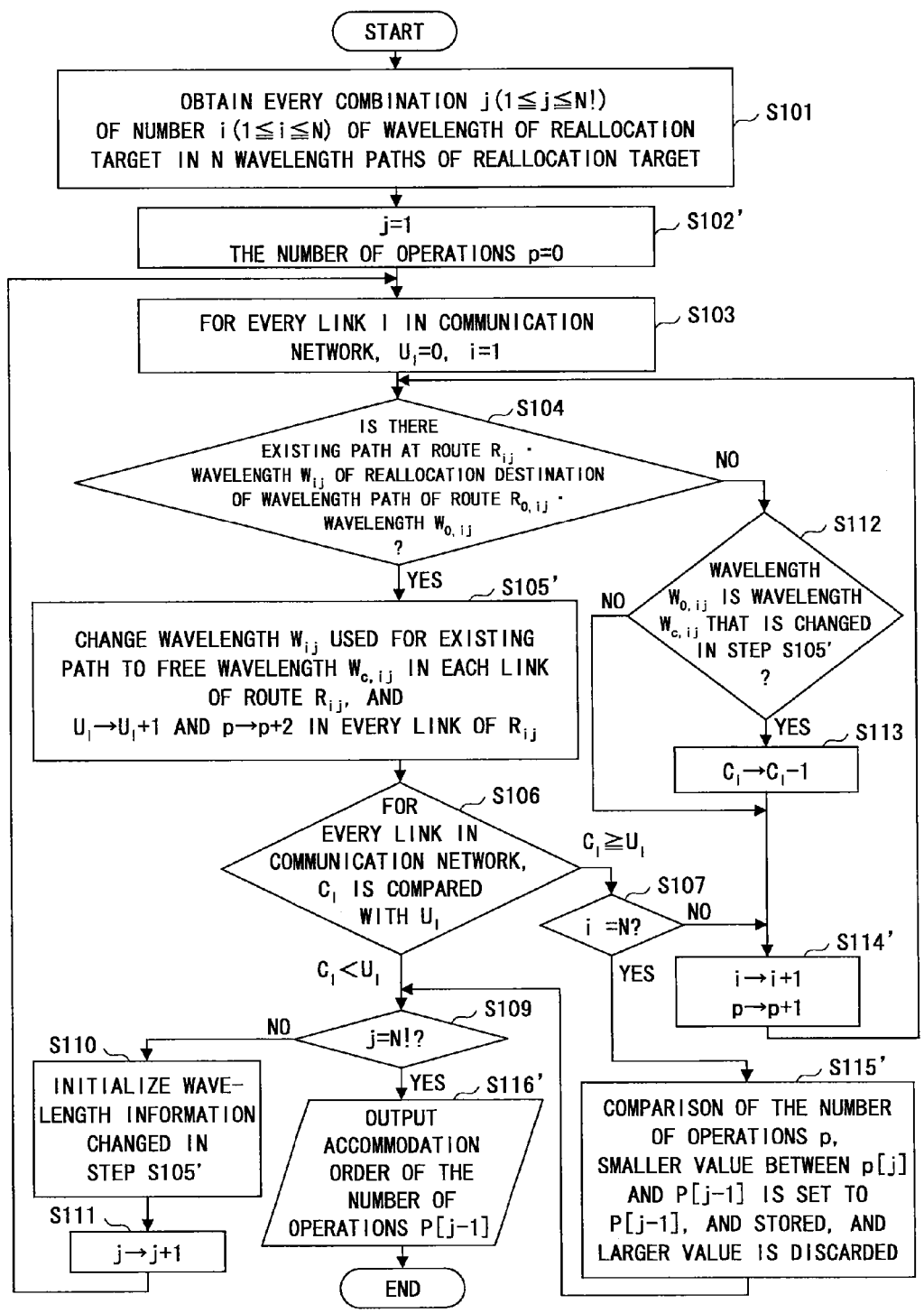
FIG. 29 is a diagram showing an accommodation order determination procedure in the management apparatus according to a ninth embodiment of the present invention.

FIG. 29 is a diagram showing an accommodation order determining procedure performed by the management apparatus in the ninth embodiment. Although basic steps of the ninth embodiment are similar to steps shown in FIG. 10, calculation of the number of operations is added in steps S102', S105' and S114', and steps S115' and S116' are newly added.

In step S102', the number p of operations is set to 0 (p=0).

In step S105', when changing a wavelength used as an existing path to a free wavelength, the number p of operations is set to p+2 (p→p+2). The reason that the number of operations is increased by 2 is that it is necessary to once move (evacuate) a reallocation destination wavelength to a free wavelength.

In step S114', p is set to p+1 (p→p+1).

In step S107, when i=N, the process goes to step S115', and the number p[j] of operations in the combination j is compared with a previous calculation result P[j−1] of the number operations. A smaller value between p[j] and P[j−1] is set to P[j−1], and the accommodation order is stored, and an accommodation order corresponding to the larger value is discarded.

In step S116', when every calculation completes, an accommodation order corresponding to the smallest operation number P[j−1] is output.

Accordingly, when determining an accommodation order for reallocating a wavelength path using a free wavelength, an accommodation order having a larger number of operations is discarded, so that the number of operations can be minimized and a calculation memory amount can be decreased.

Tenth Embodiment

In the tenth embodiment, a case where a wavelength path is reallocated is described. In the tenth embodiment, the path setting function unit 106 sets/deletes a wavelength path and an upper layer path, without designing reallocation target wavelength paths and reallocation destination wavelength paths beforehand. For example, when the communication network is not complicated, reallocation target wavelength paths can be reallocated sequentially. A management apparatus of the tenth embodiment is the same as that shown in FIG. 19.

Figure 30:
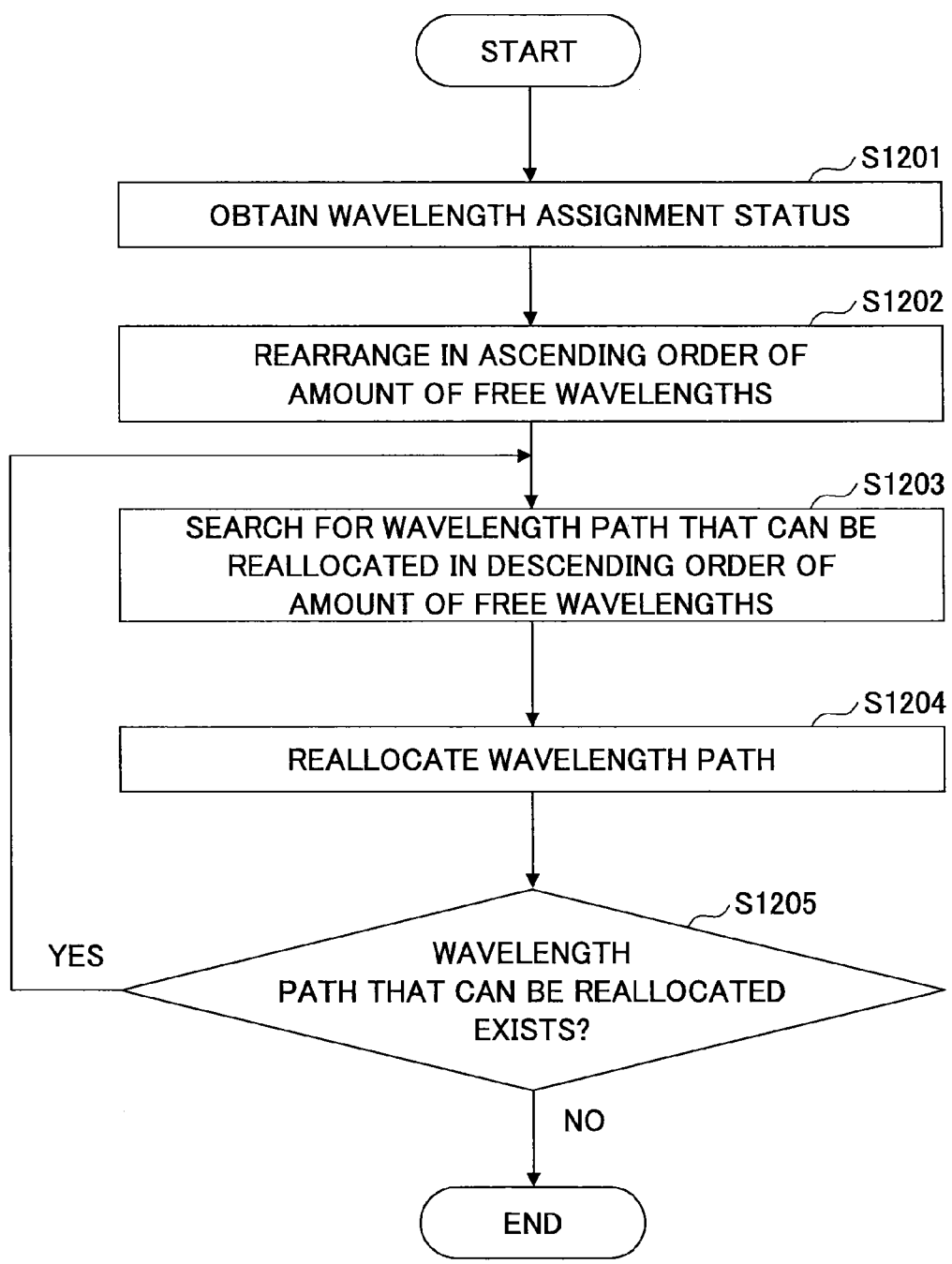
FIG. 30 is a diagram showing a wavelength path setting procedure in the management apparatus according to a tenth embodiment of the present invention.

FIG. 30 is a diagram showing a wavelength path setting procedure in the management apparatus of the tenth embodiment.

Figure 31A:
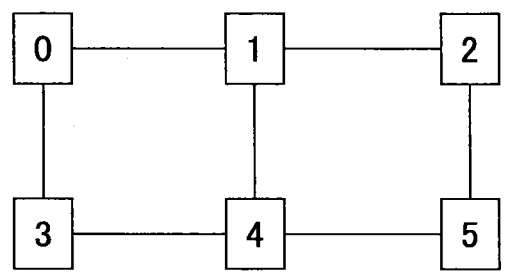
FIG. 31A is a diagram showing a physical topology used in the tenth embodiment of the present invention.
Figure 31B:
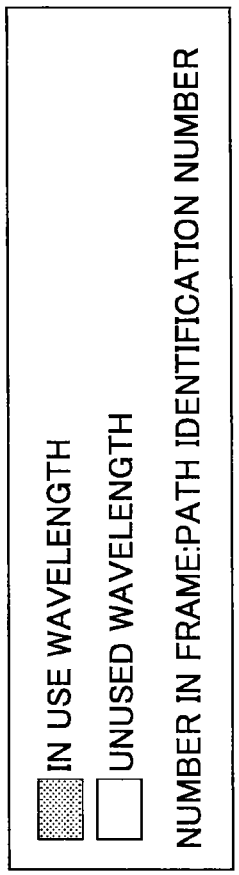
FIG. 31B is a diagram showing a wavelength assignment status used in the tenth embodiment of the present invention.

In step S1201, the path setting function unit 106 obtains a wavelength assignment status of each link. In the tenth embodiment, as shown in FIGS. 31A and 31B, in-use/unused of wavelength is managed for each link as the wavelength assignment status. For example, in a case of a physical topology of 2×3 lattice network as shown in FIG. 31A, it is managed whether wavelengths $\lambda 0$~$\lambda 10$ are used in a link 0-1 between a node 0 and a node 1. When a wavelength is used, a wavelength path identification number is also managed. In this embodiment, a wavelength assignment status shown in FIG. 31B is assumed, in which the row represents wavelengths, the column represents link numbers, a link in which a wavelength is used is represented by using hatching, and a link in which a wavelength is not used is represented as blank, and a number in a frame indicates a wavelength path identification number. For example, the figure shows that path identification number 2 of $\lambda 2$ uses a route of a link 1-2 and a link 2-5.

In step S1202, the path setting function unit 106 rearranges wavelengths in ascending order of free wavelength in the wavelength assignment status. That is, wavelengths are rearranged in ascending order of the number of links where wavelength is not used. By the way, wavelengths may be rearranged in descending order of the number of links where wavelength is not used.

In step S1203, the path setting function unit 106 searches for a wavelength path that can be moved in descending order of the amount of free wavelengths. That is, a link of reallocation destination of a wavelength path is searched for in descending order of the number of links where the wavelength is not used.

In step S1204, a wavelength path is reallocated to the searched link of reallocation destination.

In step S1205, the above-mentioned procedure is repeated until no wavelength path that can be moved exists.

FIGS. 32A-32D are diagrams showing reallocation of a wavelength path in the management apparatus of the tenth embodiment.

The wavelength assignment status shown in FIG. 32A is rearranged in ascending order of the number of links where the wavelength is not used. For example, since the number of link where the wavelength $\lambda 2$ is not used is 1, it is rearranged to the top of the wavelength assignment status. As shown in FIG. 32B, in this example, wavelengths are rearranged to an order of $\lambda 2$, $\lambda 3$, $\lambda 7$, $\lambda 10$, $\lambda 8$ and $\lambda 5$. Like wavelengths of $\lambda 4$, $\lambda 6$, $\lambda 9$ and $\lambda 1$, if a wavelength is used in every link, decrease of the number of wavelengths cannot be expected by reallocation. Thus, these wavelengths may be rearranged to the last part of the wavelength assignment status.

As shown in FIG. 32C, since the wavelength $\lambda 5$ is a wavelength in which the number of links where the wavelength is not used is the largest, a link of reallocation destination for a wavelength path using the wavelength $\lambda 5$ is searched for. The wavelength path of an identification number 8 that uses the wavelength $\lambda 5$ can be reallocated to the wavelength $\lambda 3$. The wavelength path of an identification number 9 that uses the wavelength $\lambda 5$ can be reallocated to the wavelength $\lambda 10$. Like the wavelength path of the identification number 15, when a plurality of links use the wavelength $\lambda 8$, a free wavelength that is free common to the plurality of links is searched for, and the wavelength path is reallocated. In this example, the wavelength path of the identification number 15 can be reallocated to the wavelength $\lambda 10$. By repeating these processes, reallocation of wavelength paths ends (FIG. 32D).

Eleventh Embodiment

In the eleventh embodiment, an example is described for decreasing calculation amount in the integer linear programming when designing a reallocation destination of a wavelength path by the wavelength path advance designing function unit 102.

The wavelength path advance designing function unit 102 designs a reallocation target wavelength path and a reallocation destination wavelength path for a wavelength used in a link in a communication network. That is, a wavelength that is not used in any link is excluded from a subject for calculation.

For example, the wavelength assignment status shown in FIG. 33A can be rearranged by excluding wavelengths $\lambda 4$ and $\lambda 9$ that are not used in any link. As shown in FIG. 33B, a wavelength used in a link is assigned a provisional wavelength number (1)-(8) in order. By using the provisional wavelength number, the wavelength path advance designing function unit 102 can design the reallocation destination of the wavelength path. When the path setting function unit 106 sets a wavelength, the provisional wavelength number is changed to the original wavelength number, and the wavelength is set.

According to the eleventh embodiment, it becomes possible to reduce the calculation amount since the number of variables and the number of restrictions in the integer linear programming decrease.

Twelfth Embodiment

In the eleventh embodiment, an example is described for decreasing calculation amount in the integer linear programming when designing a reallocation destination of a wavelength path by the wavelength path advance designing function unit 102.

The wavelength path advance designing function unit 102 designs a reallocation target wavelength path and a reallocation destination wavelength path for a wavelength in which there is a link where the wavelength is not used in the communication network. That is, a wavelength that is used in every link is excluded from subject for calculation. Also, a wavelength that is not used in every link may be excluded from subject for calculation.

For example, the wavelength assignment status shown in FIG. 34A can be rearranged by excluding wavelengths λ4, λ6, λ9 and λ1 that are used in every link. As shown in FIG. 34B, a wavelength in which there is a link where the wavelength is not used is assigned provisional wavelength number (1)-(6) in order. By using the provisional wavelength number, the wavelength path advance designing function unit 102 can design the reallocation destination of the wavelength path. When the path setting function unit 106 sets a wavelength, the provisional wavelength number is changed to the original wavelength number, and the wavelength is set.

According to the twelfth embodiment, it becomes possible to reduce the calculation amount since the number of variables and the number of restrictions in the integer linear programming decrease.

Thirteenth Embodiment

In the thirteenth embodiment, a case is described in which any of the above-mentioned embodiments is applied to a communication network that is formed by Ethernet apparatuses having a hitless switching function. An Ethernet apparatus having the hitless switching function is described in the patent document 2, for example.

Figure 35:
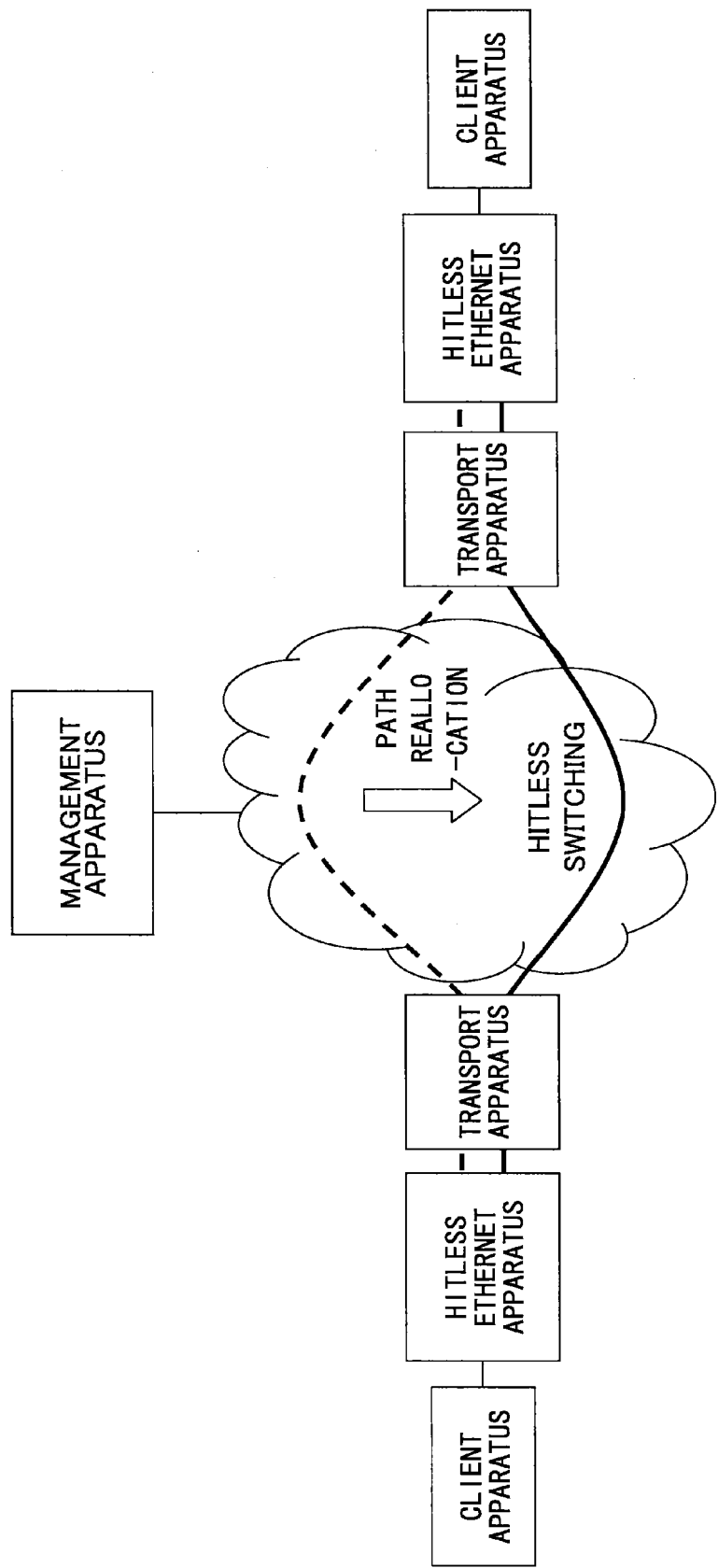
FIG. 35 is a schematic diagram of a communication system according to the thirteenth embodiment of the present invention.

FIG. 35 is a schematic diagram of a communication system of the thirteenth embodiment. In this communication system, an Ethernet apparatus having the hitless switching function is connected to a transport apparatus. The transport apparatus is a transmission apparatus for transmitting a packet received from the Ethernet apparatus to an opposed transport apparatus.

A management apparatus described in any of the embodiments is connected to the communication network, and performs design and reallocation of wavelength paths and upper layer paths, so that it becomes possible perform hitless switching for paths set between Ethernet apparatuses.

Fourteenth Embodiment

In the fourteenth embodiment, an algorithm is described for changing a reallocation target wavelength path to a reallocation destination wavelength path in the wavelength path accommodation order determining function unit 104.

Figure 36A:
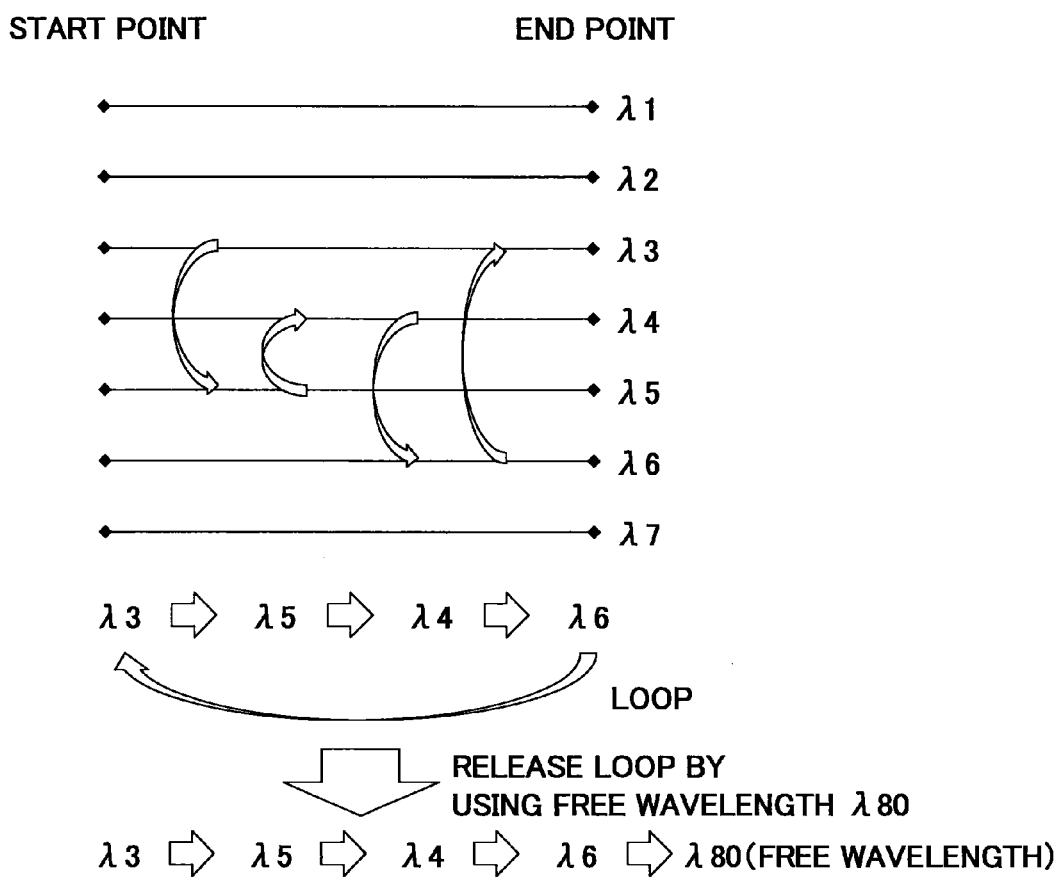
FIG. 36A is a diagram showing reallocation of a wavelength path in the management apparatus according to the fourteenth embodiment of the present invention, which shows a case where a route of a wavelength path does not change between before and after reallocation.

First, a case is described in which the route of the wavelength path does not change between before and after reallocation. For example, as shown in FIG. 36A, for example, a case is considered for reallocating a wavelength path of a wavelength λ3 to λ5, reallocating a wavelength path of a wavelength λ5 to λ4, reallocating a wavelength path of a wavelength λ4 to λ6, and reallocating a wavelength path of a wavelength λ6 to λ3. When trying to reallocate the wavelength path of the wavelength λ6 to λ3, since λ3 is being used, reallocation cannot be performed without interruption. Like this example, there is a case where a loop may occur when following reallocation destinations of the wavelength path in order. In this case, the loop is released by using a free wavelength (λ80, for example), so that the reallocation relationship is changed to a tree structure. Then, by starting reallocation from a top (λ6 in this case) of the tree, reallocation without interruption becomes possible.

More specifically, first, the wavelength path of the wavelength λ6 is reallocated to the free wavelength λ80. According to this reallocation, the wavelength λ6 becomes a free wavelength, so that a wavelength path of the wavelength λ4 can be reallocated to λ6. In the same way, the wavelength path of the wavelength λ5 is reallocated to λ4, and nest, a wavelength path of the wavelength λ3 can be reallocated to λ5. Then, it becomes possible to reallocate the wavelength path moved to the free wavelength λ80 can be reallocated to λ3. Accordingly, by moving a wavelength path in a loop to a free wavelength first, the loop can be cut.

Figure 36B:
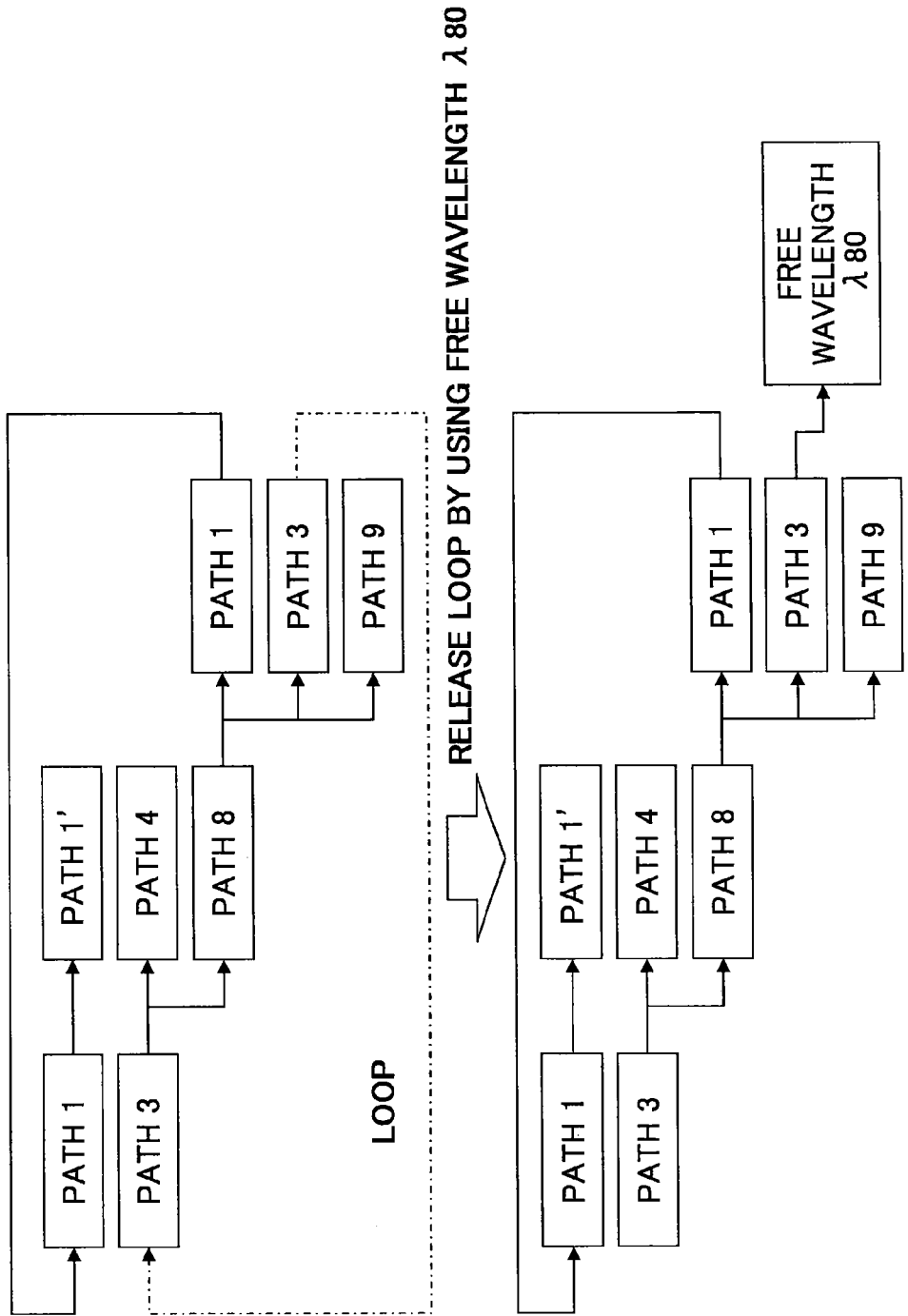
FIG. 36B is a diagram showing reallocation of a wavelength path in the management apparatus according to the fourteenth embodiment of the present invention, which shows a case where a route of a wavelength path changes between before and after reallocation.

Next, a case is described where a route of a wavelength path is changed between before and after reallocation. For example, as shown in FIG. 36B, a case is considered in which a wavelength path of a path identifier 1 is reallocated to a wavelength in which a path identifier 1' is accommodated, a wavelength path of a path identifier 3 is reallocated to a wavelength in which a path identifier 4 is accommodated and to a wavelength in which a path identifier 8 is accommodated, a wavelength path of a path identifier 8 is reallocated to a wavelength in which a path identifier 1 is accommodated, a wavelength in which a path identifier 3 is accommodated, and to a wavelength in which a path identifier 9 is accommodated. The wavelength path of the path identifier 1 can be reallocated to a wavelength in which the path identifier 1' is accommodated. However, when trying to reallocate the wavelength path of the path identifier 8 to a wavelength in which the path identifier 3 is accommodated, since the wavelength is being used, reallocation cannot be performed without interruption. Like this example, there is a case where a loop may occur when following reallocation destinations of the wavelength path in order. In this case, similarly, the loop is released by using a free wavelength (λ80, for example), so that the reallocation relationship is changed to a tree structure. Then, by starting reallocation from a top (path identifiers 1 and 3 in this case) of the tree, reallocation without instantaneous interruption becomes possible.

More specifically, first, the wavelength path of the path identifier 3 is reallocated to the free wavelength λ80. Also, the wavelength path of the path identifier 1 is reallocated to a wavelength in which the path identifier 1' is accommodated. According to this reallocation, the wavelength in which the path identifier 1 is accommodated and the wavelength in which the path identifier 3 is accommodated become free wavelengths, so that the wavelength in which the path identifier 8 is accommodated can be reallocated. Then, it becomes possible to reallocate the wavelength path moved to the free wavelength λ80 to the wavelength in which the path identifier 4 is accommodated and the wavelength in which the path identifier 8 is accommodated. Accordingly, by moving a wavelength path in a loop to a free wavelength first, the loop can be cut.

Fifteenth Embodiment

Figure 37:
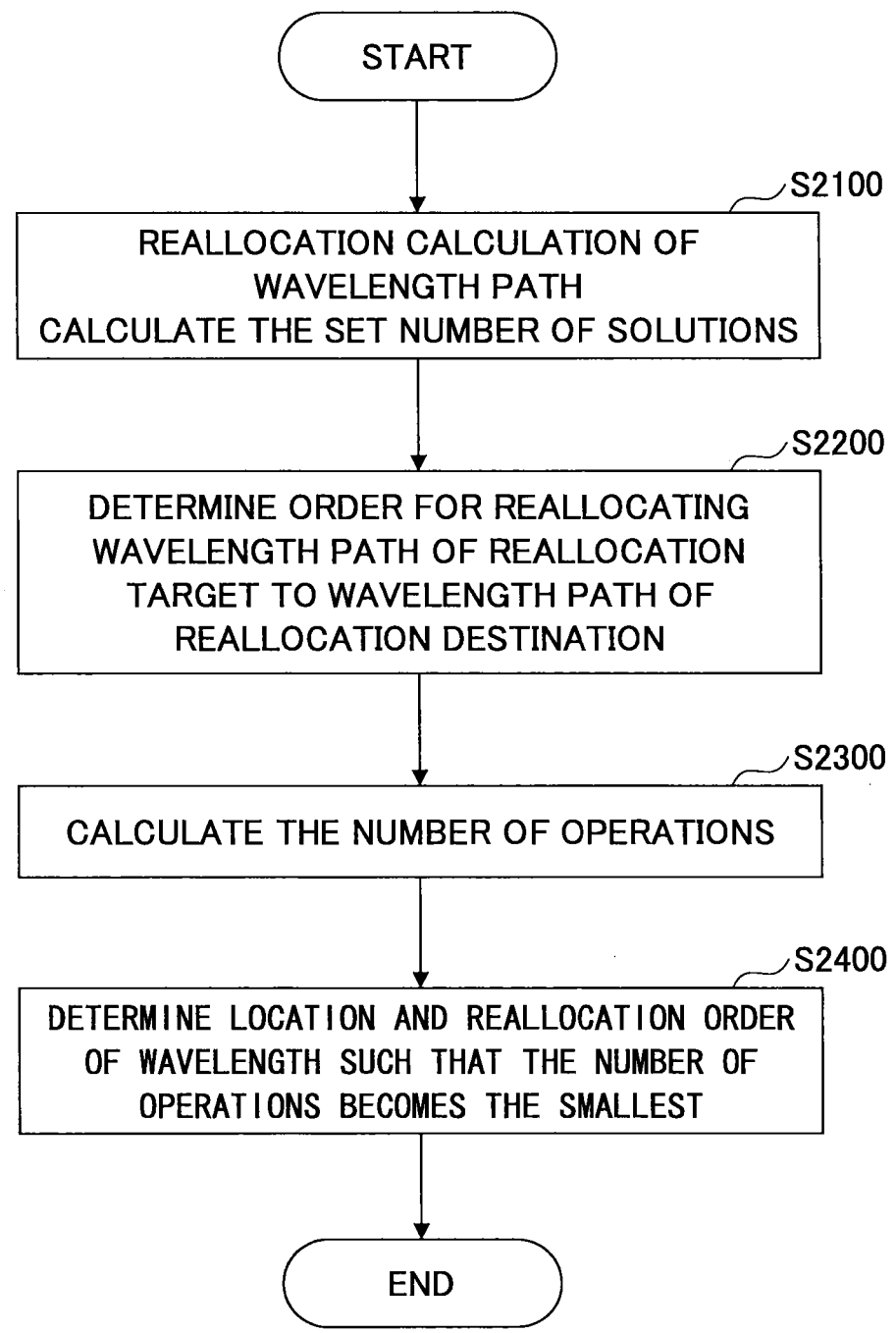
FIG. 37 is a flowchart according to the fifteenth embodiment of the present invention.

The fifteenth embodiment of the present invention is described with reference to FIG. 37. This embodiment is carried out by the following flow.

In step 2100, reallocation calculation for an existing wavelength path is performed by using the integer linear programming such that an objective function of the before-mentioned formula (1) or the after-mentioned formula (19) is satisfied. At this time, plural solutions that satisfy the objective function are calculated.

In step 2200, an order for changing a reallocation target wavelength path to a reallocation destination wavelength path is determined for the plural solutions calculated in step 2100.

In step 2300, the number of operations for path setting/deletion in the order of step 2200 is calculated.

In step 2400, by comparing the numbers of operations, reallocation wavelength paths and reallocation order are determined such that the number of operations becomes the smallest.

According to the above processes, it becomes possible to calculate a solution that satisfies the objective function and that minimizes the number of operations. In the following, processes of steps 2100 and 2200 are described. In the integer linear programming used in step 2100, G(V, E) represents a graph of a node v (vEV) and a link e (eEE), and w(wEW) represents a wavelength, and a flow preserving formula shown in the non-patent document 2 is used as a constraint.

<Variables>

$P_{dew}$: $P_{dew}$ indicates 1 when a wavelength number w is used in a link e in a wavelength path of a pair d of opposed nodes, and $P_{dew}$ indicates 0 in other cases.

$F_W$: Fragmentation function

The fragmentation function is a function used for minimizing the number of use wavelength regions, which indicates 0 when a wavelength is used in every link or not used in any link as shown in FIG. 3B, and indicates 1 in other cases.

<Constants>

$P_{0,dew}$: $P_{0,dew}$ indicates 1 when a wavelength number w is used in a link e in an existing wavelength path before reallocation of a pair d of opposed nodes, and $P_{0,dew}$ indicates 0 in other cases.

$C_P$: wavelength cost parameter $C_F$: fragmentation cost parameter (real number equal to or greater than 0)

$C_{WR}$: wavelength path reallocation cost parameter (real number equal to or greater than 0)

<Objective Function>

$$\text{minimize } C_P \sum_{d,e,w} p_{dew} + C_F \sum_w F_w + C_{WR} \sum_{d,e,w} (p_{dew} - p_{0,dew}). \quad (19)$$

$$F_w = \left[\sum_{d,e} p_{dew}/L\right] - \left[\sum_{d,e} p_{dew}/L\right]. \quad (20)$$

The first term of the objective function indicates designing a wavelength path with a shortest route, the second term indicates to perform designing such that the fragmentation cost becomes the smallest, and the third term represents a cost value due to change of a wavelength path. "wavelength path" in the third term may be replaced with "upper layer path", and also, both of the wavelength path and the upper layer path may be considered. In addition, a constraint, as shown in the formula (8) and the formula (16), may be added for making the number of changes to be equal to or less than a predetermined number without adding the third term to the objective function, and calculation may be performed within the constraint. By the objective function to make the first term and the second term to be small, it becomes possible to reduce the number of use wavelength regions.

For example, $C_P$ is set by a method for calculating a cost per one wavelength from an equipment cost. Similarly, for example, $C_F$ is set by a method for calculating a cost per one wavelength from an equipment cost. But, $C_P$ and $C_F$ may be an arbitrary value. $C_{WR}$ is an arbitrary value. Also, by replacing the second term of formula (19) with the following formula, it becomes possible to weight the number of wavelengths of wavelength channels in which fragmentation occurs.

$$C_F \cdot \sum_w \left(F_w + \alpha \sum_{d,e} p_{dew}\right) \quad (21)$$

In the formula, α is a real number.

Figure 38:
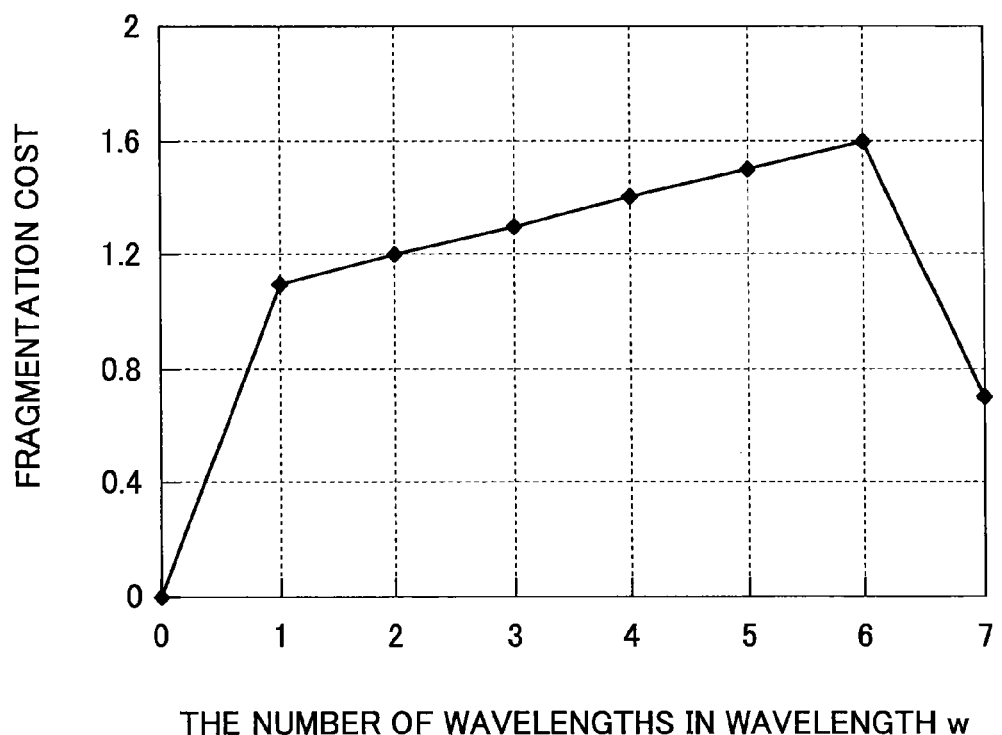
FIG. 38 is an example of a diagram for explaining fragmentation cost according to the fifteenth embodiment of the present invention.

For example, FIG. 38 shows this function of the formula (21) in a wavelength w for a network in which the number of links is 7, and $C_F=1$ and α=0.1.

As described above, plural solutions that satisfy the objective function are calculated. The reallocation order calculation in step 2200 is performed by an accommodation order determination procedure in the first embodiment shown in FIG. 10, or a reallocation method in the fourteenth embodiment shown in FIGS. 36A and 36B.

Sixteenth Embodiment

Figure 39:
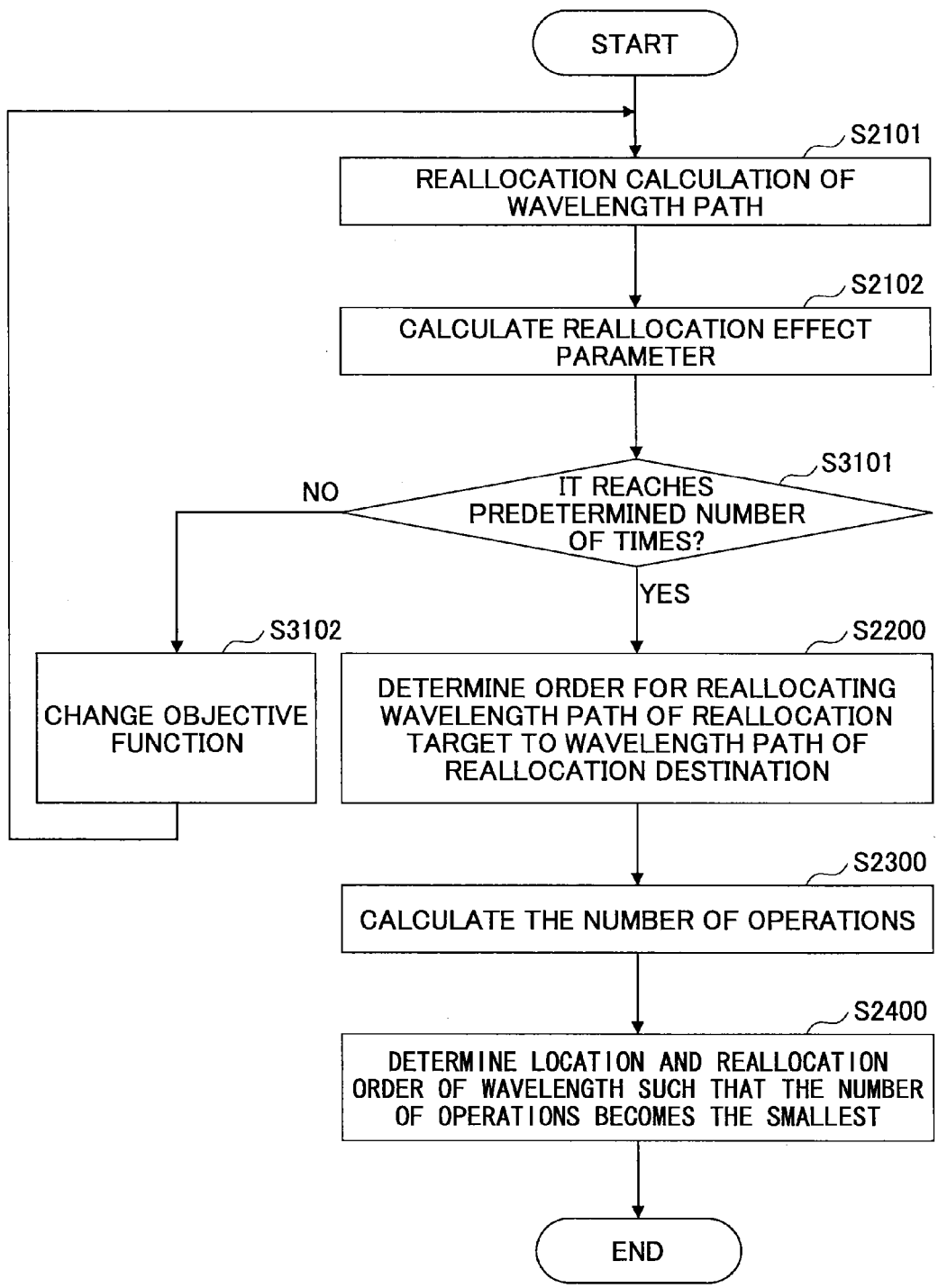
FIG. 39 is a flowchart according to the sixteenth embodiment of the present invention.

The sixteenth embodiment of the present invention is described with reference to FIG. 39. In this embodiment, the number of solutions to be calculated is determined beforehand, and plural solutions are calculated by changing the wavelength path reallocation cost value $C_{WR}$ of the objective function (19) (of step 2100 of the fifteenth embodiment) the predetermined number of times of the solutions (steps 3101, 3102). Here, the reallocation effect parameter is calculated in each solution. The reallocation effect parameter is, for example, the value of the objective function, the total value of the first term and the second term of the objective function (formula (19)), the total value of the number of wavelengths in wavelength channels in which the cost in the second term is 1, equipment cost, or the like. After step 2200, processes similar to the fifteenth embodiment are performed, so that a solution is selected in which both of the reallocation effect parameter and the number of operations are small.

Seventeenth Embodiment

The seventeen embodiment of the present invention is described. In this embodiment, in step 2300 of FIG. 37 in the fifteenth embodiment, for example, the cost of changing a path in which the number of the hops is larger is set to be larger than that for a path in which the number of the hops is smaller, and the sum of the costs is set to be the number of operations. Or, by adding weight to change cost for each path, and the sum of them are set to be the number of operations. That is, the number of operations is calculated by calculating the total number by adding weight to each path to be reallocated, or calculated by adding weight according to the number of hops or the length of the routes.

Eighteenth Embodiment

The eighteenth embodiment of the present invention is described. The eighteenth embodiment is one in which processes of steps 2101 and 2102 in the flow (FIG. 39) of the sixteenth embodiment are used in the seventeenth embodiment.

Nineteenth Embodiment

Figure 40:
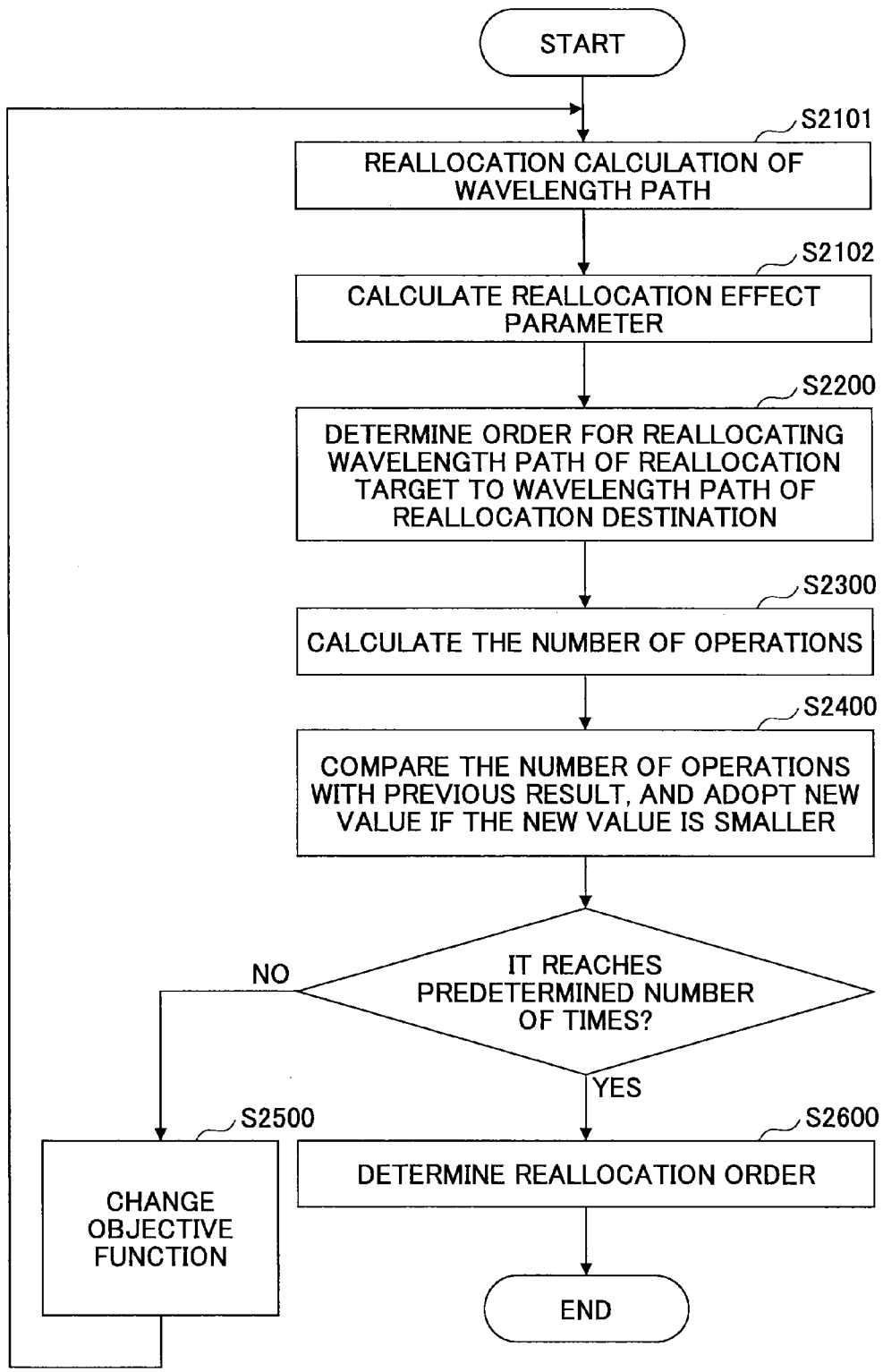
FIG. 40 is a flowchart according to the nineteenth embodiment of the present invention.

The nineteenth embodiment of the present invention is described with reference to FIG. 40. In steps 2101, 2102, 2200 and 2300 in FIG. 40, processes similar to steps 2101, 2102, 2200 and 2300 of the sixteenth embodiment are performed. In step 2101, instead of plural solutions, a single solution may be calculated. Also, the number of solutions to be calculated is set beforehand. In step 2400, the reallocation effect parameter and the number of operations are compared with previous results, and when both of them are better values than the previous values, the process results are adopted and stored. When the number of the process times reaches the set number of times, the reallocation order is determined based on the process result at that time (step 2600). When the number of times of processing has not reached the set number of times, the wavelength path reallocation cost value $C_{WR}$ of the objective function (formula (19)) is changed (step 2500), and calculation from step 2101 is performed again. As to the number of operations, a value within a range of a predetermined number may be adopted.

Figure 41:
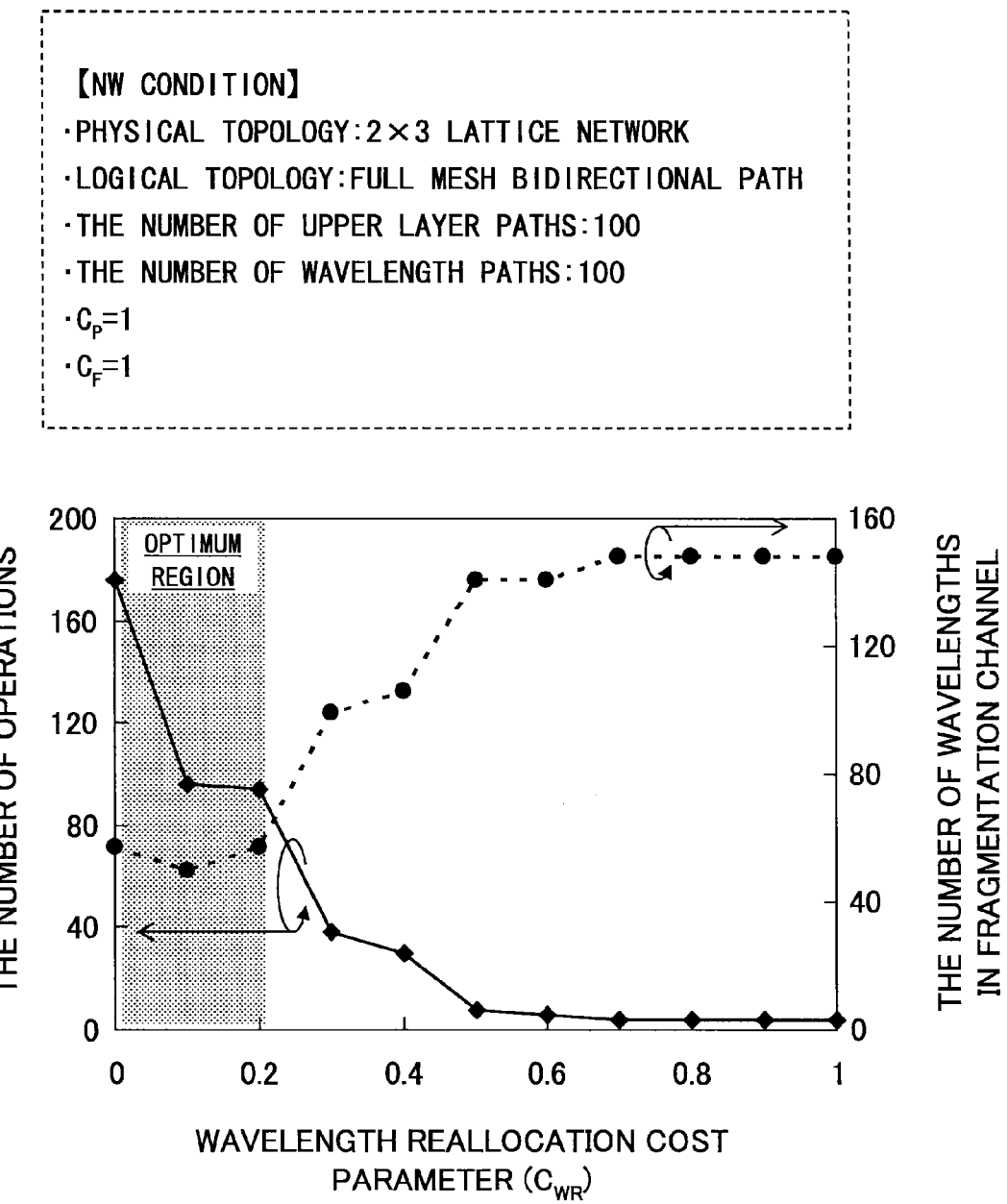
FIG. 41 is a diagram showing effects according to the nineteenth embodiment of the present invention.

The effect of the nineteenth embodiment is shown in FIG. 41. The evaluation is performed in a network condition in which the physical topology is a 2×3 lattice network, the logical topology is a full mesh bidirectional path, the accommodated number of upper layer path and wavelength path is 100 respectively, the wavelength path cost $C_P$ is 1, the fragmentation cost parameter $C_F$ is 1, and one upper layer path is accommodated in a wavelength path. Also, the number of operations is calculated by using the fourteenth embodiment. FIG. 41 represents the number of operations (left) for wavelength reallocation cost parameter and the number of wavelengths (right) in wavelength channel in which fragmentation occurs. From this result, it can be understood that a combination in which the number of operations is small and the reallocation effect is large can be selected when $C_{WR}$=0~0.2. By using the present embodiment, it is possible to reduce the number of operations by about 50% while preserving the reallocation effect.

Twentieth Embodiment

Figure 42A:
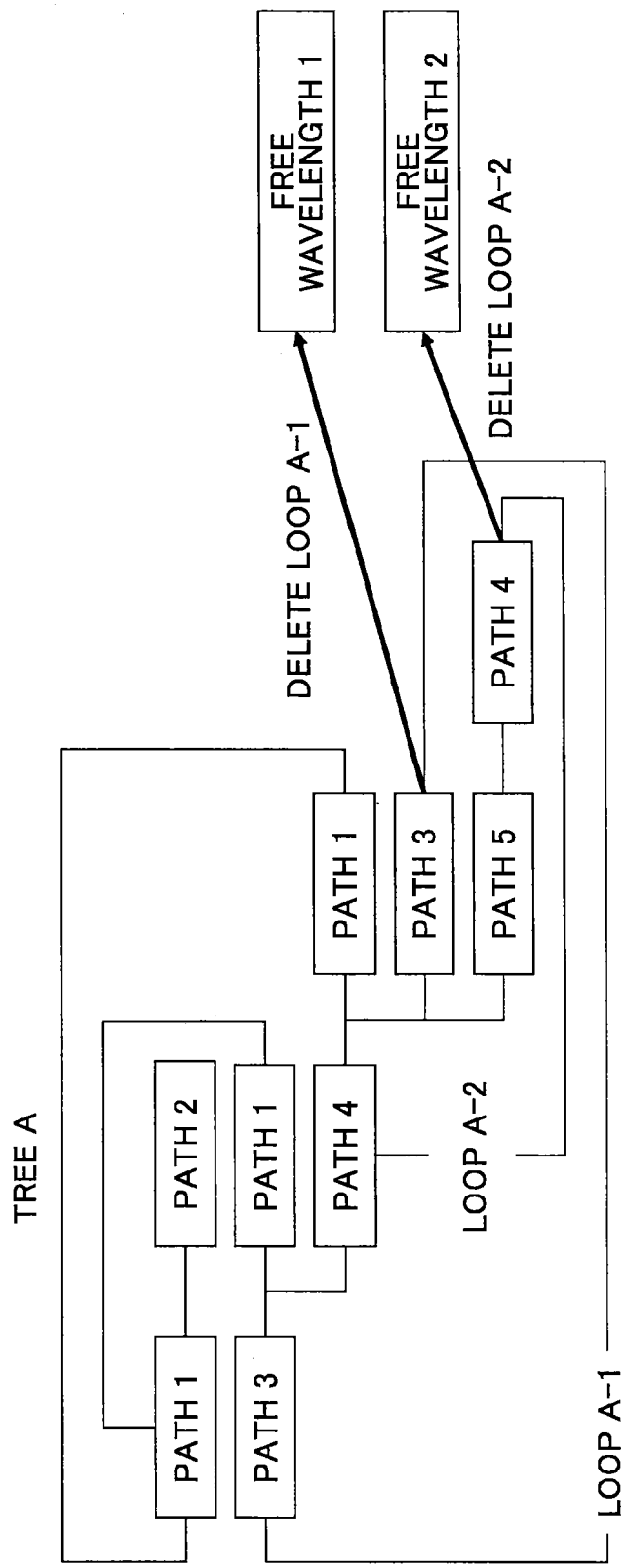
FIG. 42A is a diagram showing an example of reallocation according to the twentieth embodiment of the present invention.
Figure 42B:
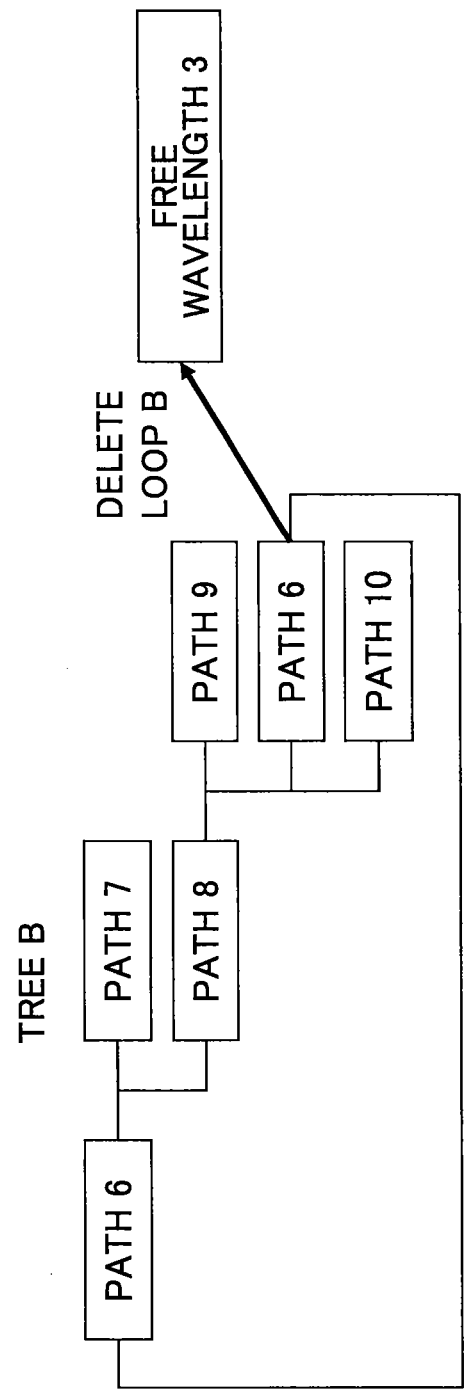
FIG. 42B is a diagram showing an example of reallocation according to the twentieth embodiment of the present invention.

The twentieth embodiment of the present invention is described with reference to FIGS. 42A and 42B. This embodiment is a method for effectively utilizing free wavelengths, in which reallocation relationship of wavelength paths between before and after reallocation is represented as a graph tree, and reallocation is performed in ascending order of the number of the reallocation loops. For example, as shown in FIGS. 42A and 42B, in a case where tree A has two loops and the tree B has one loop, reallocation is performed from the tree B in which the number of loop is smaller, so that the free resource can be used effectively.

Effect of Embodiment

According to the present embodiment, it becomes possible to reduce the number of wavelengths (the number of use wavelength regions) including free wavelengths of wavelength regions used in the communication network, or to reduce equipment cost, so that it becomes possible to reduce equipment increase amount.

Figure 44A:
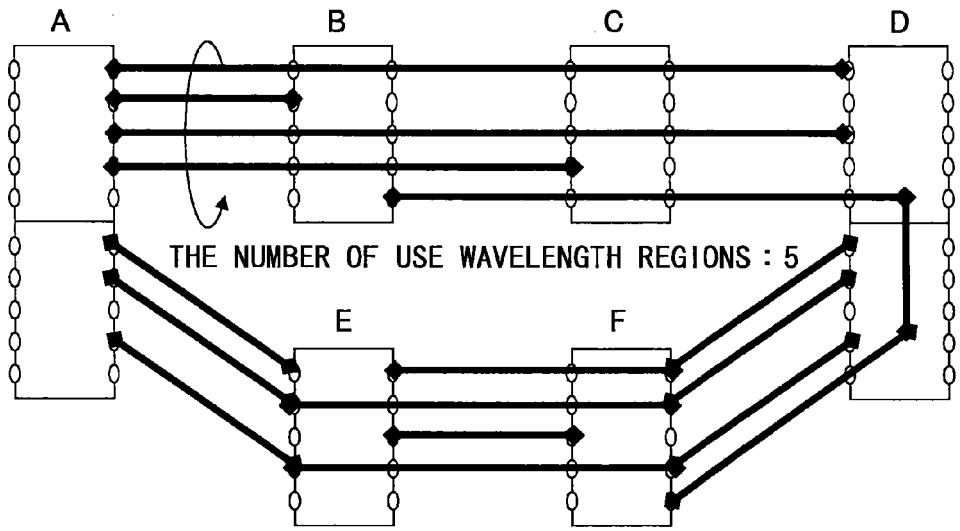
FIG. 44A is a diagram showing effects of reallocation of wavelength paths in an embodiment of the present invention, which shows a state before reallocation.
Figure 44B:
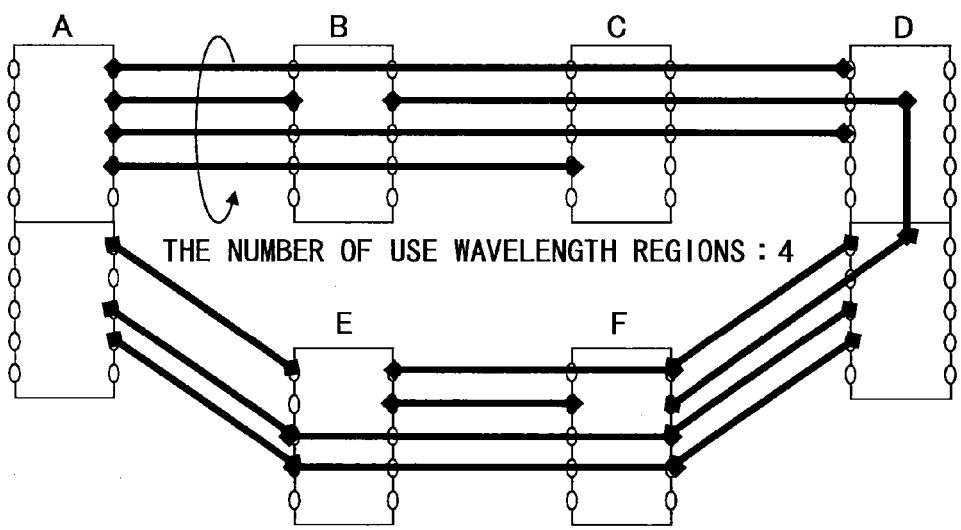
FIG. 44B is a diagram showing effects of reallocation of wavelength paths in an embodiment of the present invention, which shows a state after reallocation.

For example, as shown in FIG. 43, by reallocating the upper layer path, it becomes possible to delete the wavelength path that does not accommodate the upper layer path. Also, in a case where an upper layer path is set over plural wavelength paths, transponders can be reduced. Further, as shown in FIGS. 44A and 44B, it becomes possible to reduce the number of use wavelength regions (the number of wavelengths of wavelength regions used in the whole communication network).

Figure 45A:
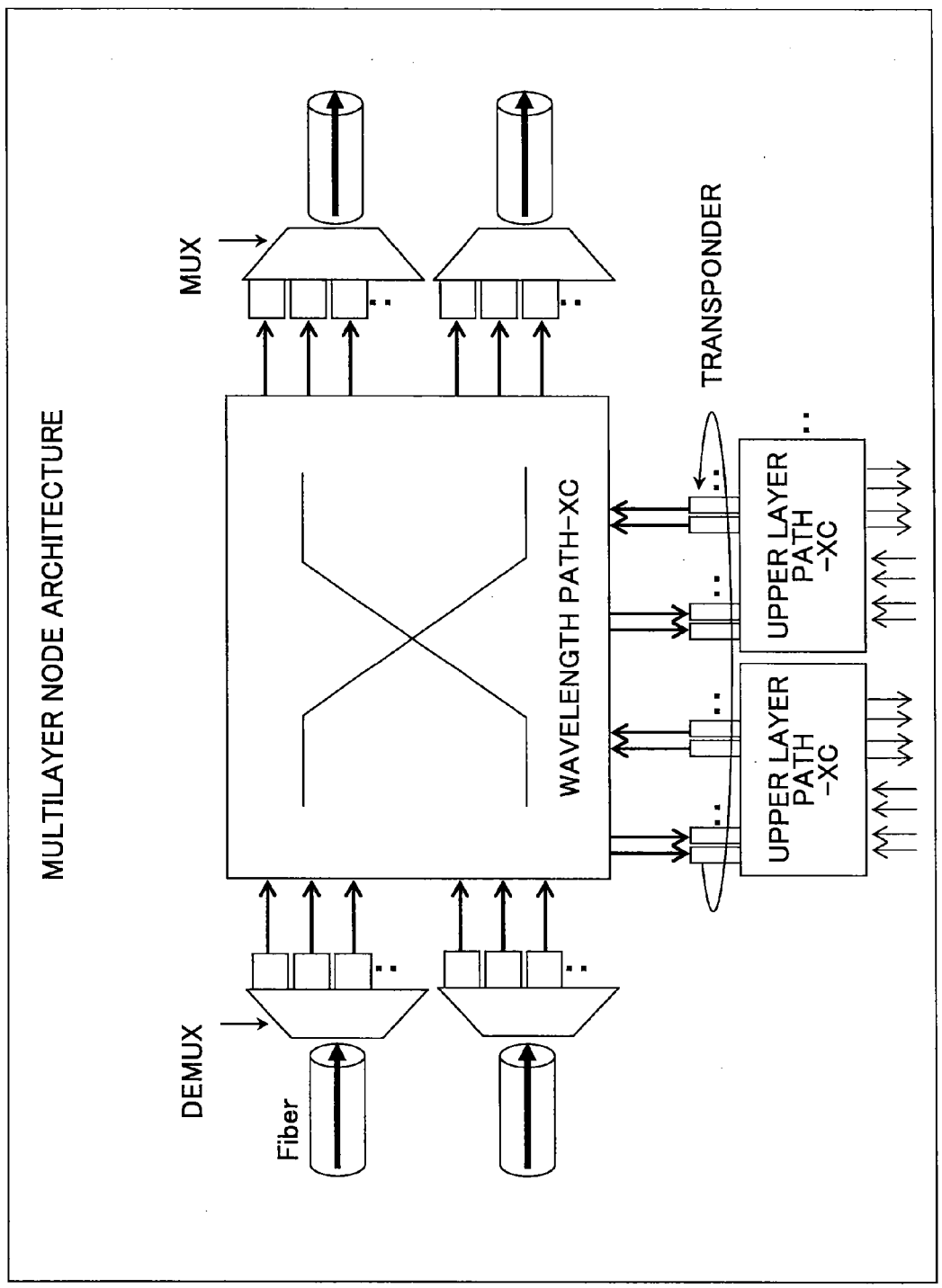
FIG. 45A is a diagram showing a multilayer node architecture in a assumed model for showing effects of the present invention.
Figures 45B, 45C:
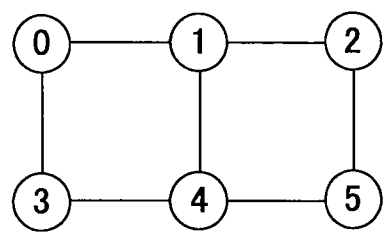
FIG. 45B is a diagram showing a cost model in an assumed model for showing effects of the present invention.
FIG. 45C is a diagram showing a physical topology in an assumed model for showing effects of the present invention.
Figure 46:
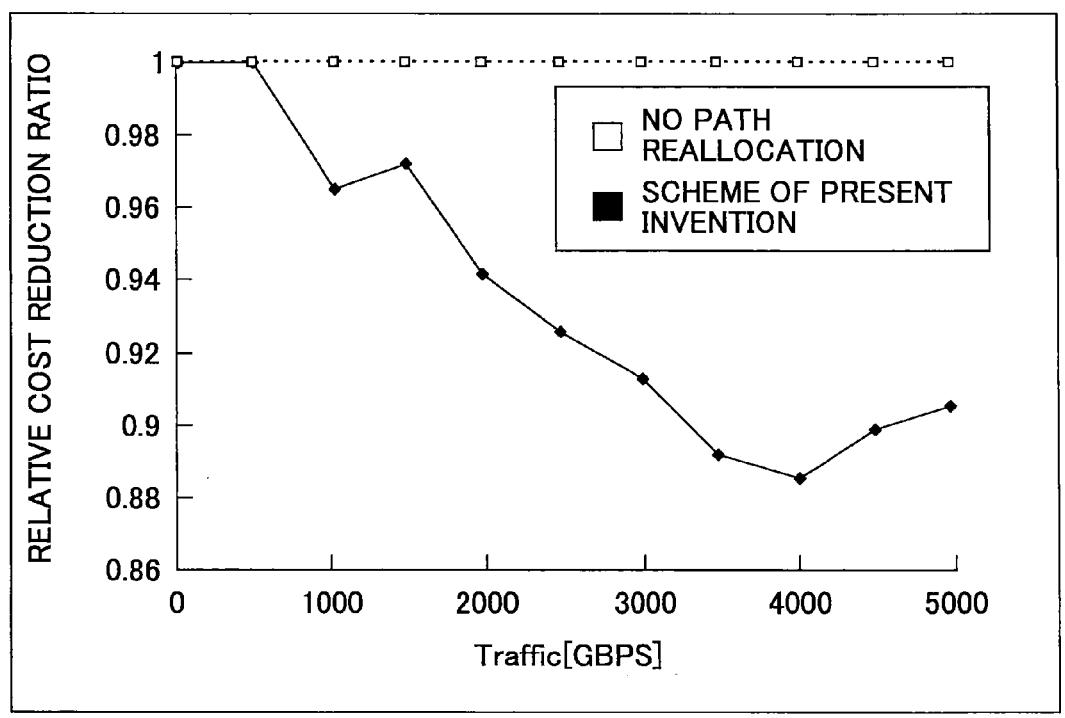
FIG. 46 is a diagram showing effects of reallocation of wavelength path and upper layer path in the present invention.

FIG. 46 shows a comparison result comparing between a case where the wavelength path and the upper layer path are reallocated according to the modified example of the eighth embodiment of the present invention and a case where reallocation is not performed. FIGS. 45A-45C show assumed node architecture and cost model. As shown in FIG. 45A, in the node architecture, plural upper layer path cross-connect apparatuses are connected to a wavelength path cross-connect apparatus, and a network model is assumed in which multi hop grooming can be performed for upper layer paths within the maximum transfer rate of the wavelength path, in which multi hop grooming is to bundle upper layer paths occurring from plural cites and to accommodate them in a wavelength path (refer to a document: K. Zhu and B. Mukherjee, "Traffic grooming in an optical WDM mesh network," IEEE J. Select. Areas Commun., vol. 20, no. 1, pp. 122-133, January 2002.). Also, FIG. 45B shows a cost model, and FIG. 45C shows a physical topology. The simulation condition is as follows.

Physical topology: 2×3 lattice network;
The number of wavelength multiplexing: 40;
The number of ports of the upper layer path cross-connect apparatus: 32;
The maximum transfer rate per one wavelength path: 40 [Gbps];
Types of transfer rates of upper layer path: 2.5 G, 10 G, 40 G;
Existing ratio for each transfer rate of upper layer path: 2.5 G path:10 G path:40 G path=5:2:3;
Reallocation timing: for each accommodation of 50 upper layer paths;
Traffic occurrence condition: node pair of start point and end point is random FIG. 46 shows a result when comparing between the scheme of the present invention and a case where path reallocation is not performed based on the above-mentioned model. FIG. 46 shows relative cost reduction effect of the scheme of the present invention for the traffic amount. In the case where the present invention is used, cost reduction effect of 12% at the maximum can be obtained compared with the case in which the present invention is not used.

Further, according to the embodiment of the present invention, reallocation of the wavelength path and reallocation of the upper layer path can be performed without instantaneous interruption.

For the sake of convenience of explanation, although the management apparatus of the embodiment of the present invention is described using functional block diagrams, the management apparatus of the present invention may be realized by hardware, software or a combination of hardware and software. Also, two or more embodiments and composing elements of two or more embodiments may be combined and used as necessary.

In the above-mentioned embodiments, although the centralized control scheme is mainly explained, the present invention can be similarly realized by the distributed control scheme. A node apparatus used in an embodiment of the present invention is shown in FIGS. 5 and 6. The node apparatus may have any configuration as long as the node apparatus is an apparatus for setting the wavelength path and the upper layer path. Also, advance designing of the path and the accommodation order determination may be performed sequentially instead of beforehand. Similarly, sequential calculation may be performed beforehand.

Also, in the embodiment of the present invention, although reallocation is performed using a free wavelength, a free wavelength specific for reallocation may be reserved in the communication network.

Although the present invention has been described using embodiments, the present invention is not limited to the specifically disclosed embodiments, and variations and modifications may be made without departing from the scope of the claims.

INDUSTRIAL APPLICABILITY

The present invention is applicable to reallocation of a wavelength path and an upper layer path in a communication network.

The present application claims priority based on Japanese patent application No. 2010-236776 filed on Oct. 21, 2010, and Japanese patent application No. 2011-105714 filed on May 10, 2011, and the entire contents of the applications No. 2010-236776 and No. 2011-105714 are incorporated herein by reference.

DESCRIPTION OF REFERENCE SIGNS

10 management apparatus
101 existing path management database
102 wavelength path advance designing function unit
103 reallocation target path management database
104 wavelength path accommodation order determining function unit
105 accommodation order management database
106 path setting function unit
107 control signal transmit/receive interface
20 node apparatus
201 control signal transmit/receive interface
202 upper layer apparatus connection interface
203 signal copy function unit
204 hitless switching function unit
205 wavelength path selection function unit
206 switching function unit
207 data transferring interface
30 management apparatus
301 existing path management database
302 upper layer path advance designing function unit
303 reallocation target path management database
306 path setting function unit
307 control signal transmit/receive interface

The invention claimed is:

1. A wavelength path reallocation method in a path reallocation apparatus for reallocating a wavelength path set in a communication network, comprising:
   a wavelength path designing step in which circuitry of the path reallocation apparatus designs a reallocation destination wavelength path by performing calculation such that a number of use frequency regions in the communication network becomes smaller than a corresponding value before reallocation; and
   a wavelength path setting step in which the circuitry changes a reallocation target wavelength path to the reallocation destination wavelength path by using a free wavelength,
   the wavelength path designing step comprising:
   performing calculation within a range of a constraint that a delay difference or route difference between the reallocation target wavelength path and the reallocation destination wavelength path does not exceed a predetermined threshold, or a constraint that a route does not change between the reallocation target wavelength path and the reallocation destination wavelength path.

2. The wavelength path reallocation method as claimed in claim 1, further comprising:
   an accommodation order determination step in which the circuitry determines an accommodation order for changing the reallocation target wavelength path to the reallocation destination wavelength path by using a free wavelength,
   wherein the wavelength path setting step includes changing the reallocation target wavelength path to the reallocation destination wavelength path without instantaneous interruption based on the determined accommodation order.

3. The wavelength path reallocation method as claimed in claim 2, the accommodation order determination step comprising:
   determining whether there is already a wavelength path at a reallocation destination, and
   when there is the wavelength path at the reallocation destination, determining an accommodation order by which the reallocation target wavelength path can be changed to the reallocation destination wavelength path by moving the already existing wavelength path to a free wavelength.

4. The wavelength path reallocation method as claimed in claim 3, the accommodation order determination step comprising:
   obtaining a number of operations for changing the reallocation target wavelength path to the reallocation destination wavelength path, and
   selecting an accommodation order in which the number of operations is smaller when plural accommodation orders are determined.

5. The wavelength path reallocation method as claimed in claim 1, the wavelength path designing step comprising:
   performing calculation within a range of a constraint that a number of reallocation target wavelength paths or a number of wavelengths does not exceed a predetermined threshold.

6. The wavelength path reallocation method as claimed in claim 1, the wavelength setting step comprising:
   determining whether a wavelength path already exists at a reallocation destination when changing the reallocation target wavelength path to the reallocation destination wavelength path,
   when the wavelength path does not already exist at the reallocation destination, the wavelength setting step further comprising:
   setting the reallocation destination wavelength path; and
   accommodating an upper layer path accommodated in the reallocation target wavelength path into the reallocation destination wavelength path, and
   when the wavelength path already exists at the reallocation destination, the wavelength setting step further comprising:

setting a wavelength path of a same route of the reallocation destination wavelength path; and accommodating an upper layer path accommodated in the reallocation target wavelength path into a wavelength path of a route the same as the reallocation destination wavelength path, the method further including deleting the reallocation target wavelength path when accommodation of the upper layer path completes, and repeating the wavelength path setting step by using the wavelength path of the same route as the reallocation destination wavelength path to be a reallocation target wavelength path.

7. The wavelength path reallocation method as claimed in claim 1, the wavelength path designing step comprising:
performing calculation such that a number of use wavelength regions in the communication network becomes smaller than a corresponding value of a number of use wavelength regions before reallocation for a wavelength used in a link in the communication network.

8. The wavelength path reallocation method as claimed in claim 1, the wavelength path designing step comprising:
performing calculation such that a number of use wavelength regions in the communication network becomes smaller than a corresponding value of a number of use wavelength regions before reallocation for a wavelength in which the wavelength is not used in a link in the communication network.

9. The wavelength path reallocation method as claimed in claim 3, the accommodation order determining step comprising:
in a case where it is determined that a loop will occur when analyzing a sequence of reallocation destinations of a wavelength path in order, determining the accommodation order by moving a wavelength path in the loop to a free wavelength.

10. The wavelength path reallocation method as claimed in claim 2, the accommodation order determining step comprising:
an accommodation order calculation step of calculating a number of operations by determining an order for changing the reallocation target wavelength path to the reallocation destination wavelength path by using a free wavelength; and
a step of determining the reallocation wavelength and the reallocation order within a range of a predetermined number of operations.

11. The wavelength path reallocation method as claimed in claim 10, the wavelength path designing step comprising:
calculating plural solutions that satisfy an objective function, and
the accommodation order determining step comprising:
calculating a number of operations for each of the plural solutions.

12. The wavelength path reallocation method as claimed in claim 11, the wavelength path designing step comprising:
calculating the plural solutions that satisfy the objective function by using an integer linear programming method.

13. The wavelength path reallocation method as claimed in claim 1, wherein, a representative value corresponding to the number of use wavelength regions is determined by:
a number obtained by multiplying the number of use wavelength regions by a use cost per one wavelength;
the number of wavelength regions in which fragmentation occurs;
a number obtained by multiplying the number of use wavelength regions in which fragmentation occurs by the use cost per one wavelength; or a number by adding weight values to the number of use wavelength regions in which fragmentation occurs according to the number of use wavelengths in a wavelength channel.

14. The wavelength path reallocation method as claimed in claim 12, wherein the objective function is for:
reducing a total sum of the number of wavelengths, a number of communication apparatuses, or a communication apparatus cost, and a number of use wavelength regions, or
reducing the total sum of the number of wavelengths, the number of communication apparatuses, or a communication apparatus cost, and the number of use wavelength regions, and a cost for changing a wavelength path or an upper layer path or both of the wavelength path and the upper layer path.

15. The wavelength path reallocation method as claimed in claim 12, the wavelength path designing step comprising:
changing the objective function and calculating plural solutions satisfied by the changed object function by using the integer linear programming method.

16. The wavelength path reallocation method as claimed in claim 10, wherein a number of operations in the accommodation order determination step is calculated by calculating a total number by adding a weight value to each path to be reallocated, or calculated by adding a weight value according to the number of hops or the length of the routes.

17. The wavelength path reallocation method as claimed in claim 3, the accommodation order determination step comprising:
determining an accommodation order by moving a wavelength path in a loop to a free wavelength, in ascending order of an occurrence amount of loops, when analyzing a sequence of reallocation destinations a in order for reallocation target wavelength paths.

18. A wavelength path reallocation method in a path reallocation apparatus for reallocating a wavelength path set in a communication network, comprising:
a wavelength path designing step in which circuitry of the path reallocation apparatus designs a reallocation destination wavelength path by performing calculation such that a number of use frequency regions in the communication network becomes smaller than a corresponding value before reallocation; and
a wavelength path setting step in which the circuitry changes a reallocation target wavelength path to the reallocation destination wavelength path by using a free wavelength,
the wavelength path reallocation method further comprising:
an upper layer path designing step in which the circuitry designs a reallocation destination upper layer path by performing calculation such that the number of wavelengths, a number of communication apparatuses or a communication apparatus cost that is used in the communication network becomes smaller than a corresponding value before reallocation;
an upper layer path setting step in which the circuitry changes a reallocation target upper layer path to a reallocation destination upper layer path; and
a wavelength path deleting step in which, when there is a wavelength path that does not accommodate any upper layer path, the circuitry deletes the wavelength path.

19. The wavelength path reallocation method as claimed in claim 18, the upper layer path designing step comprising:
performing calculation within a range of constraint that a number of upper layer paths of reallocation target does not exceed a predetermined threshold.

20. The wavelength path reallocation method as claimed in claim 18, the upper layer path designing step comprising:

performing calculation within a range of a constraint that a delay difference or route difference between the reallocation target upper layer path and the reallocation destination upper layer path does not exceed a predetermined threshold.

21. An upper layer path reallocation method in a path reallocation apparatus for reallocating an upper layer path in a wavelength path set in a communication network, comprising:

an upper layer path designing step in which circuitry of the path reallocation apparatus designs a reallocation destination upper layer path by performing calculation such that a number of wavelengths, a number of communication apparatuses or a communication apparatus cost that is used in the communication network becomes smaller than a corresponding value before reallocation; and an upper layer path setting step in which the circuitry changes a reallocation target upper layer path to a reallocation destination upper layer path, the upper layer path designing step comprising:

performing calculation within a range of a constraint that a delay difference or route difference between the reallocation target upper layer path and the reallocation destination upper layer path does not exceed a predetermined threshold.

22. A path reallocation apparatus for reallocating a wavelength path set in a communication network, comprising:

circuitry configured to design a reallocation destination wavelength path by performing calculation such that a number of use frequency regions in the communication network becomes smaller than a corresponding value before reallocation; and change a reallocation target wavelength path to the reallocation destination wavelength path by using a free wavelength, the circuitry being further configured to:

perform calculation within a range of a constraint that a delay difference or route difference between the reallocation target wavelength path and the reallocation destination wavelength path does not exceed a predetermined threshold, or a constraint that a route does not change between the reallocation target wavelength path and the reallocation destination wavelength path.

\* \* \* \* \*